United States Patent
Gorodissky et al.

(10) Patent No.: US 10,505,969 B2
(45) Date of Patent: *Dec. 10, 2019

(54) SETTING-UP PENETRATION TESTING CAMPAIGNS

(71) Applicant: XM Cyber Ltd., Hertzelia (IL)

(72) Inventors: Boaz Gorodissky, Hod-Hasharon (IL); Adi Ashkenazy, Tel Aviv (IL); Ronen Segal, Hertzelia (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,720

(22) Filed: Sep. 19, 2018

(65) Prior Publication Data

US 2019/0036961 A1    Jan. 31, 2019

Related U.S. Application Data

(63) Continuation of application No. 15/681,692, filed on Aug. 21, 2017, now Pat. No. 10,122,750.

(Continued)

(51) Int. Cl.
*G06F 11/00* (2006.01)
*H04L 29/06* (2006.01)
*G06F 21/57* (2013.01)

(52) U.S. Cl.
CPC ........ *H04L 63/1433* (2013.01); *G06F 21/577* (2013.01); *H04L 63/20* (2013.01)

(58) Field of Classification Search
CPC ... H04L 63/1433; H04L 63/20; G06F 21/577; F24F 11/58; F24F 11/62; H04W 4/33

(Continued)

(56) References Cited

U.S. PATENT DOCUMENTS 6,918,038 B1    7/2005  Smith et al.
6,952,779 B1 *  10/2005  Cohen ............... G06F 21/577
                                                    726/22

(Continued)

FOREIGN PATENT DOCUMENTS

CN    103200230 A    7/2013
CN    103916384 A    7/2014

(Continued)

OTHER PUBLICATIONS

CN103200230 Machine Translation (by EPO and Google)—published Jul. 10, 2013; Li Qianmu.

(Continued)

*Primary Examiner* — Samson B Lemma

(74) *Attorney, Agent, or Firm* — Marc Van Dyke; Fourth Dimension IP

(57) ABSTRACT

Methods and systems for penetration testing of a networked system by a penetration testing system (e.g. that is controlled by a user interface of a computing device) are disclosed herein. In one example, a penetration testing campaign is executed according to a manual and explicit selecting of one or more network nodes of the networked system. Alternatively or additionally, a penetration testing campaign is executed according to a manually and explicitly selected node-selection condition. Alternatively or additionally, a penetration testing campaign is executed according to an automatic selecting of one or more network nodes of the networked system.

19 Claims, 48 Drawing Sheets

Related U.S. Application Data

(60) Provisional application No. 62/453,056, filed on Feb. 1, 2017, provisional application No. 62/451,850, filed on Jan. 30, 2017.

(58) Field of Classification Search
USPC .................................................. 726/25
See application file for complete search history.

(56) References Cited

U.S. PATENT DOCUMENTS

| | | |
|---|---|---|
| 7,013,395 B1 | 3/2006 | Swiler et al. |
| 7,757,293 B2 | 7/2010 | Caceres et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,356,353 B2 | 1/2013 | Futoransky et al. |
| 8,365,289 B2 | 1/2013 | Russ et al. |
| 8,490,193 B2 | 7/2013 | Sarraute Yamada et al. |
| 8,650,651 B2 | 2/2014 | Podjarny et al. |
| 8,813,235 B2 | 8/2014 | Sidagni |
| 9,076,013 B1 | 7/2015 | Bailey, Jr. et al. |
| 9,183,397 B2 | 11/2015 | Futoransky et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,473,522 B1 | 10/2016 | Kotler et al. |
| 9,558,355 B2 | 1/2017 | Madou et al. |
| 10,038,711 B1 | 7/2018 | Gorodissky et al. |
| 10,068,095 B1 | 9/2018 | Segal et al. |
| 10,122,750 B2 | 11/2018 | Gorodissky et al. |
| 2005/0086502 A1 | 4/2005 | Rayes et al. |
| 2007/0204347 A1 | 8/2007 | Caceres et al. |
| 2008/0209567 A1* | 8/2008 | Lockhart ............. G06F 11/3612 726/25 |
| 2008/0288822 A1* | 11/2008 | Wu ....................... G06F 21/577 714/32 |
| 2009/0044277 A1 | 2/2009 | Aaron |
| 2009/0172813 A1 | 7/2009 | Aaron |
| 2010/0138925 A1* | 6/2010 | Barai ................. H04L 63/1433 726/25 |
| 2011/0035803 A1* | 2/2011 | Lucangeli Obes ... G06F 21/577 726/25 |
| 2012/0174228 A1 | 7/2012 | Giakouminakis et al. |
| 2013/0014263 A1 | 1/2013 | Porcello et al. |
| 2013/0031635 A1 | 1/2013 | Lotem et al. |
| 2014/0173739 A1 | 6/2014 | Ahuja et al. |
| 2014/0237606 A1* | 8/2014 | Futoransky ........... G06F 21/577 726/25 |
| 2016/0044057 A1 | 2/2016 | Chenette et al. |
| 2016/0234251 A1 | 8/2016 | Boice et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1* | 12/2016 | Sivan .................. H04L 63/1433 |
| 2017/0063886 A1 | 3/2017 | Muddu et al. |
| 2017/0098086 A1 | 4/2017 | Hoernecke et al. |
| 2017/0116421 A1 | 4/2017 | M C et al. |
| 2017/0279843 A1 | 9/2017 | Schultz et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270268 A1 | 9/2018 | Gorodissky et al. |
| 2018/0365429 A1 | 12/2018 | Segal |
| 2019/0014141 A1 | 1/2019 | Segal et al. |
| 2019/0036961 A1 | 1/2019 | Gorodissky et al. |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |

OTHER PUBLICATIONS

CN103916384 Machine Translation (by EPO and Google)—published Jul. 9, 2014 Zhong Li.
CN104009881 Machine Translation (by EPO and Google)—published Aug. 27, 2014 Wang Tian.
Co-pending U.S. Appl. No. 16/128,718, filed Sep. 12, 2018.
Co-pending U.S. Appl. No. 16/258,702, filed Jan. 28, 2019.
Co-pending U.S. Appl. No. 15/911,170, filed Mar. 5, 2018.
Co-pending U.S. Appl. No. 16/186,557, filed Nov. 11, 2018.
Co-pending U.S. Appl. No. 15/993,453, filed May 30, 2018.

\* cited by examiner

PRIOR ART/USE CASE

USE CASE RELATED TO INITIALLY-COMPROMISED NODES

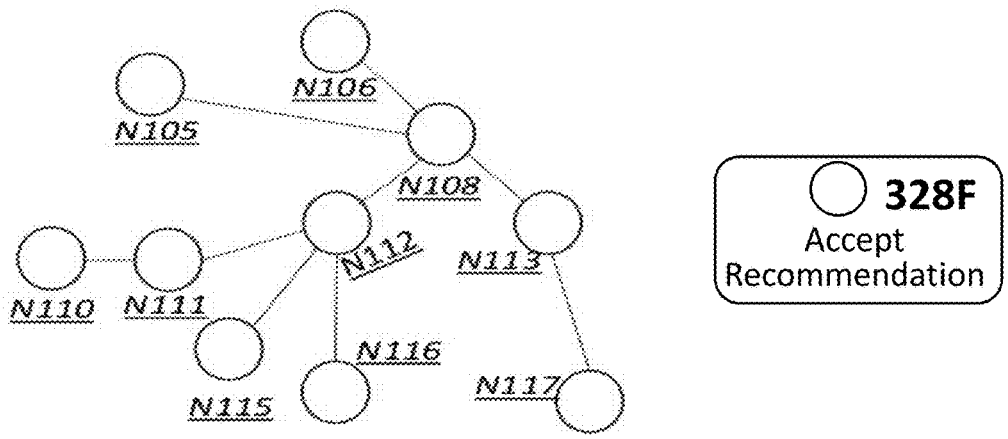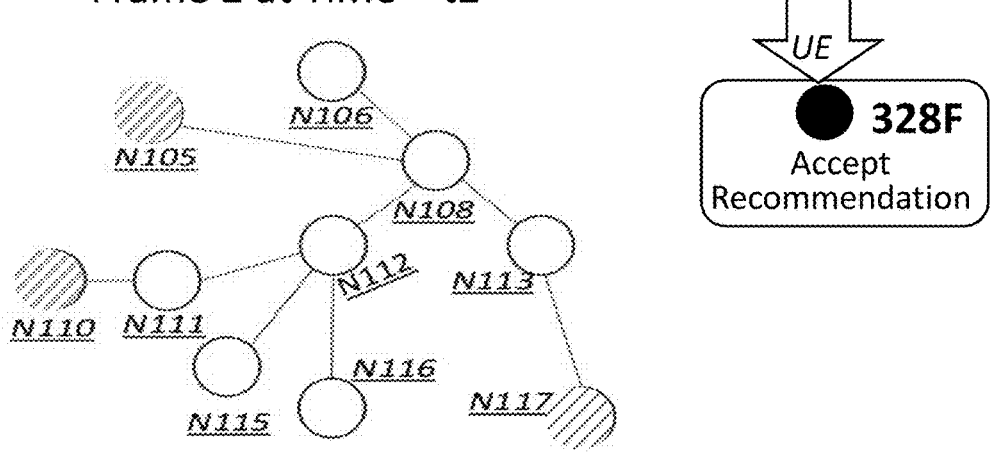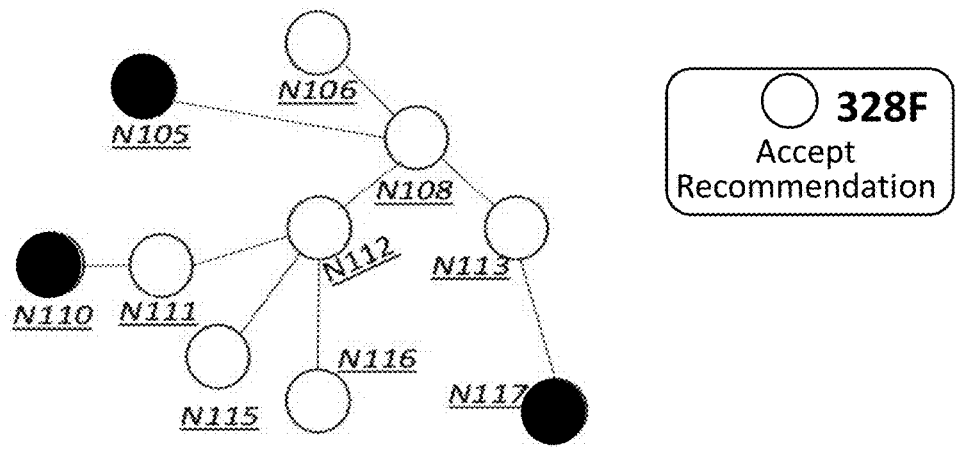
FIG. 8B

Receiving S551, by the penetration testing system and via the user interface of the computing device, one or more manually-entered inputs, the one or more manually-entered inputs explicitly selecting a node-selection condition, the manually and explicitly selected node-selection condition defining a proper subset of network nodes of the networked system such that any network node of the networked system is a member of the subset of network nodes if and only if it satisfies the condition

In accordance with the manual and explicit selecting of the node-selection condition, Executing S555 the penetration testing campaign by the penetration testing system so as to test the networked system, the penetration testing campaign being executed under the assumption that every node of the subset of network nodes is already compromised at the time of beginning the penetration testing campaign

Reporting S559, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

FIG. 9

Frame 1 at Time = t1

Node Selection Condition

---------- Select ----------

Iff machine is a Linux box

Iff machine has direct connection to outside world

Iff machine has on-board cell-phone modem

330F

Frame 2 at Time = t2

Node Selection Condition

Iff machine has on-board cell-phone modem

Iff machine is a Linux box

Iff machine has direct connection to outside world

UE → Iff machine has on-board cell-phone modem

330F

Frame 3 at Time = t3

UE → ● BEGIN 334

FIG. 10A

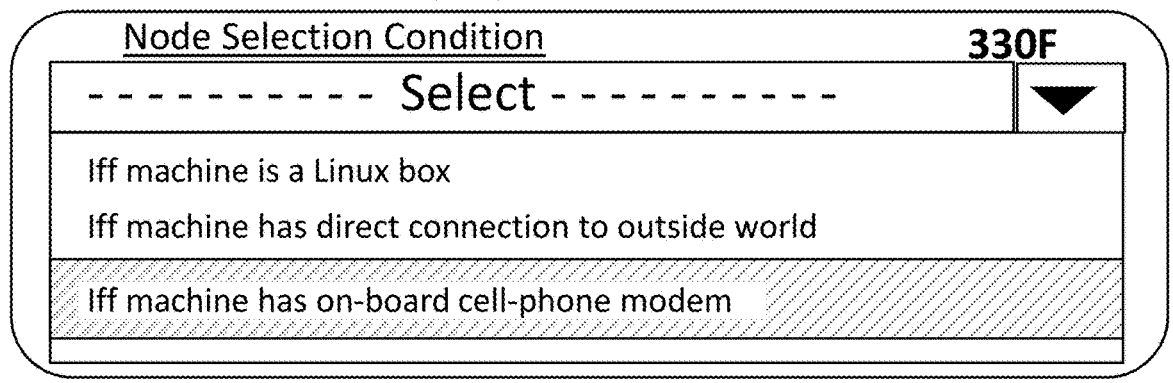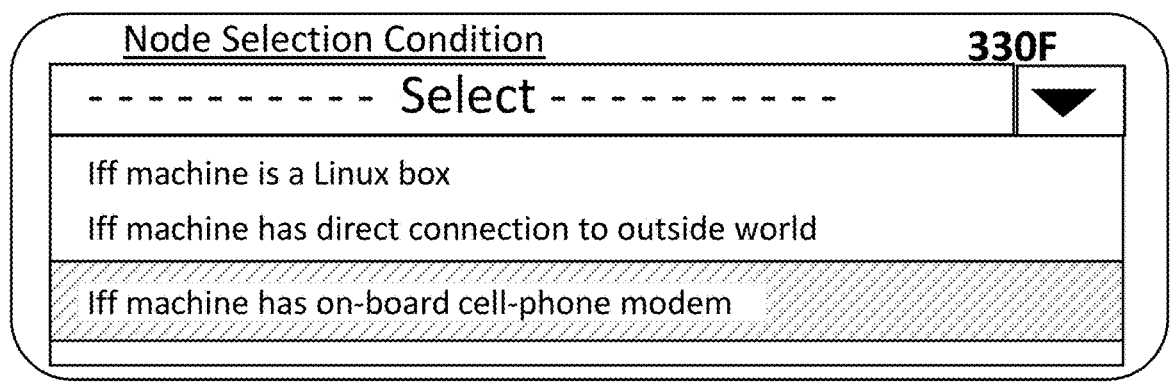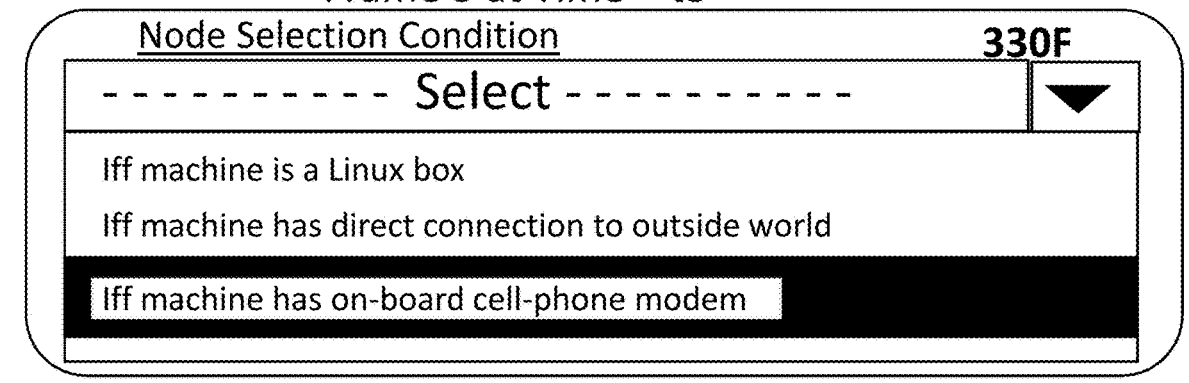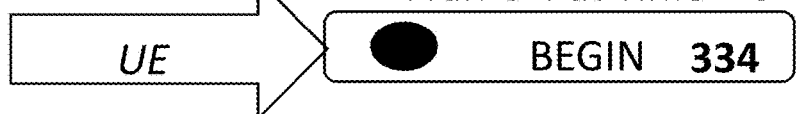
FIG. 10B

Determining S811, by the penetration testing system, whether one or more network nodes of the networked system satisfy a pre-defined Boolean condition;

Based on a result of the determining, automatically selecting S805, by the penetration testing system, the one or more network nodes of the networked system, wherein at least one of the automatically selected network nodes is other than the computing device In accordance with the automatically selecting of the network nodes, executing S809 the penetration testing campaign by the penetration testing system so as to test the networked system, the penetration testing campaign being executed under the assumption that the automatically selected one or more network nodes of the networked system are already compromised at the time of beginning the penetration testing campaign Reporting S813, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

FIG. 11A

Determining S801, by the penetration testing system, at least one of (i) a type of an attacker of the penetration testing campaign, and (ii) whether one or more network nodes of the networked system satisfy a pre-defined Boolean condition;

Based on a result of the determining, automatically selecting S805, by the penetration testing system, the one or more network nodes of the networked system, wherein at least one of the automatically selected network nodes is other than the computing device In accordance with the automatically selecting of the network nodes, executing S809 the penetration testing campaign by the penetration testing system so as to test the networked system, the penetration testing campaign being executed under the assumption that the automatically selected one or more network nodes of the networked system are already compromised at the time of beginning the penetration testing campaign Reporting S813, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

FIG. 11C

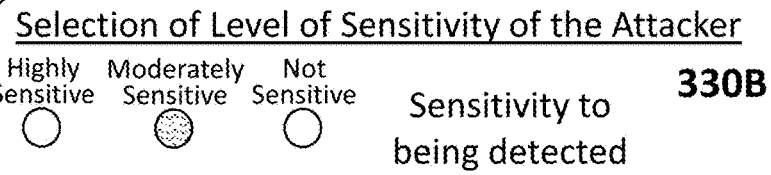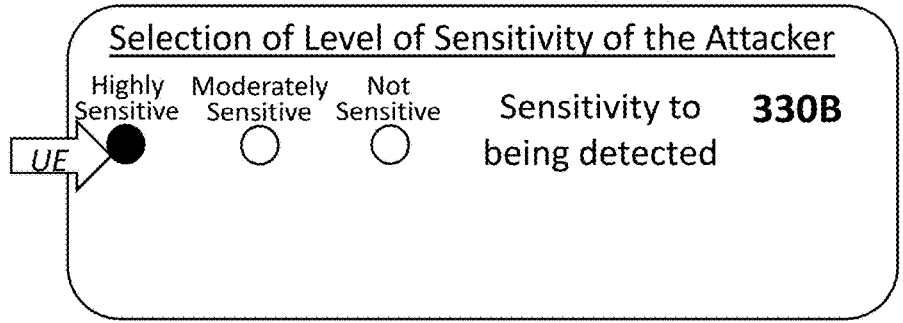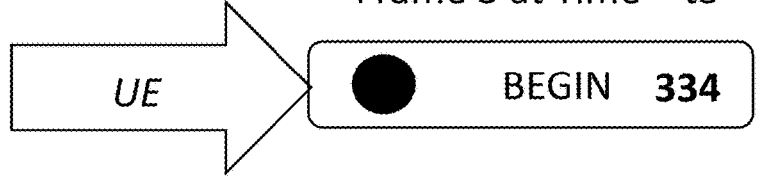
FIG. 15A

Frame 1 at Time = t1

Selection of Level of Sensitivity of the Attacker

Highly Sensitive   Moderately Sensitive   Not Sensitive    Sensitivity to being detected Accept Recommendation 328B

330B'

---

Frame 2 at Time = t2

Selection of Level of Sensitivity of the Attacker

Highly Sensitive   Moderately Sensitive   Not Sensitive    Sensitivity to being detected UE → Accept Recommendation 328B

330B'

---

Frame 3 at Time = t3

Selection of Level of Sensitivity of the Attacker

Highly Sensitive   Moderately Sensitive   Not Sensitive    Sensitivity to being detected Accept Recommendation 328B

330B'

---

Frame 4 at Time = t4

UE → ● BEGIN 334

FIG. 15B

Frame 1 at Time = t1
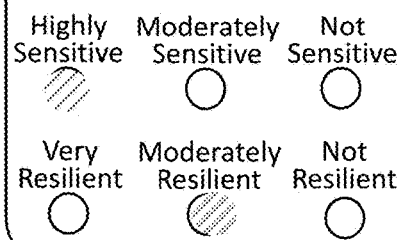
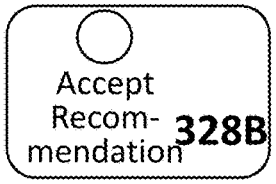
Frame 2 at Time = t2
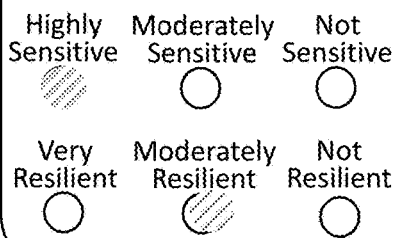
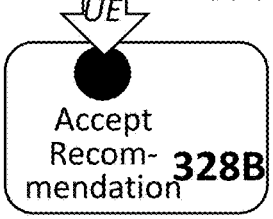
Frame 3 at Time = t3
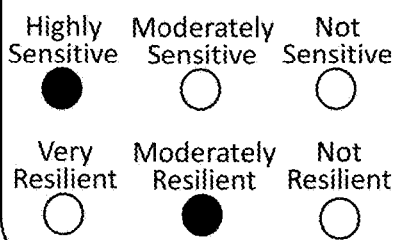
Frame 4 at Time = t4
UE → ● BEGIN 334
FIG. 17B

Default Value  Frame 1 at Time = t1
Frame 2 at Time = t2
Frame 3 at Time = t3
FIG. 19A

Frame 1 at Time = t1

Lateral Movement Strategy
BFS   DFS   Random Neighbor
○      ▨       ○                    330G'

328G   Accept Recommendation ○

---

Frame 2 at Time = t2

Lateral Movement Strategy
BFS   DFS   Random Neighbor
○      ▨       ○                    330G'

328G   Accept Recommendation ●  ⇐ UE

---

Frame 3 at Time = t3

Lateral Movement Strategy
BFS   DFS   Random Neighbor
○      ●      ○                     330G'

328G   Accept Recommendation ○

---

Frame 4 at Time = t4

UE ⇒    ●   BEGIN   334

FIG. 19B

Determining S901, by the penetration testing system, at least one of (i) a type of the attacker of the penetration testing campaign and (ii) one or more goals of the attacker of the penetration testing campaign

Based on a result of the determining, automatically selecting S905 by the penetration testing system a lateral movement strategy of the attacker of the penetration testing campaign

Executing S909 the penetration testing campaign, by the penetration testing system and according to
    i. the at least one of (A) the type of the attacker of the penetration testing campaign and (B) the one or more goals of the attacker, and
    ii. the automatically selected lateral movement strategy,
so as to test the networked system

Reporting S913, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

FIG. 20

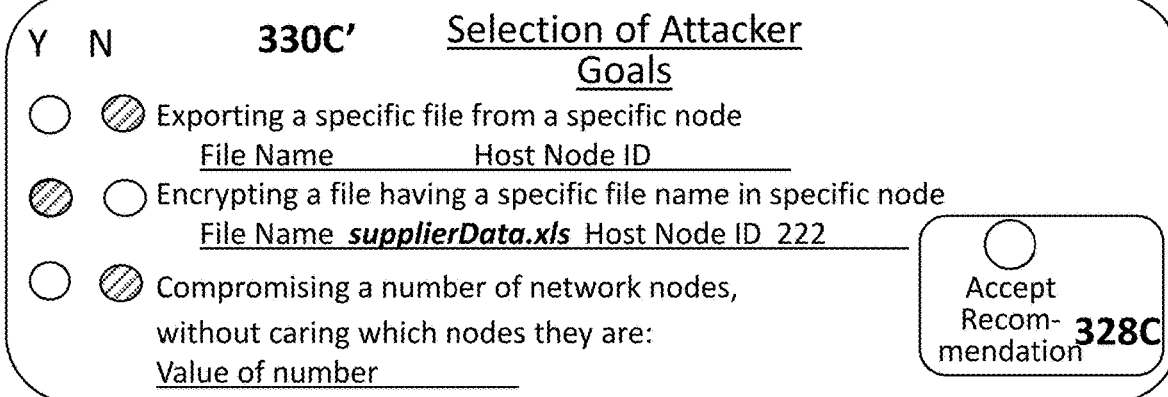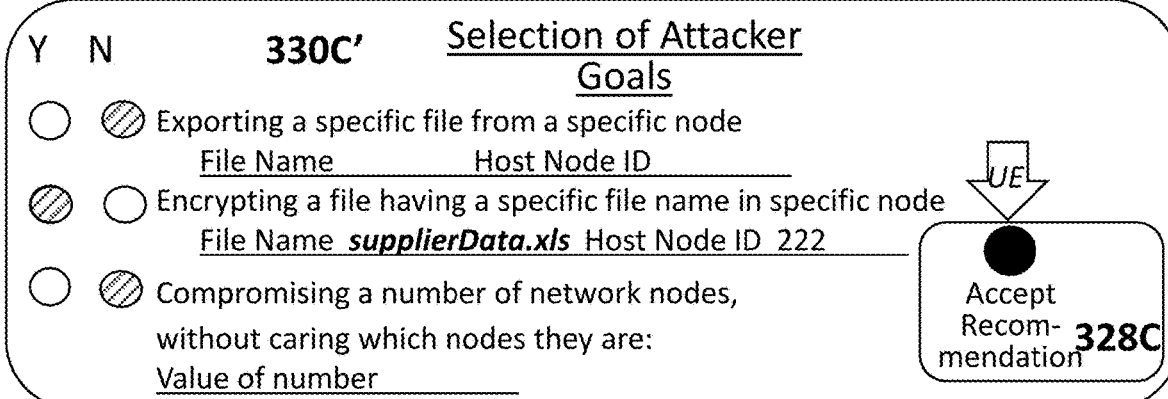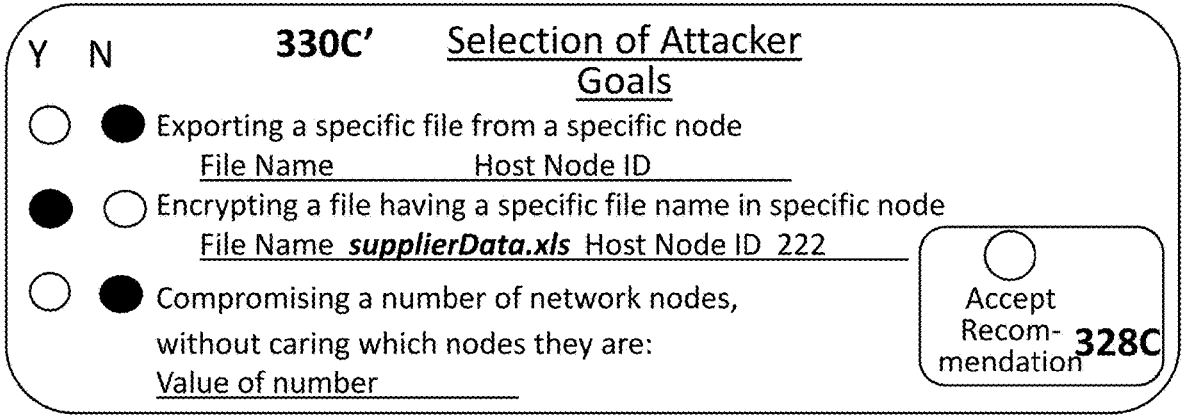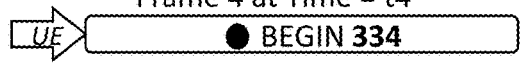
FIG. 22B

```
┌─────────────────────────────────────────────────────────────┐
│ manually selecting, by a user of the penetration testing    │
│ system and using the user interface of the computing        │
│ device, a first value for a first information item of a     │
│ campaign of the penetration testing system                  │
└─────────────────────────────────────────────────────────────┘
                              │
                              ▼
┌─────────────────────────────────────────────────────────────┐
│ subsequent to the manually selecting the first value,       │
│ manually selecting, by the user of the penetration testing  │
│ system and using the user interface of the computing        │
│ device, a second value for a second information item of the │
│ campaign of the penetration testing system, the manual      │
│ selection of the second value being independent of the      │
│ manual selection of the first value                         │
└─────────────────────────────────────────────────────────────┘
                              │
                              ▼
┌─────────────────────────────────────────────────────────────┐
│ executing, by the penetration testing system, the campaign  │
│ of the penetration testing system for testing the networked │
│ system, wherein the campaign is executed using the first    │
│ value for the first information item and the second value   │
│ for the second information item                             │
└─────────────────────────────────────────────────────────────┘
                              │
                              ▼
┌─────────────────────────────────────────────────────────────┐
│ reporting at least one security vulnerability determined by │
│ the campaign to exist in the networked system, to the       │
│ computing device or to another computing device             │
└─────────────────────────────────────────────────────────────┘
```

FIG. 26 manually selecting, by a user of the penetration testing system and using the user interface of the computing device, a capability of an attacker of a campaign of the penetration testing system

↓ executing, by the penetration testing system, the campaign of the penetration testing system for testing the networked system, wherein the campaign is executed using the manually selected capability of the attacker

↓ reporting at least one security vulnerability determined by the campaign to exist in the networked system, to the computing device or to another computing device

FIG. 27 manually selecting, by a user of the penetration testing system and using the user interface of the computing device, a trait of an attacker of a campaign of the penetration testing system

executing, by the penetration testing system, the campaign of the penetration testing system for testing the networked system, wherein the campaign is executed using the manually selected trait of the attacker

reporting at least one security vulnerability determined by the campaign to exist in the networked system, to the computing device or to another computing device

FIG. 28 manually selecting, by a user of the penetration testing system and using the user interface of the computing device, one or more network nodes of the networked system that are assumed to be already compromised at the beginning of the campaign of the penetration testing system

executing, by the penetration testing system, the campaign of the penetration testing system for testing the networked system, wherein the campaign is executed assuming the one or more network nodes are already compromised at the beginning of the campaign

reporting at least one security vulnerability determined by the campaign to exist in the networked system, to the computing device or to another computing device

FIG. 29

```
manually selecting, by a user of the penetration testing system
and using the user interface of the computing device, a goal of
an attacker of a campaign of the penetration testing system
```
↓
```
executing, by the penetration testing system, the campaign of
the penetration testing system for testing the networked system,
wherein the campaign is executed using the manually selected
goal of the attacker
```
↓
```
reporting at least one security vulnerability determined by the
campaign to exist in the networked system, to the computing
device or to another computing device
```

FIG. 30 manually selecting, by a user of the penetration testing system and using the user interface of the computing device, a lateral movement strategy of an attacker of the campaign of the penetration testing system

executing, by the penetration testing system, the campaign of the penetration testing system for testing the networked system, wherein the campaign is executed using the manually selected lateral movement strategy of the attacker

reporting at least one security vulnerability determined by the campaign to exist in the networked system, to the computing device or to another computing device

FIG. 31

SETTING-UP PENETRATION TESTING CAMPAIGNS

CROSS-REFERENCE TO RELATED APPLICATIONS

This patent application is a continuation of U.S. patent application Ser. No. 15/681,692 which was filed on Aug. 21, 2017 and which is incorporated herein by reference in its entirety. U.S. patent application Ser. No. 15/681,692 claims the benefit of U.S. Provisional Patent Application No. 62/453,056 filed on Feb. 1, 2017, which is incorporated herein by reference in its entirety.

BACKGROUND

There is currently a proliferation of organizational networked systems. Every type of organization, be it a commercial company, a university, a bank, a government agency or a hospital, heavily relies on one or more networks interconnecting multiple computing nodes. Failures of the networked system of an organization or even of only a portion of it might cause a significant damage, up to completely shutting down all operations. Additionally, much of the data of the organization (and for some organizations even all data) exists somewhere on its networked system, including all confidential data comprising its "crown jewels" such as prices, details of customers, purchase orders, employees' salaries, technical formulas, etc. Loss of such data or leaks of such data to outside unauthorized entities might be disastrous for the organization.

Many organizational networks are connected to the Internet at least through one network node, and consequently they are subject to attacks by computer hackers or by hostile adversaries. Even an organizational network that is not connected to the Internet might be attacked by an employee of the organization. Quite often the newspapers are reporting incidents in which websites crashed, sensitive data was stolen or service to customers was denied, where the failures were the results of hostile penetration into an organization's networked system.

Thus, many organizations invest a lot of efforts and costs in preventive means designed to protect their networked systems against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a networked system is, is by trying to attack it as a real adversary would. This is known as penetration testing (pen testing, in short), and is a very common approach that is even required by regulation in some developed countries.

Penetration testing requires highly talented people to man the testing team. Those people should be familiar with each and every known security vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). But external consultants are expensive and therefore are typically called in only for brief periods separated by long time intervals in which no such testing is done. This makes the penetration testing ineffective as security vulnerabilities caused by new forms of attacks that appear almost daily are discovered only months after becoming serious threats to the organization.

Additionally, even rich organizations that can afford hiring talented experts for in-house penetration testing teams do not achieve good protection. Testing for security vulnerabilities of a large networked system containing many types of computers, operating systems, network routers and other devices is both a very complex and a very tedious process. The process is prone to human errors of missing testing for certain threats or misinterpreting the damages of certain attacks. Also, because a process of full testing of a large networked system against all threats is quite long, the organization might again end with a too long discovery period after a new threat appears.

Because of the above deficiencies automated penetration testing solutions were introduced in recent years by multiple vendors. These automated solutions reduce human involvement in the penetration testing process, or at least in some of its functions.

A penetration testing process involves at least the following main functions: (i) a reconnaissance function, (ii) an attack function, and (ii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof. However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results. Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30 and optionally cleanup function code 50—for example, in combination with suitable hardware (e.g. one or more computing device 110 and one or more processor(s) 120 thereof) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) a human-interface device 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory.

Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device 140), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

FIGS. 3 and 4A-4D relate to a prior art example of penetration testing of a networked system. FIG. 3 shows a timeline—i.e. the penetration test begins at a time labelled as $T_{Begin\ Pen-Test}$. Subsequent points in time, during the penetration test, are labelled in FIG. 3 as $T^1_{During\ Pen-Test}$, $T^2_{During\ Pen-Test}$ and $T^3_{During\ Pen-Test}$.

FIG. 4A shows an example networked system comprising a plurality of 24 network nodes labelled N101, N102 ... N124. In the present document, a network node may be referred to simply as 'node'—'network node' and 'node' are interchangeable.

Each network node may be a different computing device 110. Two network nodes are "immediate neighbors" of each other if and only if they have a direct communication link between them that does not pass through any other network node.

In the example of FIG. 4A, this is represented by an edge between the two nodes—thus, in this example nodes N108 and N112 are immediate neighbors while nodes N108 and N115 are not immediate neighbors.

Embodiments of the invention relate to penetration testing of networked systems, such as that illustrated in FIG. 4A.

During penetration testing, a node may become compromised. In the examples of FIGS. 4A-4D compromised nodes are indicated by an "X" in the circle—all other nodes have not yet been compromised.

The term "compromising a network node" is defined as: Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

According to the example illustrated in FIGS. 4A-4D, initially, at time $T_{Begin\ Pen-Test}$, when the penetration test begins, none of the network-nodes have yet been compromised. Between time $T_{Begin\ Pen-Test}$ and $T^1_{During\ Pen-Test}$, network node N122 is compromised—this is indicated in FIG. 4B by the "X." Between time $T^1_{During\ Pen-Test}$ and $T^2_{During\ Pen-Test}$, network nodes N116 and N112 are compromised, as indicated by the X's in FIG. 4C. Between time $T^2_{During\ Pen-Test}$ and $T^3_{During\ Pen-Test}$, network nodes N110 and N111 are compromised, as indicated by the X's in FIG. 4D.

In this particular example, it is assumed that it is easier for an attacker to compromise a node if one or more of its immediate neighbors has been compromised.

The Problem To Solve

When a user desires to operate a prior art penetration testing system for running a test on a specific networked system, the penetration testing system must know what test it should execute. For example, the penetration testing system must know what is the type of attacker against whom the test is making its assessment (a state-sponsored actor, a cyber criminal etc.) and what are his capabilities. As another example, the penetration testing system must know what is the goal of the attacker according to which the attack will be judged as a success or a failure (copying a specific file and exporting it out of the tested networked system, encrypting a specific directory of a specific network node for ransom, etc.).

A specific run of a specific test of a specific networked system by a penetration testing system is called a "campaign" of that penetration testing system and entails performing at least the reconnaissance (step S21 of FIG. 1B), attack (step S31 of FIG. 1B) and reporting (step S41 of FIG. 1B) functions. A collection of values for all information items a penetration testing system must know before executing a campaign is called "specifications of the campaign" or "scenario". For example, the type of the attacker and the goal of the attacker are specific information items of a campaign, and specific values for them are parts of the specifications of any campaign.

The results of the penetration testing campaign may be reported by performing the reporting function (step S41) of FIG. 1B.

All prior art penetration testing systems are not flexible in letting the user define the specifications of a campaign. Typically, those systems are delivered with a library of pre-defined campaign specifications from which the user should choose.

Some prior art penetration testing systems provide slightly better flexibility by allowing the user to select a scenario based on explicit selection of the type of the attacker. The user may be presented with a closed list of alternatives for the type of the attacker—a state-sponsored actor, a cyber criminal, an amateur hacker, etc., and he may choose one of those alternatives. Once the user picks one of the listed alternatives, the system selects a pre-defined scenario whose type of attacker is the same as the picked alternative. All other fields of the specifications of the campaign (goal of the attacker, capabilities of the attacker, etc.) are automatically decided either by the selected pre-defined scenario or by internal algorithms of the penetration testing system, with no explicit input from the user. The internal algorithms may depend on the user-selected type of attacker and/or on pre-defined information items of the selected pre-defined scenario, and/or on a random process. For example, the capabilities of the attacker may be automatically defined based on the type of the attacker, while the lateral movement strategy of the attacker may be picked at random from a pre-defined list of available strategies.

This rigid campaign definition is not satisfactory for many users, who would like to have greater control over the specifications of the campaigns they run for testing their networked systems. Such control will allow them to test specific combinations of features of scenarios, which might be impossible to test with prior art systems.

SUMMARY OF EMBODIMENTS

A method of penetration testing of a networked system by a penetration testing system that is controlled by a user interface of a computing device so that a penetration testing campaign is executed according to one or more manually and explicitly-selected capabilities of an attacker of the penetration testing campaign, the method comprising: receiving, by the penetration testing system and via the user interface of the computing device, one or more manually-entered inputs, the one or more manually-entered inputs explicitly selecting one or more capabilities of the attacker of the penetration testing campaign; executing the penetration testing campaign, by the penetration testing system and according to the manually and explicitly-provided selection of the one or more capabilities of the attacker, so as to test the networked system; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the one or more capabilities of the attacker, the penetration testing system automatically computes and displays an explicit recommendation for selecting the one or more capabilities of the attacker.

In some embodiments, the received one or more manually-entered inputs comprises an explicit user approval of the explicit recommendation.

In some embodiments, further comprising: subsequent to the receiving by the penetration testing system of the one or more manually-entered inputs that explicitly select the one or more capabilities of the attacker, receiving, by the penetration testing system and via the user interface of the computing device, one or more additional manually-entered inputs, the one or more additional manually-entered inputs explicitly selecting a value for a second information item of the penetration testing campaign, wherein the second information item is not a capability of the attacker.

In some embodiments, the executing of the penetration testing campaign is performed using both (i) the manually and explicitly selected value for the second information item, and (ii) the manually and explicitly selected one or more capabilities of the attacker.

In some embodiments, further comprising: subsequent to the receiving by the penetration testing system of the one or more manually-entered inputs that explicitly select the one or more capabilities of the attacker, receiving, by the penetration testing system and via the user interface of the computing device, one or more additional manually-entered inputs, the one or more additional manually-entered inputs explicitly selecting a method of one of the manually and explicitly selected one or more capabilities of the attacker.

In some embodiments, the executing of the penetration testing campaign is performed using both (i) the manually and explicitly selected one or more capabilities of the attacker, and (ii) the manually and explicitly selected method.

A system for penetration testing of a networked system, the system comprising: a. an attacker-capability-selection user interface including one or more user interface components for manual and explicit selection of one or more capabilities of an attacker of a penetration testing campaign; b. a penetration-testing-campaign module programmed to perform the penetration testing campaign whose attacker has the one or more capabilities that are manually and explicitly selected via the attacker-capability-selection user interface; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting the one or more capabilities of the attacker, wherein the attacker-capability-selection user interface displays the explicit recommendation.

In some embodiments, the system is configured so that the manual and explicit selection of the one or more capabilities of the attacker includes a manual and explicit approval of the explicit recommendation.

In some embodiments, the system further comprises a second user interface including one or more user interface components for manual and explicit selection of a value of a second information item of the penetration testing campaign, the second information item being other than a capability of the attacker, wherein the system is configured to receive the manual and explicit selection of the value of the second information item subsequent to the manual and explicit selection of the one or more capabilities.

In some embodiments, the penetration-testing-campaign module is configured, subsequent to the manual and explicit selection of both (i) the one or more capabilities of the attacker and (ii) the value of the second information item, to perform the penetration testing campaign using both (i) the manually and explicitly selected one or more capabilities of the attacker and (ii) the manually and explicitly selected value of the second information item.

In some embodiments, the system further comprises a second user interface including one or more user interface components for manual and explicit selection of a method of one capability of the manually and explicitly selected one or more capabilities of the attacker of the penetration testing campaign, wherein the system is configured to receive the manual and explicit selection of the method of the one capability subsequent to the manual and explicit selection of the one capability.

In some embodiments, the penetration-testing-campaign module is configured, subsequent to the manual and explicit selection of both (i) the one or more capabilities of the attacker and (ii) the method of the one capability, to perform the penetration testing campaign using both (ii) the manually and explicitly selected one or more capabilities of the attacker and (ii) the manually and explicitly selected method of the one capability.

A method of penetration testing of a networked system by a penetration testing system that is controlled by a user interface of a computing device so that a penetration testing campaign is executed according to one or more manually and explicitly-selected traits of an attacker of the penetration testing campaign, the method comprising: receiving, by the penetration testing system and via the user interface of the computing device, one or more manually-entered inputs, the one or more manually-entered inputs explicitly selecting one or more traits of the attacker of the penetration testing campaign; executing the penetration testing campaign, by the penetration testing system and according to the manually and explicitly-provided selection of the one or more traits of the attacker, so as to test the networked system; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the one or more traits of the attacker, the penetration testing system automatically computes and displays an explicit recommendation for selecting the one or more traits of the attacker.

In some embodiments, the received one or more manually-entered inputs comprises an explicit user approval of the explicit recommendation.

In some embodiments, the method further comprising: subsequent to the receiving by the penetration testing system of the one or more manually-entered inputs that explicitly select the one or more traits of the attacker, receiving, by the penetration testing system and via the user interface of the computing device, one or more additional manually-entered inputs, the one or more additional manually-entered inputs explicitly selecting a value for a second information item of the penetration testing campaign, wherein the second information item is not a trait of the attacker.

In some embodiments, the executing of the penetration testing campaign is performed using both (i) the manually and explicitly selected value for the second information item, and (ii) the manually and explicitly selected one or more traits of the attacker.

A system for penetration testing of a networked system, the system comprising: a. an attacker-trait-selection user interface including one or more user interface components for manual and explicit selection of one or more traits of an attacker of a penetration testing campaign; b. a penetrationtesting-campaign module programmed to perform the penetration testing campaign whose attacker has the one or more traits that are manually and explicitly selected via the attacker-trait-selection user interface; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting the one or more traits of the attacker, wherein the attacker-trait-selection user interface displays the explicit recommendation.

In some embodiments, the system is configured so that the manual and explicit selection of the one or more traits of the attacker includes a manual and explicit approval of the explicit recommendation.

In some embodiments, the system further comprises a second user interface including one or more user interface components for manual and explicit selection of a value of a second information item of the penetration testing campaign, the second information item being other than a trait of the attacker, wherein the system is configured to receive the manual and explicit selection of the value of the second information item subsequent to the manual and explicit selection of the one or more traits.

In some embodiments, the penetration-testing-campaign module is configured, subsequent to the manual and explicit selection of both (i) the one or more traits of the attacker and (ii) the value of the second information item, to perform the penetration testing campaign using both (i) the manually and explicitly selected one or more traits of the attacker and (ii) the manually and explicitly selected value of the second information item.

A method of penetration testing of a networked system by a penetration testing system that is controlled by a user interface of a computing device so that a penetration testing campaign is executed according to a manual and explicit selecting of one or more network nodes of the networked system, the method comprising: receiving, by the penetration testing system and via the user interface of the computing device, one or more manually-entered inputs, the one or more manually-entered inputs explicitly selecting the one or more network nodes of the networked system, wherein at least one of the manually and explicitly selected nodes is other than the computing device; in accordance with the manual and explicit selecting of the network nodes, executing the penetration testing campaign by the penetration testing system so as to test the networked system, the penetration testing campaign being executed under the assumption that the manually and explicitly selected one or more network nodes of the networked system are already compromised at the time of beginning the penetration testing campaign; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the one or more network nodes of the networked system, the penetration testing system automatically computes and displays an explicit recommendation for selecting the one or more network nodes that are already compromised at the time of beginning the penetration testing campaign.

In some embodiments, the received one or more manually-entered inputs comprises an explicit user approval of the explicit recommendation.

In some embodiments, the method further comprising: subsequent to the receiving by the penetration testing system of the one or more manually-entered inputs that explicitly select the one or more network nodes of the networked system, receiving, by the penetration testing system and via the user interface of the computing device, one or more additional manually-entered inputs, the one or more additional manually-entered inputs explicitly selecting a value for a second information item of the penetration testing campaign, wherein the second information item is not a set of one or more network nodes that are assumed to be already compromised at the time of beginning the penetration testing campaign.

In some embodiments, the executing of the penetration testing campaign is performed using both (i) the manually and explicitly selected value for the second information item, and (ii) an assumption that the manually and explicitly selected one or more network nodes of the networked system are already compromised at the time of beginning the penetration testing campaign.

A system for penetration testing of a networked system, the system comprising: a. a network-nodes-selection user interface including one or more user interface components for manual and explicit selection of one or more network nodes, where the network-nodes-selection user interface resides in a computing device and at least one of the manually and explicitly selected one or more network nodes is other than the computing device; b. a penetration-testing-campaign module programmed to perform a penetration testing campaign under the assumption that the manually and explicitly selected one or more network nodes of the networked system are already compromised at the time of beginning the penetration testing campaign; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting the one or more network nodes, wherein the network-nodes-selection user interface displays the explicit recommendation.

In some embodiments, the system is configured so that the manual and explicit selection of the one or more network nodes includes a manual and explicit approval of the explicit recommendation.

In some embodiments, the system further comprises a second user interface including one or more user interface components for manual and explicit selection of a value of a second information item of the penetration testing campaign, the second information item being other than one or more network nodes, wherein the system is configured to receive the manual and explicit selection of the value of the second information item subsequent to the manual and explicit selection of the one or more network nodes.

In some embodiments, the penetration-testing-campaign module is configured, subsequent to the manual and explicit selection of both (i) the one or more network nodes and (ii) the value of the second information item, to perform the penetration testing campaign using both (i) the manually and explicitly selected one or more network nodes and (ii) the manually and explicitly selected value of the second information item.

A method of penetration testing of a networked system by a penetration testing system that is controlled by a user interface of a computing device so that a penetration testing campaign is executed according to a manually and explicitly provided node-selection condition, the method comprising: receiving, by the penetration testing system and via the user interface of the computing device, one or more manually-entered inputs, the one or more manually-entered inputs explicitly selecting a Boolean node-selection condition, the manually and explicitly selected node-selection condition defining a proper subset of network nodes of the networked system such that any network node of the networked system is a member of the subset of network nodes if and only if it satisfies the condition; in accordance with the manual and explicit selecting of the node-selection condition, executing the penetration testing campaign by the penetration testing system so as to test the networked system, the penetration testing campaign being executed under the assumption that every node of the subset of network nodes is already compromised at the time of beginning the penetration testing campaign; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the Boolean node-selection condition, the penetration testing system automatically computes and displays an explicit recommendation for selecting the Boolean node-selection condition.

In some embodiments, the received one or more manually-entered inputs for selecting the Boolean node-selection condition comprise an explicit user approval of the explicit recommendation.

In some embodiments, the method further comprising: subsequent to the receiving by the penetration testing system of the one or more manually-entered inputs that explicitly select the Boolean node-selection condition, receiving, by the penetration testing system and via the user interface of the computing device, one or more additional manually-entered inputs, the one or more additional manually-entered inputs explicitly selecting a value for a second information item of the penetration testing campaign, wherein the second information item is not a node-selection condition defining a subset of network nodes that are assumed to be already compromised at the time of beginning the penetration testing campaign.

In some embodiments, the executing of the penetration testing campaign is performed using both (i) the manually and explicitly selected value for the second information item, and (ii) an assumption that every node of the subset of network nodes is already compromised at the time of beginning the penetration testing campaign.

A system for penetration testing of a networked system, the system comprising: a. a node-selection-condition user interface including one or more user interface components for manually and explicitly selecting a Boolean node-selection condition defining a proper subset of network nodes of the networked system such that any network node of the networked system is a member of the subset of network nodes if and only if it satisfies the condition; b. a penetration-testing-campaign module programmed to perform a penetration testing campaign under the assumption that every network node of the subset of network nodes is already compromised at the time of beginning the penetration testing campaign; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting the Boolean node-selection condition, wherein the node-selection-condition user interface displays the explicit recommendation.

In some embodiments, the system is configured so that the manual and explicit selection of the Boolean node-selection condition includes a manual and explicit approval of the explicit recommendation.

In some embodiments, the system further comprises a second user interface including one or more user interface components for manual and explicit selection of a value of a second information item of the penetration testing campaign, the second information item being other than a Boolean node-selection condition, wherein the system is configured to receive the manual and explicit selection of the value of the second information item subsequent to the manual and explicit selection of the Boolean node-selection condition.

In some embodiments, the penetration-testing-campaign module is configured, subsequent to the manual and explicit selection of both (i) the Boolean node-selection condition and (ii) the value of the second information item, to perform the penetration testing campaign using both (i) the manually and explicitly selected Boolean node-selection condition and (ii) the manually and explicitly selected value of the second information item.

A method of penetration testing of a networked system by a penetration testing system that is controlled by a user interface of a computing device so that a penetration testing campaign is executed according to an automatic selecting of one or more network nodes of the networked system, the method comprising: determining, by the penetration testing system, at least one of (i) a type of an attacker of the penetration testing campaign, and (ii) whether one or more network nodes of the networked system satisfy a pre-defined Boolean condition; based on a result of the determining, automatically selecting, by the penetration testing system, the one or more network nodes of the networked system, wherein at least one of the automatically selected network nodes is other than the computing device; in accordance with the automatically selecting of the network nodes, executing the penetration testing campaign by the penetration testing system so as to test the networked system, the penetration testing campaign being executed under the assumption that the automatically selected one or more network nodes of the networked system are already compromised at the time of beginning the penetration testing campaign; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the determining comprises determining the type of the attacker of the penetration testing campaign.

In some embodiments, the determining of the type of the attacker comprises automatically determining the type of the attacker by the penetration testing system.

In some embodiments, the determining of the type of the attacker comprises receiving, via the user interface of the computing device, one or more manually-entered inputs that explicitly select the type of the attacker.

In some embodiments, the determining comprises automatically determining whether the one or more network nodes of the networked system satisfy the pre-defined Boolean condition.

In some embodiments, the pre-defined Boolean condition is satisfied for a given network node if and only if the given network node has a direct connection to a computing device that is outside the networked system.

In some embodiments, the pre-defined Boolean condition is satisfied for a given network node if and only if the given network node has an operating system that is a member of a pre-defined set of operating systems.

In some embodiments, the pre-defined Boolean condition is satisfied for a given network node if and only if the given network node has a cellular communication channel.

A system for penetration testing of a networked system that is controlled by a user interface of a computing device, the system comprising: a. a node-selection module configured to: determine at least one of (i) a type of an attacker of a penetration testing campaign, and (ii) whether one or more network nodes of the networked system satisfy a pre-defined Boolean condition; and based on a result of the determining, automatically select one or more network nodes of the networked system, wherein at least one of the automatically selected network nodes is other than the computing device; b. a penetration-testing-campaign module programmed to perform the penetration testing campaign under the assumption that the automatically selected one or more network nodes of the networked system are already compromised at the time of beginning the penetration testing campaign; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the node-selection module is configured to determine the type of the attacker of the penetration testing campaign.

In some embodiments, the node-selection module is configured to automatically determine the type of the attacker of the penetration testing campaign.

In some embodiments, the node-selection module is configured to determine the type of the attacker by receiving, via the user interface of the computing device, one or more manually-entered inputs that explicitly select the type of the attacker.

In some embodiments, the node-selection module is configured to automatically determine whether the one or more network nodes of the networked system satisfy the pre-defined Boolean condition.

In some embodiments, the pre-defined Boolean condition is satisfied for a given network node if and only if the given network node has a direct connection to a computing device that is outside the networked system.

In some embodiments, the pre-defined Boolean condition is satisfied for a given network node if and only if the given network node has an operating system that is a member of a pre-defined set of operating systems.

In some embodiments, the pre-defined Boolean condition is satisfied for a given network node if and only if the given network node has a cellular communication channel.

A method of penetration testing of a networked system by a penetration testing system that is controlled by a user interface of a computing device so that a penetration testing campaign is executed according to one or more manually and explicitly-selected goals of an attacker of the penetration testing campaign, the method comprising: receiving, by the penetration testing system and via the user interface of the computing device, one or more manually-entered inputs, the one or more manually-entered inputs explicitly selecting one or more goals of the attacker of the penetration testing campaign, wherein at least one goal of the one or more goals satisfies at least one condition selected from the group consisting of: i. the at least one goal is a resource-specific goal; ii. the at least one goal is a file-specific goal; iii. the at least one goal is a node-count-maximizing goal; iv. the at least one goal is a file-count-maximizing goal; v. the at least one goal is an encryption-related goal; vi. the at least one goal is a file-exporting goal; vii. the at least one goal is a file-size-related goal; viii. the at least one goal is a file-type-related goal; ix. the at least one goal is a file-damage-related goal; and x. the at least one goal is a node-condition-based goal; executing the penetration testing campaign, by the penetration testing system and according to the manually and explicitly-provided selection of the one or more goals of the attacker, so as to test the networked system; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the at least one goal is a resource-specific goal.

In some embodiments, the at least one goal is a file-specific goal.

In some embodiments, the at least one goal is a node-count-maximizing goal.

In some embodiments, the at least one goal is a file-count-maximizing goal.

In some embodiments, the at least one goal is an encryption-related goal.

In some embodiments, the at least one goal is a file-exporting goal.

In some embodiments, the at least one goal is a file-size-related goal.

In some embodiments, the at least one goal is a file-type-related goal.

In some embodiments, the at least one goal is a file-damage-related goal.

In some embodiments, the at least one goal is a node-condition-based goal.

In some embodiments, the method is carried out so that before receiving the one or more manually-entered inputs that explicitly select the one or more goals of the attacker, the penetration testing system automatically computes and displays an explicit recommendation for selecting the one or more goals of the attacker.

In some embodiments, the received one or more manually-entered inputs comprises an explicit user approval of the explicit recommendation.

In some embodiments, the method further comprising: subsequent to the receiving by the penetration testing system of the one or more manually-entered inputs that explicitly select the one or more goals of the attacker, receiving, by the penetration testing system and via the user interface of the computing device, one or more additional manually-entered inputs, the one or more additional manually-entered inputs explicitly selecting a value for a second information item of the campaign of the penetration testing system, wherein the second information item is not a goal of the attacker.

In some embodiments, the executing of the penetration testing campaign is performed using both (i) the manually and explicitly selected value for the second information item, and (ii) the manually and explicitly selected one or more goals of the attacker.

A system for penetration testing of a networked system, the system comprising: a. a goals-selection user interface including one or more user interface components for manual and explicit selection of one or more goals of an attacker of a penetration testing campaign, wherein at least one goal of the one or more goals satisfies at least one condition selected from the group consisting of: i. the at least one goal is a resource-specific goal; ii. the at least one goal is a file-specific goal; iii. the at least one goal is a node-count-maximizing goal; iv. the at least one goal is a file-count-maximizing goal; v. the at least one goal is an encryption-related goal; vi. the at least one goal is a file-exporting goal; vii. the at least one goal is a file-size-related goal; viii. the at least one goal is a file-type-related goal; ix. the at least one goal is a file-damage-related goal; and x. the at least one goal is a node-condition-based goal; b. a penetration-testing-campaign module programmed to perform the penetration testing campaign whose attacker has the one or more goals that are manually and explicitly selected via the goals-selection user interface; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the at least one goal is a resource-specific goal.

In some embodiments, the at least one goal is a file-specific goal.

In some embodiments, the at least one goal is a node-count-maximizing goal.

In some embodiments, the at least one goal is a file-count-maximizing goal.

In some embodiments, the at least one goal is an encryption-related goal.

In some embodiments, the at least one goal is a file-exporting goal.

In some embodiments, the at least one goal is a file-size-related goal.

In some embodiments, the at least one goal is a file-type-related goal.

In some embodiments, the at least one goal is a file-damage-related goal.

In some embodiments, the at least one goal is a node-condition-based goal.

In some embodiments, the system further comprises a recommendation module configured to automatically compute an explicit recommendation for selecting the one or more goals of the attacker, wherein the goals-selection user interface displays the explicit recommendation.

In some embodiments, the system is configured so that the manual and explicit selection of the one or more goals of the attacker includes a manual and explicit approval of the explicit recommendation.

In some embodiments, the system further comprises a second user interface including one or more user interface components for manual and explicit selection of a value of a second information item of the penetration testing campaign, the second information item being other than a goal of the attacker, wherein the system is configured to receive the manual and explicit selection of the value of the second information item subsequent to the manual and explicit selection of the one or more goals.

In some embodiments, the penetration-testing-campaign module is configured, subsequent to the manual and explicit selection of both (i) the one or more goals of the attacker and (ii) the value of the second information item, to perform the penetration testing campaign using both (i) the manually and explicitly selected one or more goals of the attacker and (ii) the manually and explicitly selected value of the second information item.

A method of penetration testing of a networked system by a penetration testing system that is controlled by a user interface of a computing device so that a penetration testing campaign is executed according to an automatic selecting of one or more goals of an attacker of the penetration testing campaign, the method comprising: a. determining, by the penetration testing system, a type of the attacker of the penetration testing campaign; b. automatically selecting, by the penetration testing system and according to the type of the attacker of the penetration testing campaign, one or more goals of the attacker; c. executing the penetration testing campaign, by the penetration testing system and according to i. the type of the attacker of the penetration testing campaign, and ii. the automatically selected one or more goals, so as to test the networked system; d. reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the determining of the type of the attacker comprises automatically determining the type of the attacker by the penetration testing system.

In some embodiments, the determining of the type of the attacker comprises receiving, via the user interface of the computing device, one or more manually-entered inputs that explicitly select the type of the attacker.

In some embodiments, at least one goal of the one or more goals satisfies at least one condition selected from the group consisting of: i. the at least one goal is a resource-specific goal; ii. the at least one goal is a file-specific goal; iii. the at least one goal is a node-count-maximizing goal; iv. the at least one goal is a file-count-maximizing goal; v. the at least one goal is an encryption-related goal; vi. the at least one goal is a file-exporting goal; vii. the at least one goal is a file-size-related goal; viii. the at least one goal is a file-type-related goal; ix. the at least one goal is a file-damage-related goal; and x. the at least one goal is a node-condition-based goal.

In some embodiments, the automatic selecting of one or more goals includes performing at least one of a. in response to a determination that the attacker type is state-sponsored, automatically selecting a goal to export as many files that are of a file type that may contain drawings as possible; b. in response to a determination that the attacker type is cyber-criminal, automatically selecting a goal to export as many Excel files as possible.

A system for penetration testing of a networked system, the system comprising: a. a goals-selection module configured to: i. determine a type of an attacker of a penetration testing campaign; and ii. based on a result of the determining, automatically select one or more goals of the attacker of the penetration testing campaign; b. a penetration-testing-campaign module programmed to perform the penetration testing campaign according to: i. the type of the attacker of the penetration testing campaign, and ii. the automatically selected one or more goals; c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the goals-selection module is configured to automatically determine the type of the attacker of the penetration testing campaign.

In some embodiments, the goals-selection module is configured to determine the type of the attacker by receiving, via a user interface of a computing device, one or more manually-entered inputs that explicitly select the type of the attacker.

In some embodiments, at least one goal of the one or more goals satisfies at least one condition selected from the group consisting of: i. the at least one goal is a resource-specific goal; ii. the at least one goal is a file-specific goal; iii. the at least one goal is a node-count-maximizing goal; iv. the at least one goal is a file-count-maximizing goal; v. the at least one goal is an encryption-related goal; vi. the at least one goal is a file-exporting goal; vii. the at least one goal is a file-size-related goal; viii. the at least one goal is a file-type-related goal; ix. the at least one goal is a file-damage-related goal; and x. the at least one goal is a node-condition-based goal.

In some embodiments, the goals-selection module is configured to perform at least one of the following: a. in response to a determination that the attacker type is state-sponsored, a goal to export as many files that are of a file type that may contain drawings as possible is automatically selected; b. in response to a determination that the attacker type is cyber-criminal, a goal to export as many Excel files as possible is automatically selected.

A method of penetration testing of a networked system by a penetration testing system that is controlled by a user interface of a computing device so that a penetration testing campaign is executed according to a manually and explicitly-selected lateral movement strategy of an attacker of the penetration testing campaign, the method comprising: receiving, by the penetration testing system and via the user interface of the computing device, one or more manually-entered inputs, the one or more manually-entered inputs explicitly selecting the lateral movement strategy of the attacker of the penetration testing campaign; executing the penetration testing campaign, by the penetration testing system and according to the manually and explicitly-provided lateral movement strategy of the attacker, so as to test the networked system; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the lateral movement strategy of the attacker, the penetration testing system automatically computes and displays an explicit recommendation for selecting the lateral movement strategy of the attacker.

In some embodiments, the received one or more manually-entered inputs comprises an explicit user approval of the explicit recommendation.

In some embodiments, the method further comprising: subsequent to the receiving by the penetration testing system of the one or more manually-entered inputs that explicitly select the lateral movement strategy of the attacker, receiving, by the penetration testing system and via the user interface of the computing device, one or more additional manually-entered inputs, the one or more additional manually-entered inputs explicitly selecting a value for a second information item of the penetration testing campaign, wherein the second information item is not a lateral movement strategy of the attacker.

In some embodiments, the executing of the penetration testing campaign is performed using both (i) the manually and explicitly selected value for the second information item, and (ii) the manually and explicitly selected lateral movement strategy of the attacker.

A system for penetration testing of a networked system, the system comprising: a. a lateral-movement-strategy-selection user interface including one or more user interface components for explicit and manual selection of a lateral movement strategy of an attacker of a penetration testing campaign; b. a penetration-testing-campaign module programmed to perform the penetration testing campaign according to the lateral movement strategy that is manually and explicitly selected via the lateral-movement-strategy-selection user interface; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting a lateral movement strategy of the attacker, wherein the lateral-movement-strategy-selection user interface displays the explicit recommendation.

In some embodiments, the system is configured so that the manual and explicit selection of the lateral movement strategy of the attacker includes a manual and explicit approval of the explicit recommendation.

In some embodiments, the system further comprises a second user interface including one or more user interface components for manual and explicit selection of a value of a second information item of the penetration testing campaign, the second information item being other than a lateral movement strategy of the attacker, wherein the system is configured to receive the manual and explicit selection of the value of the second information item subsequent to the manual and explicit selection of the lateral movement strategy.

In some embodiments, the penetration-testing-campaign module is configured, subsequent to the manual and explicit selection of both (i) the lateral movement strategy of the attacker and (ii) the value of the second information item, to perform the penetration testing campaign using both (i) the manually and explicitly selected lateral movement strategy of the attacker and (ii) the manually and explicitly selected value of the second information item.

A method of penetration testing of a networked system by a penetration testing system that is controlled by a user interface of a computing device so that a penetration testing campaign is executed according to an automatic selecting of a lateral movement strategy of an attacker of the penetration testing campaign, the method comprising: a. determining, by the penetration testing system, at least one of (i) a type of the attacker of the penetration testing campaign and (ii) one or more goals of the attacker of the penetration testing campaign; b. based on a result of the determining, automatically selecting by the penetration testing system a lateral movement strategy of the attacker of the penetration testing campaign; c. executing the penetration testing campaign, by the penetration testing system and according to i. the at least one of the type of the attacker and the one or more goals of the attacker, and ii. the automatically selected lateral movement strategy of the attacker, so as to test the networked system; d. reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the determining comprises determining the type of the attacker of the penetration testing campaign.

In some embodiments, the determining of the type of the attacker comprises automatically determining the type of the attacker by the penetration testing system.

In some embodiments, the determining of the type of the attacker comprises receiving, via the user interface of the computing device, one or more manually-entered inputs that explicitly select the type of the attacker.

In some embodiments, the determining comprises determining the one or more goals of the attacker of the penetration testing campaign.

In some embodiments, the determining of the one or more goals of the attacker comprises automatically determining the one or more goals of the attacker by the penetration testing system.

In some embodiments, the determining of the one or more goals of the attacker comprises receiving, via the user interface of the computing device, one or more manually-entered inputs that explicitly select the one or more goals of the attacker.

A system for penetration testing of a networked system, the system comprising: a. a lateral-movement-strategy-selection module configured to: determine at least one of (i) a type of the attacker of the penetration testing campaign and (ii) one or more goals of the attacker of the penetration testing campaign; based on a result of the determining, automatically select a lateral movement strategy of the attacker of the penetration testing campaign; b. a penetration-testing-campaign module programmed to perform the penetration testing campaign according to the automatically selected lateral movement strategy; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the lateral-movement-strategy-selection module is configured to determine the type of the attacker of the penetration testing campaign.

In some embodiments, the lateral-movement-strategy-selection module is configured to automatically determine the type of the attacker of the penetration testing campaign.

In some embodiments, the lateral-movement-strategy-selection module is configured to determine the type of the attacker by receiving, via a user interface of a computing device, one or more manually-entered inputs that explicitly select the type of the attacker.

In some embodiments, the lateral-movement-strategy-selection module is configured to determine the one or more goals of the attacker of the penetration testing campaign.

In some embodiments, the lateral-movement-strategy-selection module is configured to automatically determine the one or more goals of the attacker of the penetration testing campaign.

In some embodiments, the lateral-movement-strategy-selection module is configured to determine the one or more goals of the attacker by receiving, via a user interface of a computing device, one or more manually-entered inputs that explicitly select the one or more goals of the attacker.

A method of penetration testing of a networked system by a penetration testing system that is controlled by a user interface of a computing device so that a penetration testing campaign is executed according to manually and explicitly-selected sensitivity to detection of an attacker of the penetration testing campaign, the method comprising: receiving, by the penetration testing system and via the user interface of the computing device, one or more manually-entered inputs, the one or more manually-entered inputs explicitly selecting a level of sensitivity to detection of the attacker of the penetration testing campaign; executing the penetration testing campaign, by the penetration testing system and according to the manually and explicitly-provided selection of the level of sensitivity to detection of the attacker, so as to test the networked system; and reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting a report describing the at least one security vulnerability.

In some embodiments, the method is carried out so that before receiving the one or more manually-entered inputs that explicitly select the level of sensitivity to detection of the attacker, the penetration testing system automatically computes and displays an explicit recommendation for selecting the level of sensitivity to detection of the attacker.

In some embodiments, the received one or more manually-entered inputs comprises an explicit user approval of the explicit recommendation.

In some embodiments, further comprising: subsequent to the receiving by the penetration testing system of the one or more manually-entered inputs that explicitly select the level of sensitivity to detection of the attacker, receiving, by the penetration testing system and via the user interface of the computing device, one or more additional manually-entered inputs, the one or more additional manually-entered inputs explicitly selecting a value for a second information item of the penetration testing campaign, wherein the second information item is not a level of sensitivity to detection of the attacker.

In some embodiments, the executing of the penetration testing campaign is performed using both (i) the manually and explicitly selected value for the second information item, and (ii) the manually and explicitly selected level of sensitivity to detection of the attacker.

In some embodiments, the manual and explicit selection of the level of sensitivity to detection of the attacker is a selection between two pre-defined alternative levels.

In some embodiments, the manual and explicit selection of the level of sensitivity to detection of the attacker is a selection from a list of multiple pre-defined levels, the list containing at least three levels.

In some embodiments, the manual and explicit selection of the level of sensitivity to detection of the attacker is a selection in which any value from a pre-defined numerical interval may be selected.

A system for penetration testing of a networked system, the system comprising: a. an attacker-sensitivity-selection user interface including one or more user interface components for manual and explicit selection of a level of sensitivity to detection of an attacker of a penetration testing campaign; b. a penetration-testing-campaign module programmed to perform the penetration testing campaign whose attacker has the level of sensitivity to detection that is manually and explicitly selected via the attacker-sensitivity-selection user interface; and c. a reporting module for reporting at least one security vulnerability determined to exist in the networked system according to results of the penetration testing campaign that is performed by the penetration-testing-campaign module, wherein the reporting module is configured to report the at least one security vulnerability by performing at least one of (i) causing a display device to display a report describing the at least one security vulnerability, and (ii) electronically transmitting a report describing the at least one security vulnerability.

In some embodiments, the system further comprises a recommendation module configured to automatically compute an explicit recommendation for selecting the level of sensitivity to detection of the attacker, wherein the attacker-sensitivity-selection user interface displays the explicit recommendation.

In some embodiments, the system is configured so that the manual and explicit selection of the level of sensitivity to detection of the attacker includes a manual and explicit approval of the explicit recommendation.

In some embodiments, the system further comprises a second user interface including one or more user interface components for manual and explicit selection of a value of a second information item of the penetration testing campaign, the second information item being other than a level of sensitivity to detection of the attacker, wherein the system is configured to receive the manual and explicit selection of the value of the second information item subsequent to the manual and explicit selection of the level of sensitivity to detection.

In some embodiments, the penetration-testing-campaign module is configured, subsequent to the manual and explicit selection of both (i) the level of sensitivity to detection of the attacker and (ii) the value of the second information item, to perform the penetration testing campaign using both (i) the manually and explicitly selected level of sensitivity to detection of the attacker and (ii) the manually and explicitly selected value of the second information item.

In some embodiments, the manual and explicit selection of the level of sensitivity to detection of the attacker is a selection between two pre-defined alternative levels.

In some embodiments, the manual and explicit selection of the level of sensitivity to detection of the attacker is a selection from a list of multiple pre-defined levels, the list containing at least three levels.

In some embodiments, the manual and explicit selection of the level of sensitivity to detection of the attacker is a selection in which any value from a pre-defined numerical interval may be selected.

BRIEF DESCRIPTION OF THE DRAWINGS

FIGS. 8A-8B, 10A-10B, 13A-13B, 15A-15B, 17A-17B, 19A-19B, 22A-22B illustrate user engagements of user interfaces according to embodiments of the invention.

FIGS. 6, 9, 11A-11C, 12, 14, 16, 18, 20, 21, 23 and 26-31 are flow charts of methods of penetration testing of a networked system according to different embodiments of the invention.

DETAILED DESCRIPTION OF EMBODIMENTS

This disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

Figure 1A:
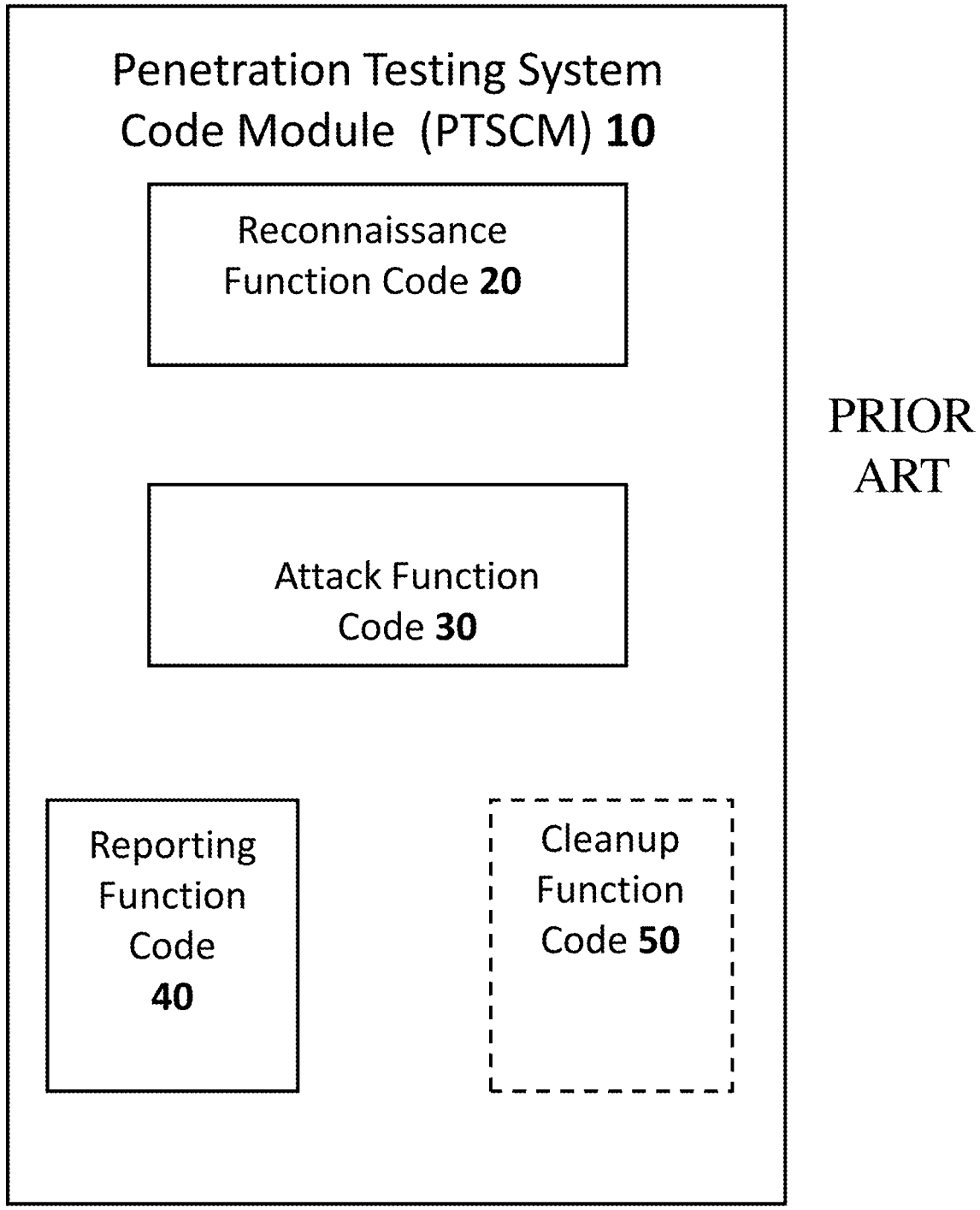
FIG. 1A (PRIOR ART) is a block diagram of code modules of a typical penetration testing system.
Figure 1B:
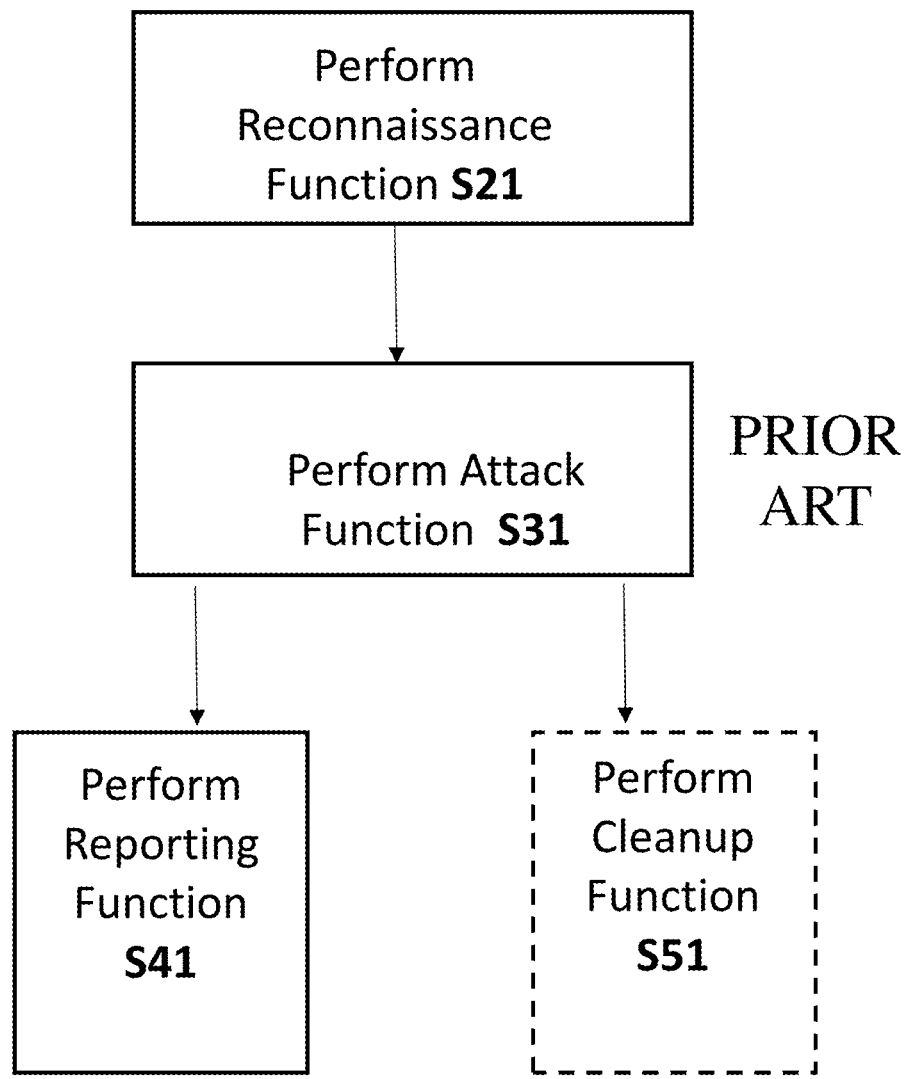
FIG. 1B (PRIOR ART) is a related flow-chart.
Figure 2:
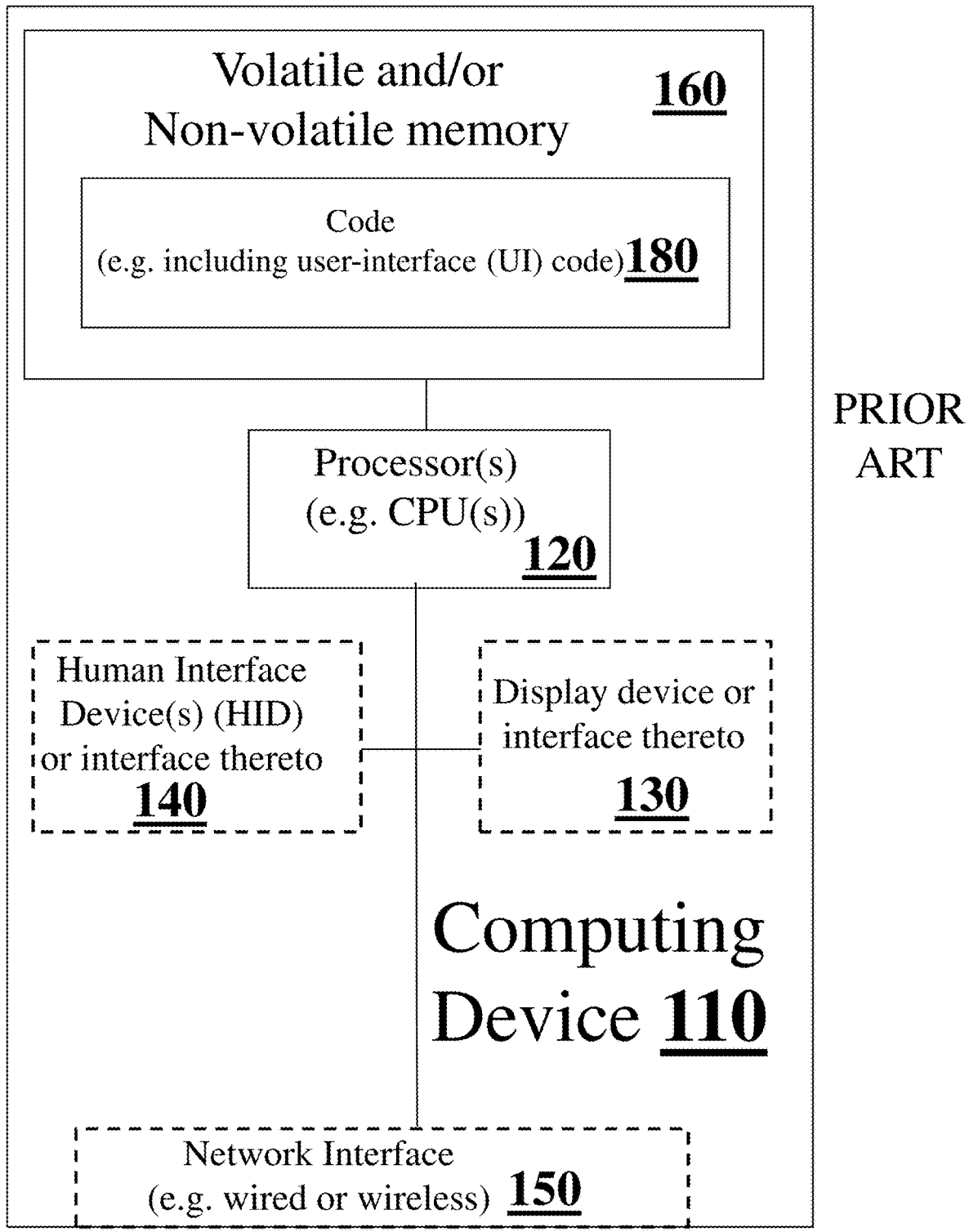
FIG. 2 (PRIOR ART) illustrates a prior art computing device.
Figure 3:
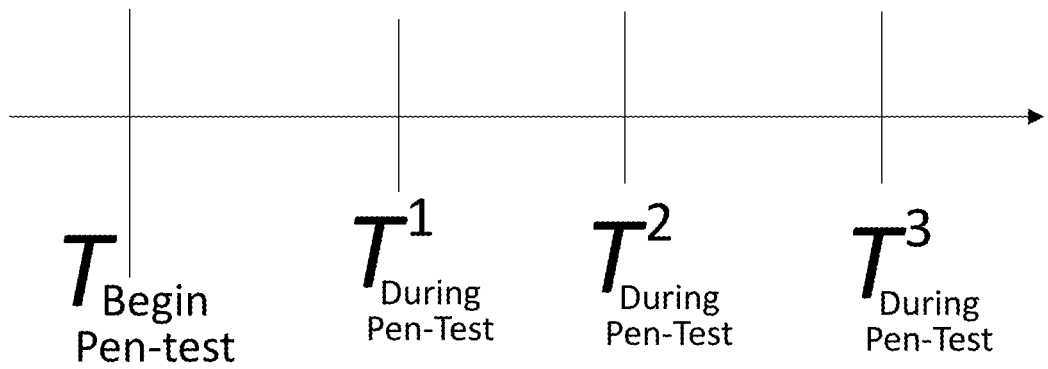
FIG. 3 (PRIOR ART) illustrates a timeline related to the prior-art example of FIGS. 4A-4D.
Figure 4A:
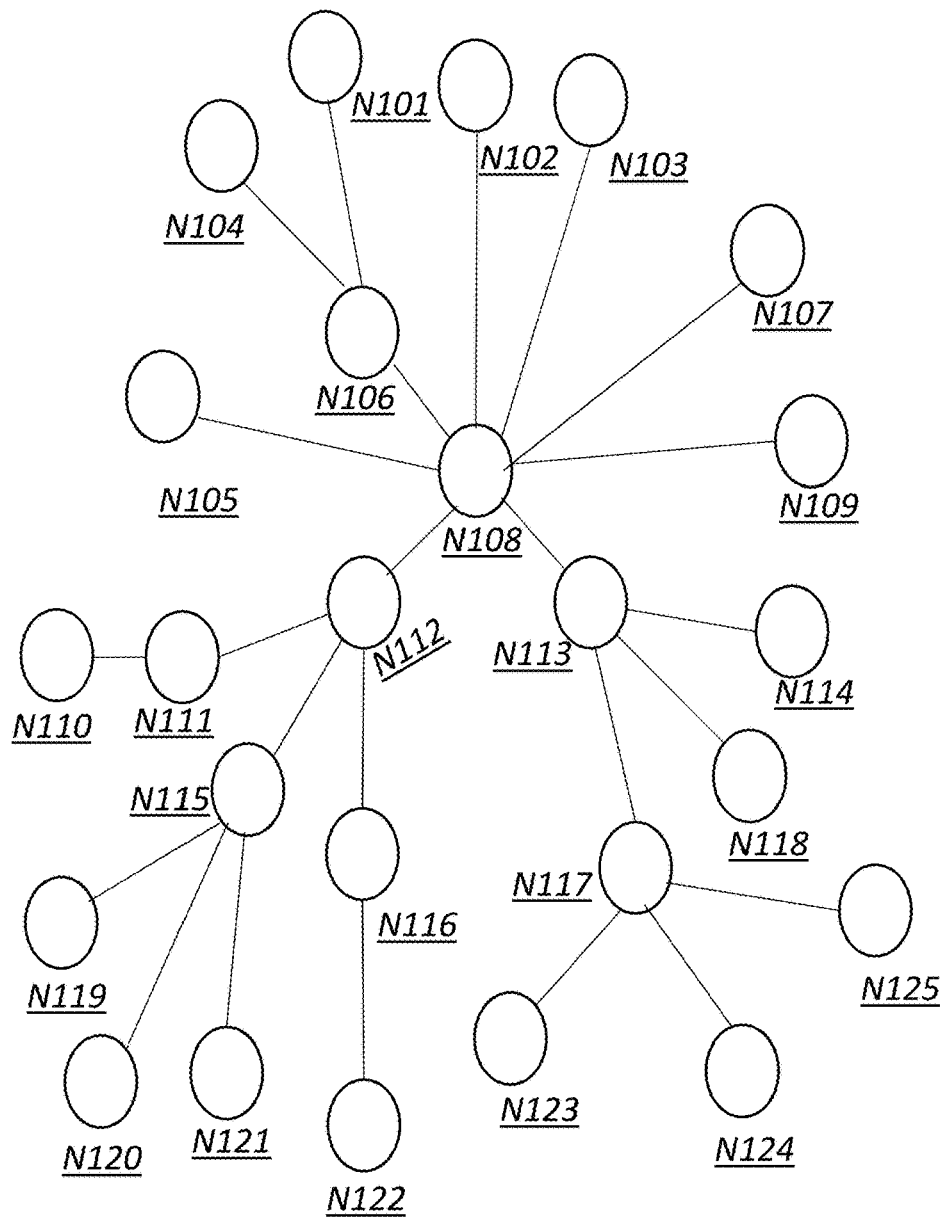
FIGS. 4A-4D (PRIOR ART) illustrate a prior art example where network-nodes are compromised during a penetration test.

Embodiments of the invention relate to penetration testing of networked systems, such as that illustrated in FIG. 4A.

Penetration testing systems test networked systems. For example, the networked system comprises a plurality of network nodes (referred to simply as "nodes") in communication with each other—e.g. see FIG. 4A.

In prior art penetration testing systems (e.g. see the example discussed above with reference to FIGS. 3 and 4A-4D), a penetration testing campaign performs or emulates an attack of a potential attacker, starting from an initial state in which no network node of the tested networked system is compromised. The attacker is assumed to start by compromising a first network node (e.g. node N122 of FIG. 4B), then to take advantage of the already-compromised first node and compromise a second network node, then to take advantage of the already-compromised first and second nodes and compromise a third network node, and so on.

However, in some cases this way of operation does not satisfy the user's needs. The user may want to learn what might an attacker be able to achieve if s/he starts her/his attack with one or more specific nodes already under her/his control. This may be useful, for example, when evaluating the damages that might be incurred if the attacker is an employee of the organization owning the tested networked system that already controls his own network node. Another example is when knowing in advance that one or more given nodes are prone to being compromised (e.g. because they are accessible by the public) and evaluating the risks to the rest of the networked system after the one or more given nodes are compromised.

Therefore, it is useful to let a user of a penetration testing system to select one or more network nodes that will be assumed to be already compromised and under the control of the attacker when the penetration testing campaign starts. Such nodes are called herein "initially-compromised" or "initially-red" network nodes. When initially-compromised nodes are selected for a penetration testing campaign, these nodes are the only nodes that are assumed to be already compromised when the campaign starts. In other words, a node that is not selected to be an initially-compromised node for a campaign is assumed to be non-compromised when the campaign starts. An example related to initially-compromised nodes is presented below with reference to FIGS. 5A-5D.

In contrast to conventional penetration testing systems (i.e. where penetration testing campaigns are performed from an initial state in which no network node of the tested networked system is compromised), in a first embodiment of the invention the user manually and explicitly selects one or more nodes of the tested networked system as initially-compromised nodes. The skilled artisan is directed to FIGS. 6-7 and 8A-8B. The term 'explicitly selecting' is defined below—see "lll" of the Definitions Section.

In contrast to conventional penetration testing systems (i.e. where penetration testing campaigns are performed from an initial state in which no network node of the tested networked system is compromised), in a second embodiment of the invention, before penetration testing, initially-compromised nodes are defined by the user as follows: the user manually and explicitly selects a Boolean node-selection condition defining which nodes or nodes are initially compromised. Any network node of the networked system that satisfies the Boolean condition is considered initially compromised. The skilled artisan is directed to FIGS. 9 and 10A-10B.

In contrast to conventional penetration testing systems (i.e. where penetration testing campaigns are performed from an initial state in which no network node of the tested networked system is compromised), in a third embodiment of the invention, the penetration testing system automatically selects one or more of the nodes that is to be considered initially-compromised. This selection may be performed, for example, according to features discussed with reference to FIGS. 11A-11C. The term 'automatically selecting' is defined below—see "mmm" of the Definitions Section.

It is appreciated that the first, second and/or third embodiments may be combined in any manner.

A Discussion of the Example of FIGS. 5A-5D

Before discussing the first, second and third embodiments, an example related to initially-compromised nodes in general is now discussed with reference to FIGS. 5A-5D.

Figure 4B:
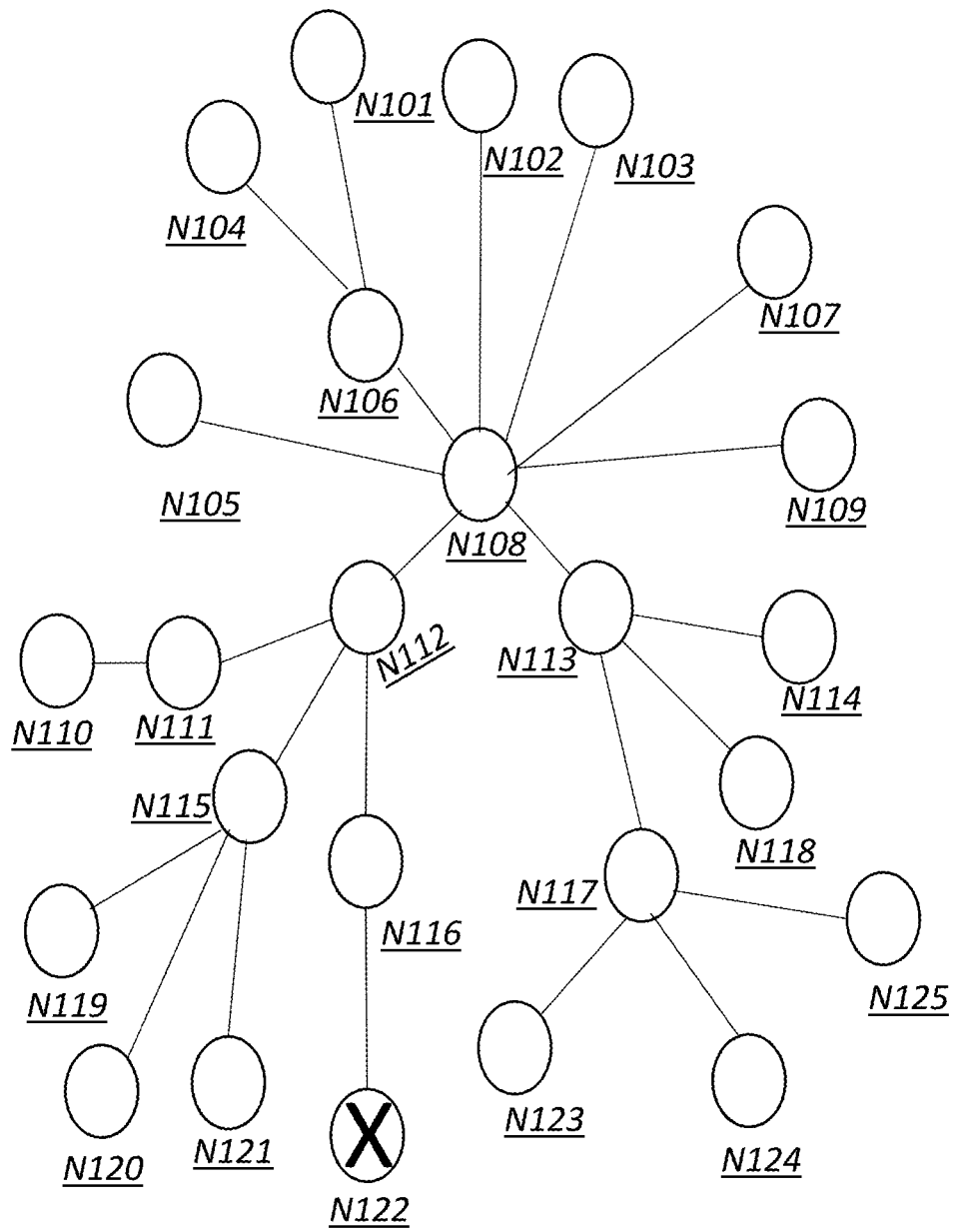
Figure 4C:
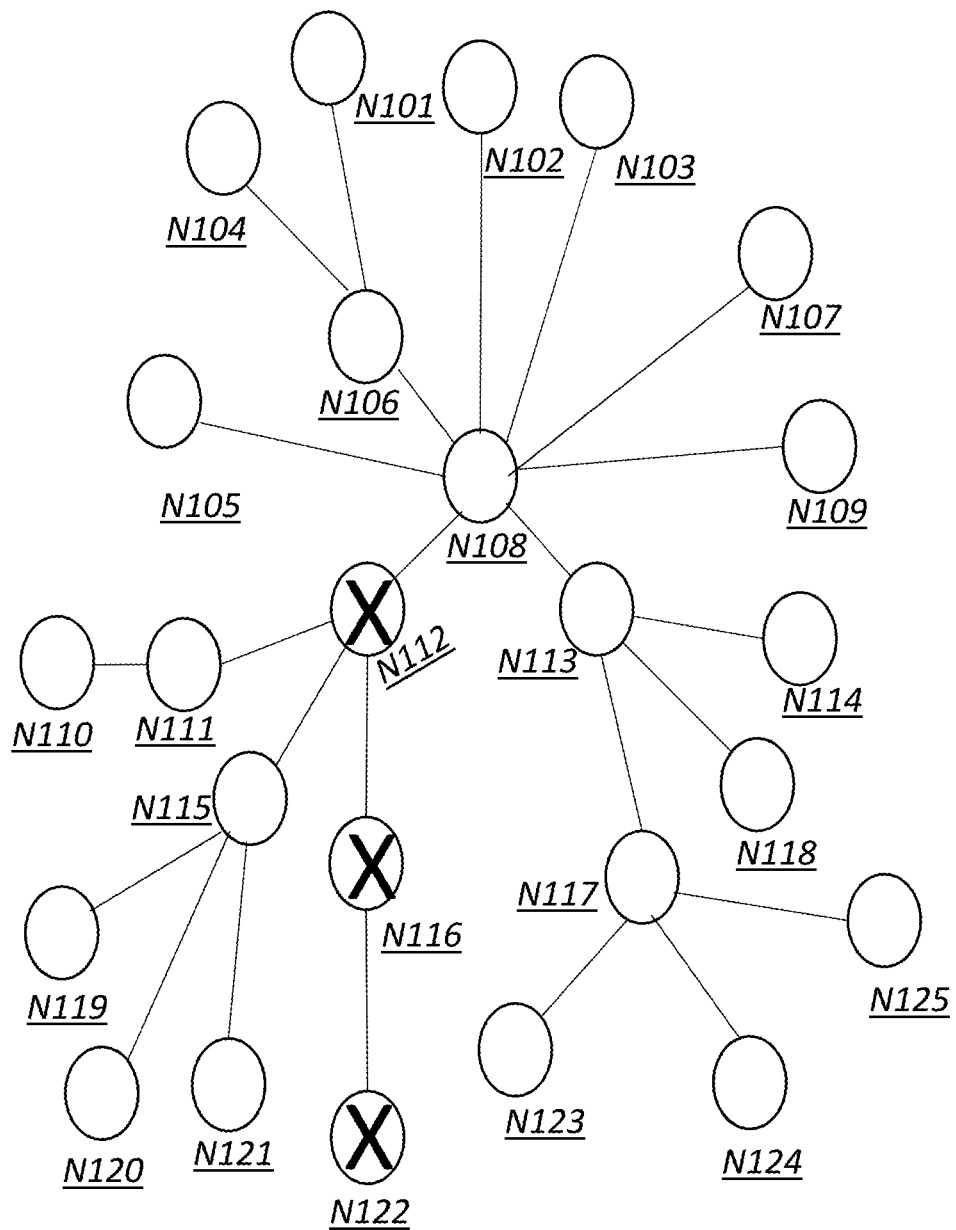
Figure 4D:
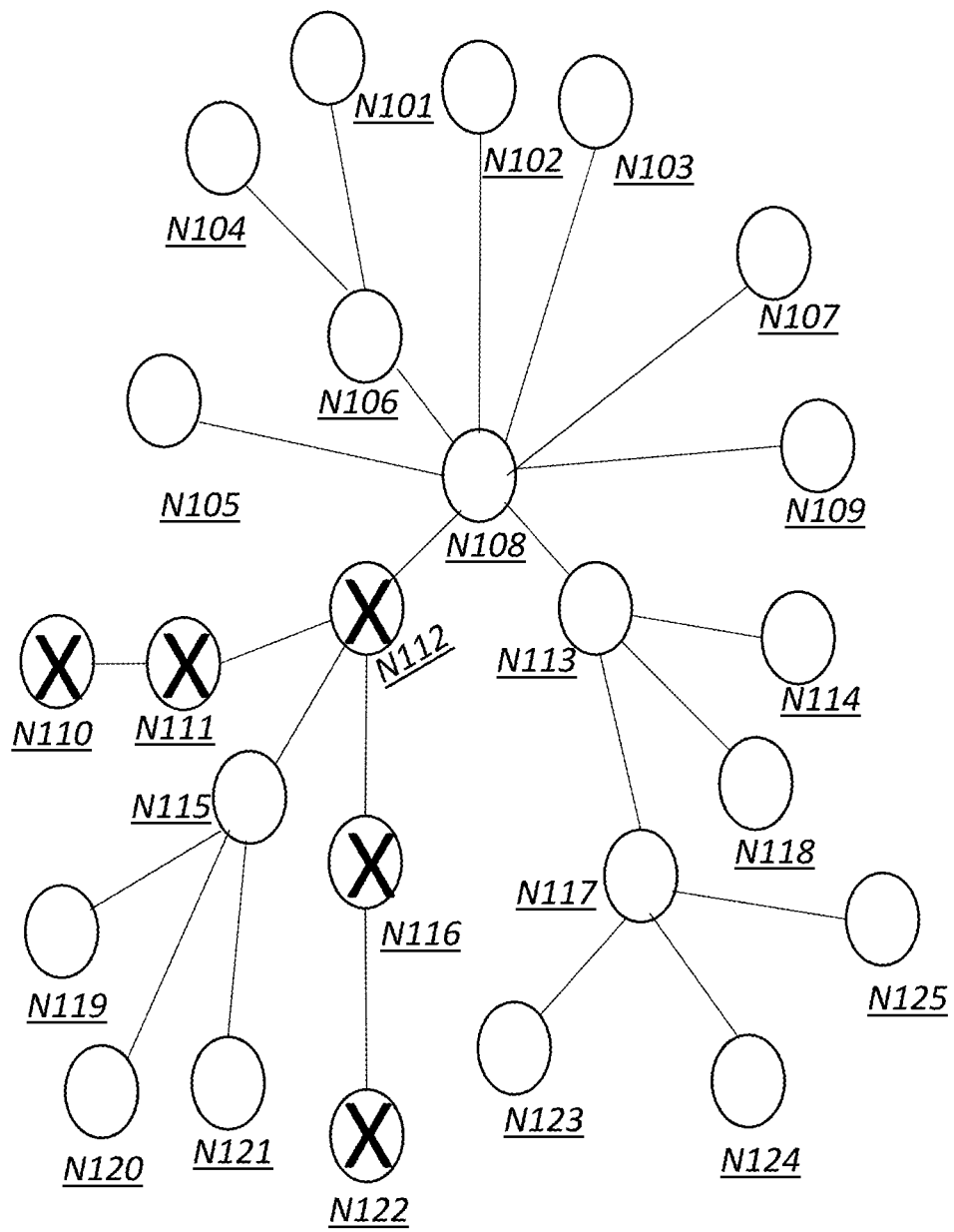

In contrast to the user-case of FIGS. 4A-4B where a campaign emulates an attack of a potential attacker, starting from an initial state in which no network node of the tested networked system is compromised, in the example of FIGS. 5A-5D, it is assumed that three nodes are initially-compromised: nodes N110, N108 and N117—this is designated by the 'brick' pattern.

Figure 5A:
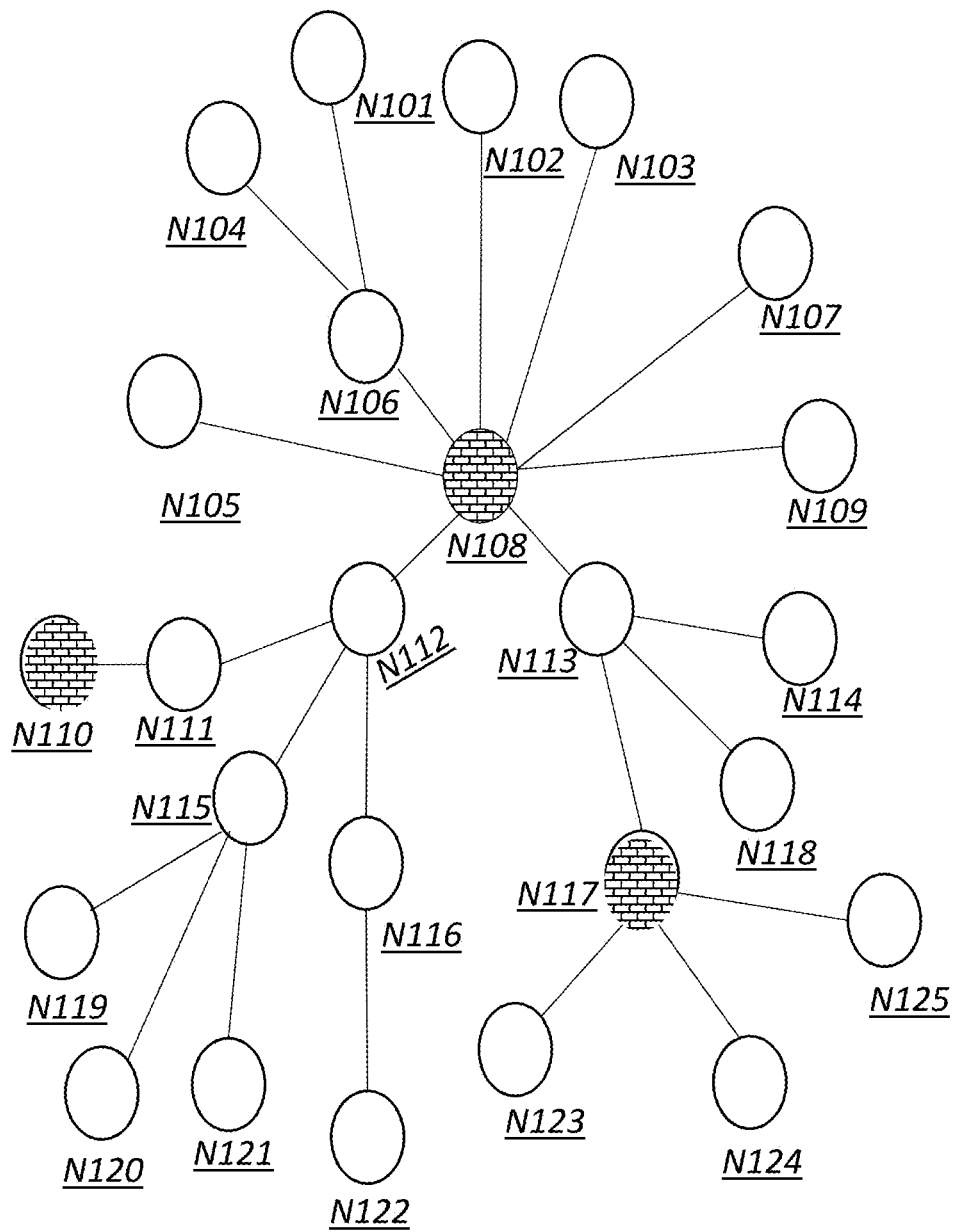
FIGS. 5A-5D illustrate an example where network-nodes are compromised during a penetration test that is set-up in according to some embodiments of the invention.
Figure 5B:
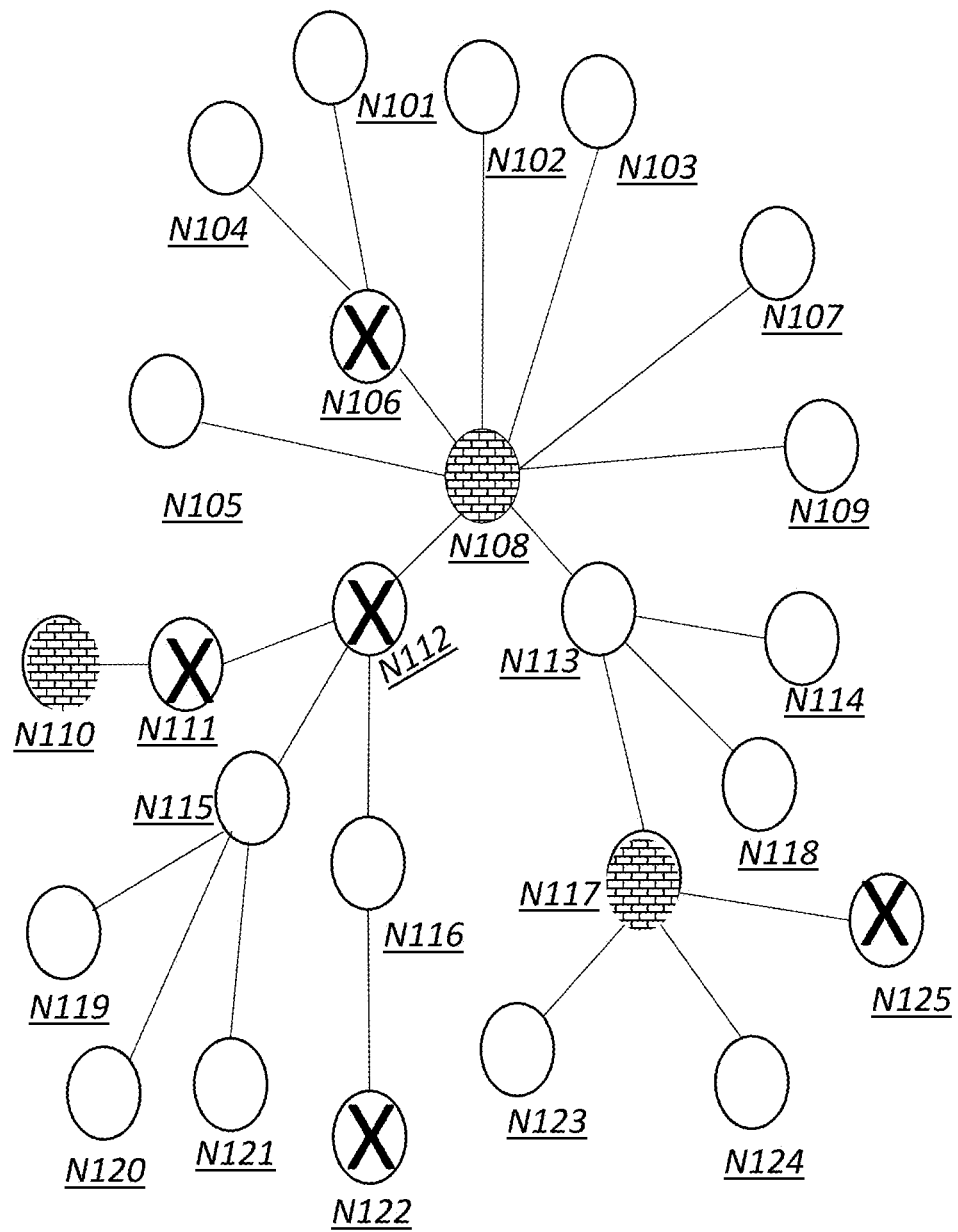
Figure 5C:
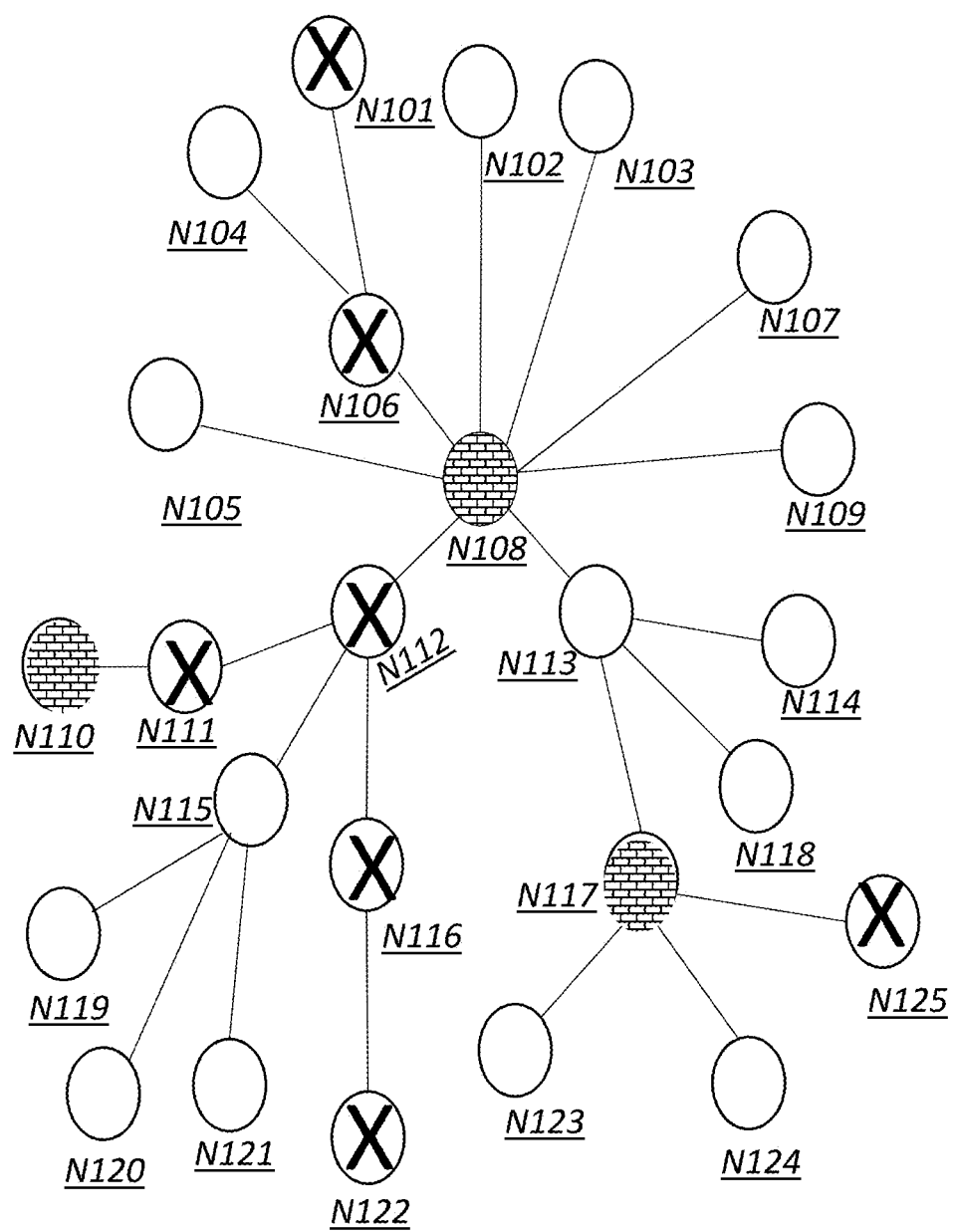
Figure 5D:
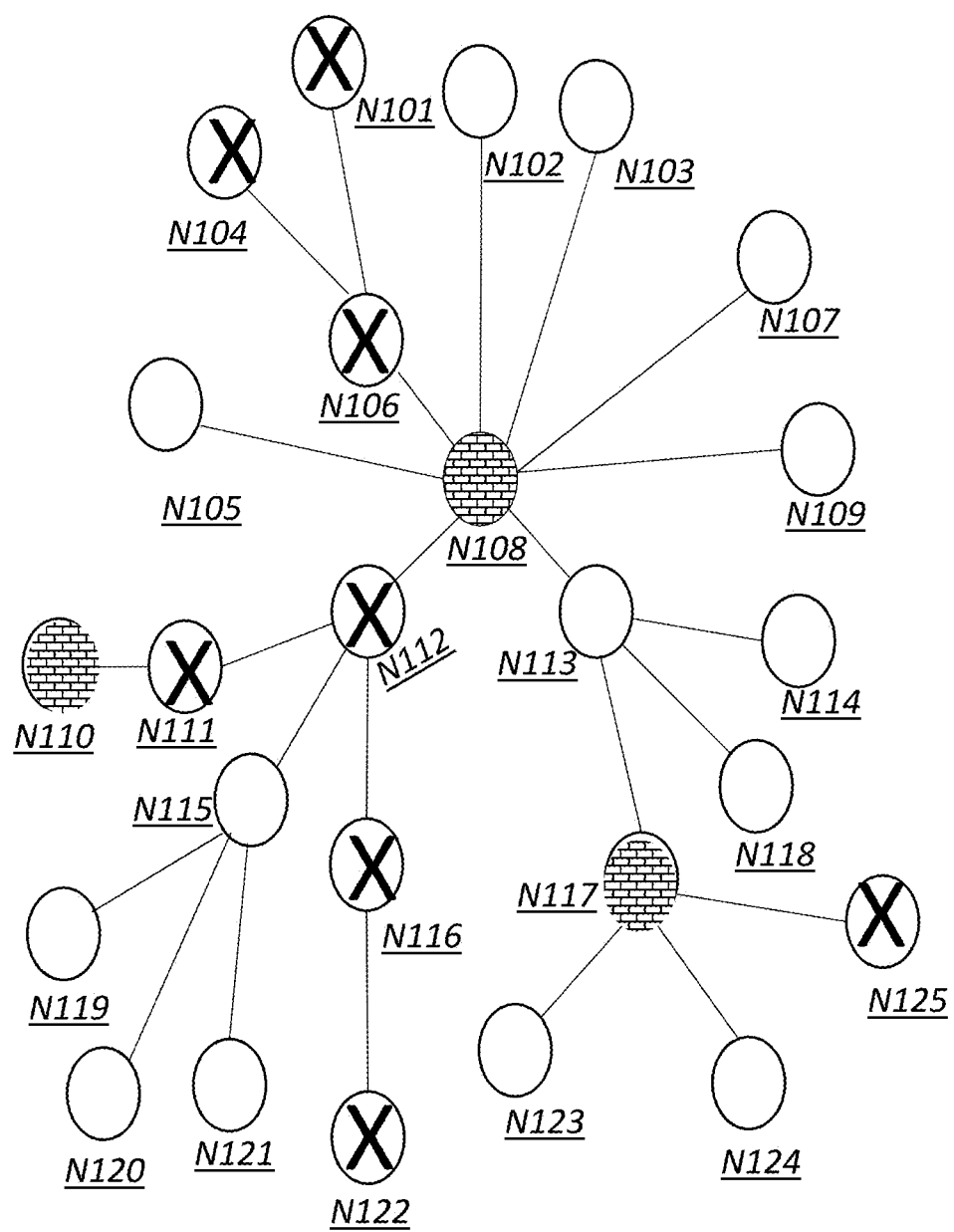

According to the example illustrated in FIGS. 5A-5D, initially, at time $T_{Begin\ Pen\text{-}Test}$, when the penetration test begins, network-nodes N110, N108 and N117 are assumed to have been compromised. Between time $T_{Begin\ Pen\text{-}Test}$ and $T^1_{During\ Pen\text{-}Test}$, network nodes N111, N112, N106, N122 and N125 are compromised—this is indicated in FIG. 5B by the X's. Between time $T^1_{During\ Pen\text{-}Test}$ and $T^2_{During\ Pen\text{-}Test}$, network nodes N116 and N101 are compromised, as indicated by the X's in FIG. 5C. Between time $T^2_{During\ Pen\text{-}Test}$ and $T^3_{During\ Pen\text{-}Test}$, network node N104 and is compromised, as indicated by the X's in FIG. 5D.

The networked system example of FIGS. 4A and 5A have a structure of a mathematical tree, in which there are no loops. Such example was selected for simplifying the figure and its explanation, but is not intended to limit the scope of the invention in any way. The invention is equally applicable to networked systems containing loops of network nodes in which each pair of nodes that are adjacent to each other in the loop are immediate neighbors. The inventions is also equally applicable to networked systems containing sub-networks comprising of many nodes, in which each two nodes belonging to the same sub-network are immediate neighbors. The invention is also equally applicable to networked systems containing any combination of trees, loops, sub-networks and other arrangements of network nodes.

Figure 6:
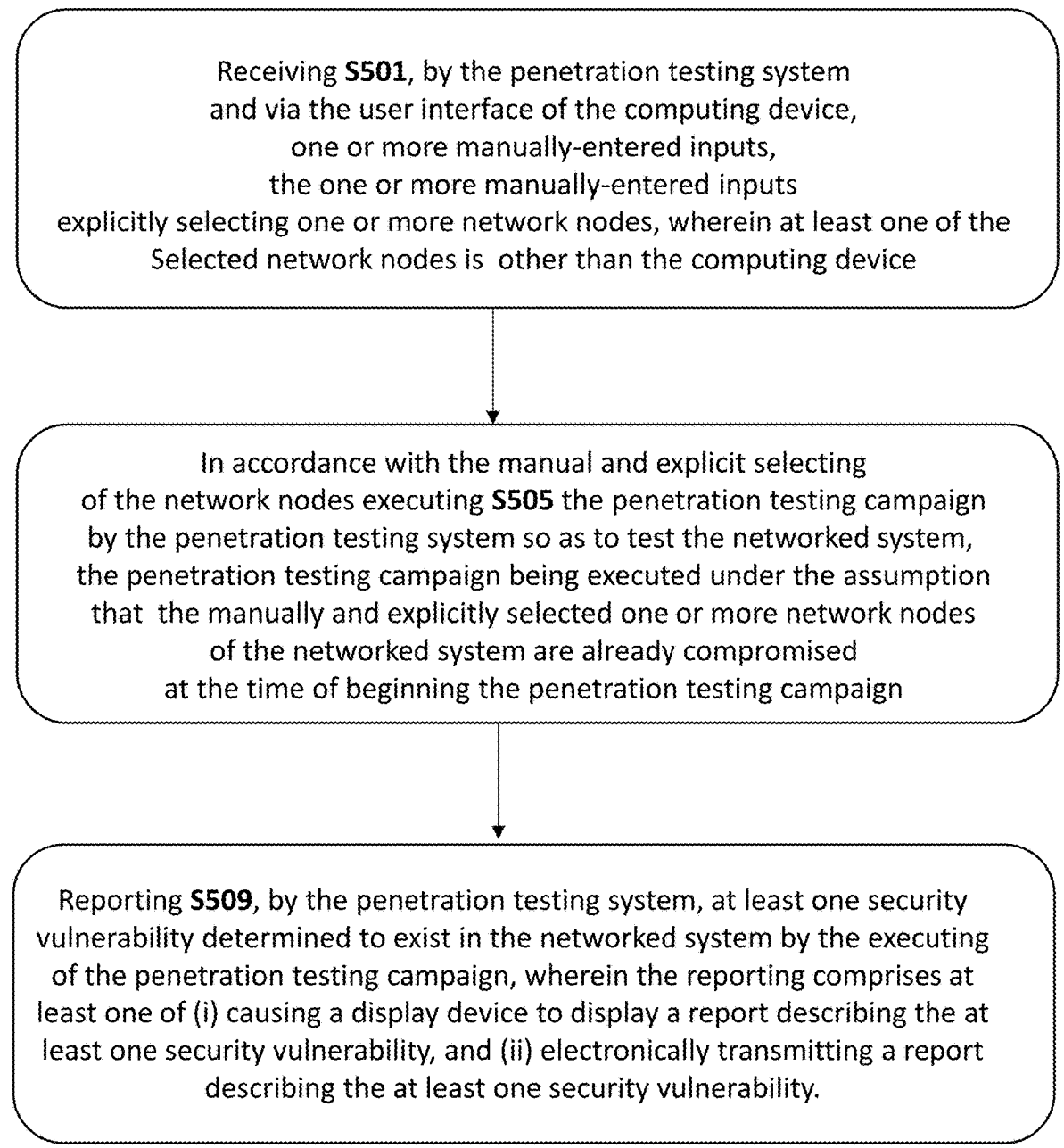

A Discussion of FIG. 6, 7, 8A-8B—a Method of Penetration Testing According to One or More Manually and Explicitly Selected Network Nodes FIG. 6 is a flow chart of a method of penetration testing of a networked system by a penetration testing system that is controlled by a user interface of a computing device so that a penetration testing campaign is executed according to a manual and explicit selecting of one or more network nodes of the networked system.

Figure 7:
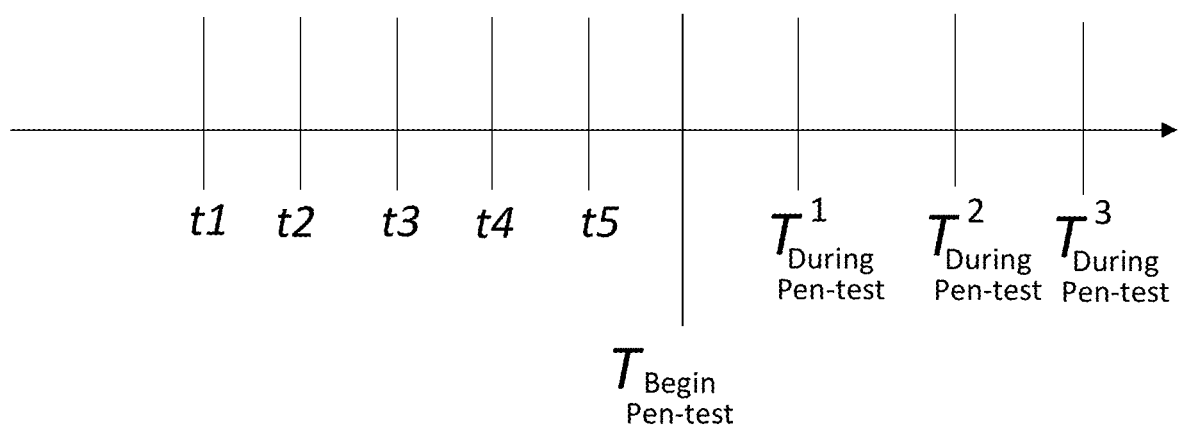
FIG. 7 illustrates a timeline related to the example of FIG. 8A.
Figure 8A:
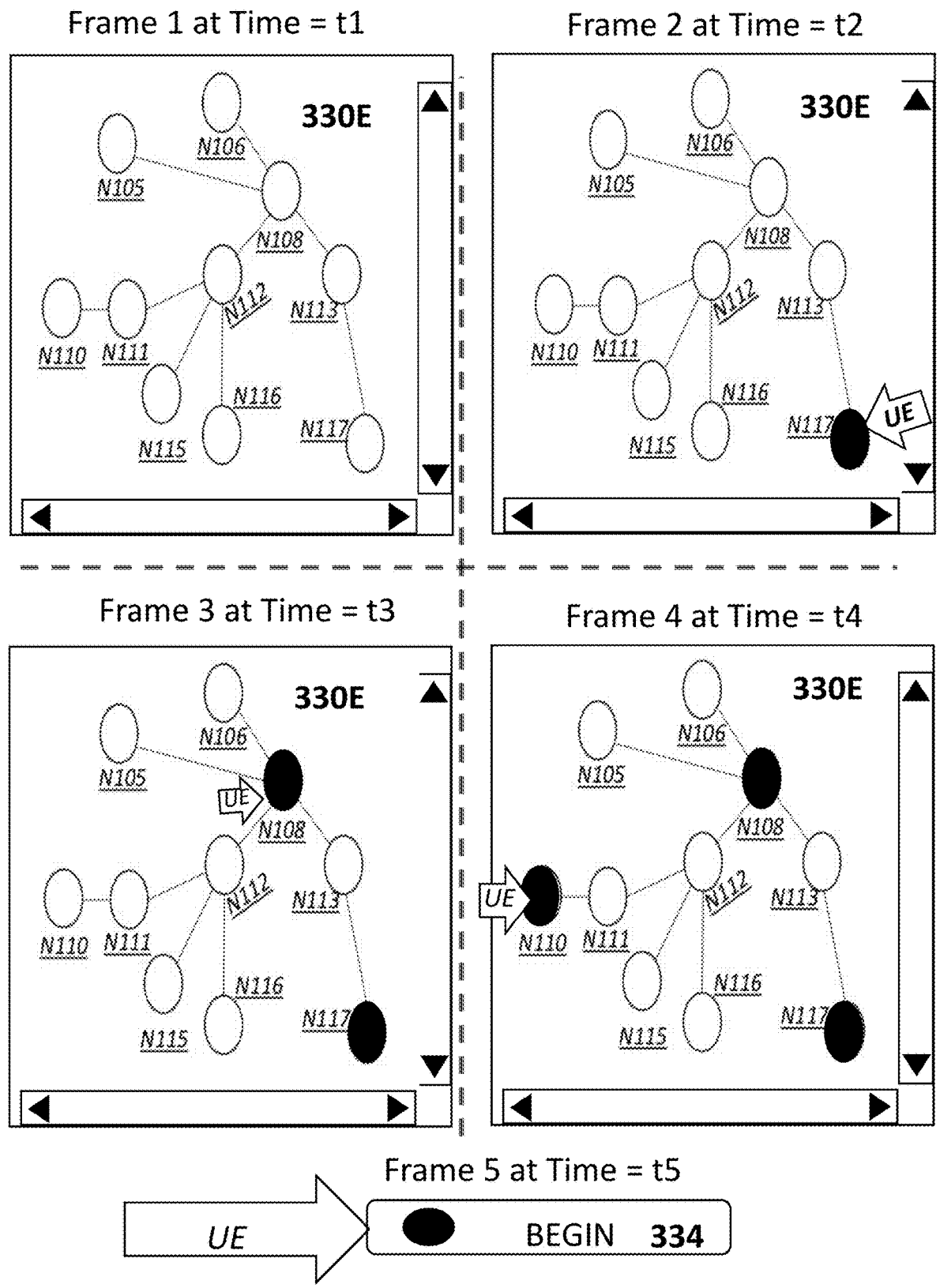

In one example, the selecting is performed using the GUI element 330E of FIG. 8A. that illustrates a first example of the method of FIG. 6 (also see the timeline of FIG. 7); FIG. 8B illustrates a second example of the method of FIG. 6. In both the first and second example the user can manually and explicitly select a set of nodes as initially-compromised that match the nodes of the example of FIGS. 5A-5D, illustrated by the brick-pattern.

In step S501 of FIG. 6, the penetration testing system receives (i.e. via the user interface of the computing device), one or more manually-entered inputs, where: (i) the one or more manually-entered inputs explicitly selects the one or more network nodes of the networked system and (ii) at least one of the manually and explicitly selected nodes is other than the computing device.

In Frame 1 of FIG. 8A, GUI element 330E of FIG. 8A illustrates 10 buttons (illustrated as empty circles), each of which is associated with a different network node (i.e. within the topology of the examples of FIGS. 5A-5D). Frames 1-4 of FIG. 8A illustrate the state of GUI element 330E at times t1-t4 (which are also shown on the timeline of FIG. 7). Frame 5 of FIG. 8A illustrates an action performed at time t5 using GUI element 334. In all frames of FIG. 8A, UE is an abbreviation for 'user engagement'—this relates to a user engagement of a GUI element. For example, the user provides a mouse click (e.g. depressing a mouse button) when a mouse pointer is located in a specific location of the GUI element. The skilled artisan will appreciate that a mouse click is just one example of a user engagement of a GUI element or portion thereof. In another example, a mouse-pointer points to an element without any need for a mouse-click; in another example, a user touches with his or her finger (or with a stylus) a GUI element for 'user engagement'.

In Frame 2, at time t2 the user clicks on the button labelled N117 to manually and explicitly select node N117. In Frame t3, at time t3 the user clicks on the button labelled N108 to manually and explicitly select node N108. In Frame t4, at time t4 the user clicks on the button labelled N110 to manually and explicitly select node N110.

In Frame 5 of FIG. 8A at time t5, when the user's mouse-pointer is located within the 'begin' button 334, the user provides a mouse-click, thereby triggering steps S505 and S509 of FIG. 6, discussed below.

FIG. 8B illustrates a second non-limiting example related to step S501 of FIG. 6. Frame 1 illustrates an initial state of a GUI element displaying a portion of the network. In Frame 2, the penetration testing system provides a recommendation for three 'candidate' network-nodes—nodes N105, N110 and N117. The recommended nodes are illustrated in gray stripes. At time t2 of Frame 2, the user accepts the recommendation using GUI element 328F, thereby manually and explicitly selecting these three network nodes. Thus, in Frame 3 at time t3, the manually and explicitly selected nodes are illustrated in black.

In Frame 4 of FIG. 8B at time t4, the user clicks on 'begin' button 334, thereby triggering steps S505 and S509 of FIG. 6, discussed below.

One feature of step S501 is that at least one of the automatically selected network nodes is other than the computing device. This is clearly satisfied in the example of FIG. 8A where three distinct network nodes are selected. However, when a single network node is selected, this network note must be different than the "computer device" mentioned in step S501.

In step S505 of FIG. 6, the following is performed: in accordance with the manual and explicit selecting of the network nodes executing the penetration testing campaign by the penetration testing system so as to test the networked system, the penetration testing campaign being executed under the assumption that the manually and explicitly selected one or more network nodes of the networked system are already compromised at the time of beginning the penetration testing campaign.

In step S509 of FIG. 6, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S501 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Step S501 of FIG. 6 (along with steps S551 of FIG. 9, S811 of FIG. 11A, S821 of FIG. 11B, S801 of FIG. 11C, S301 of FIG. 12, S1351 of FIG. 14, S351 of FIG. 16, S601 of FIG. 18, S901 of FIG. 20, S401 of FIG. 21 and S851 of FIG. 23) refers to a penetration testing system. In one example, the penetration testing system may include the hardware and software components of the user-interface used for providing the user input—e.g. for providing GUI element 330E. In another example, the penetration testing system receives the user input from a user-interface that is external to the penetration testing system.

A Discussion of FIGS. 9 and 10A-10B—a Method of Penetration Testing where the User Manually and Explicitly Selects a Boolean Node Selection Condition As noted above, some embodiments relate to methods and apparatus where user-input manually and explicitly designates one or more nodes of the networked system as initially-compromised—e.g. see the example of FIGS. 5A-5D.

FIGS. 9 and 10A-10B relate to a second method where the user manually provides input for selecting which nodes (e.g. nodes N110, N108 and N117 of FIGS. 5A-5D) are assumed to be initially compromised.

In some embodiments, a user manually and explicitly selects a Boolean node-selection condition and a penetration testing campaign is performed according to the Boolean node-selection condition. FIG. 9 is a flow-chart of a method for penetration testing according to a manually and explicitly selected Boolean node-selection condition.

Specific examples of step S551 of the flow-chart of FIG. 9 are discussed below with reference to FIGS. 10A-10B.

In step S551 of FIG. 9 the penetration testing system receives (i.e. via the user interface of the computing device), one or more manually-entered inputs, where the one or more manually-entered inputs explicitly selects a Boolean node-selection condition. The manually and explicitly selected node-selection condition defines a proper subset of network nodes of the networked system such that any network node of the networked system is a member of the subset of network nodes if and only if it satisfies the condition.

A first example is presented in FIG. 10A.

Three candidate Boolean node-selection conditions are listed in GUI element 330F: (i) a first node-selection condition that states that a node is a selected (i.e. to be part of the 'proper subset' of network nodes) if and only if the node is a 'Linux box' (i.e. it is a computer executing Linux); (ii) a second node-selection condition that states that a node is a selected (i.e. to be part of the 'proper subset' of network nodes) if and only if the node has a direct connection to the outside world; and (iii) a third node-selection condition that states that a node is a selected (i.e. to be part of the 'proper subset' of network nodes) if and only if the node has an on-board cell-phone modem.

The first node-selection condition relates to software executing by a node; the second node-selection condition relates to a location of the node within the network; the third node-selection condition relates to hardware resources.

FIG. 10A presents three frames—Frame 1 at time t1, Frame 2 at time t2, and Frame 3 at time t3.

In Frame 1, no selection has yet been made by the user. In Frame 2, at time t2 the user selects the third candidate node-selection condition in 330F—e.g. the user engagement of GUI element 330F may be provided by a mouse-click.

In Frame 3 of FIG. 10A at time t3, when the user's mouse-pointer is located within the 'begin' button 334, the user provides a mouse-click, thereby triggering steps S555 and S559 of FIG. 11, discussed below.

FIG. 10B shows another example, where the manual and explicit selecting of a Boolean node-selection condition defining the initially-compromised nodes of the penetration testing campaign is performed by the user accepting, by engaging an 'accept recommendation" button 328F, a recommendation provided by the penetration testing system. Thus, frame 1 illustrates an initial step of GUI element 330F, in which GUI element 330F presents a recommended node-selection condition, shown in gray stripes. In Frame 2, the user accepts the recommendation, thereby effecting a manual and explicit selection of the "Iff machine has on-board cell-phone modem' node-selection condition. The user's selection of Frame 2 is shown in Frame 3, where the condition "Iff machine has on-board cell-phone modem' is shown in black.

In Frame 4 of FIG. 10B at time t4, the user clicks on 'begin' button 334, thereby triggering steps S555 and S559 of FIG. 9, discussed below.

In step S555 of FIG. 9, the following is performed: in accordance with the manual and explicit setting forth of the node-selection condition, executing the penetration testing campaign by the penetration testing system so as to test the networked system, the penetration testing campaign being executed under the assumption that every node of the subset of network nodes is already compromised at the time of beginning the penetration testing campaign.

In step S559 of FIG. 9, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S551 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

In one particular example relating to the example of FIGS. 10A-10B which parallels the example of FIGS. 5A-5D, none of the nodes has an on-board cell-phone modem except for the following nodes—N110, N108 and N117.

A number of examples of Boolean node conditions: (example A) machine is a mobile node; (example B) machine is a node with a direct connection to the outside world; (example C) machine is a node where MS Word is installed; (example D) machine is a Linux node; (example E) machine is a node with Windows 7.0 or lower; (example F) machine is a node physically situated in the State of California; (example G) machine provides FTP services to other nodes.

Example G is one example of a service dependent condition. Examples D-E are examples of operating-system (OS) dependent conditions. Example C is an example of a software-application dependent condition.

A Discussion of FIG. 11A

FIG. 11A is a flow chart of a method of penetration testing of a networked system by a penetration testing system so that a penetration testing campaign is executed according to an automatic selecting of one or more network nodes of the networked system.

In step S811, the following is performed: determining whether one or more network nodes of the networked system satisfy a pre-defined Boolean condition. Some examples of pre-defined Boolean conditions are listed in 330F, discussed above. The Boolean condition is automatically selected by the penetration testing system. For example, a database may store a list of Boolean conditions, and one is selected randomly every time the penetration testing campaign is run.

In step S805, the following is performed: based on a result of the determining, automatically selecting, by the penetration testing system, the one or more network nodes of the networked system, wherein at least one of the automatically selected network nodes is other than the computing device.

In step S809, the following is performed: in accordance with the automatically selecting of the network nodes, executing the penetration testing campaign by the penetration testing system so as to test the networked system, the penetration testing campaign being executed under the assumption that the automatically selected one or more network nodes of the networked system are already compromised at the time of beginning the penetration testing campaign.

In step S813 of FIG. 11A, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 11B:
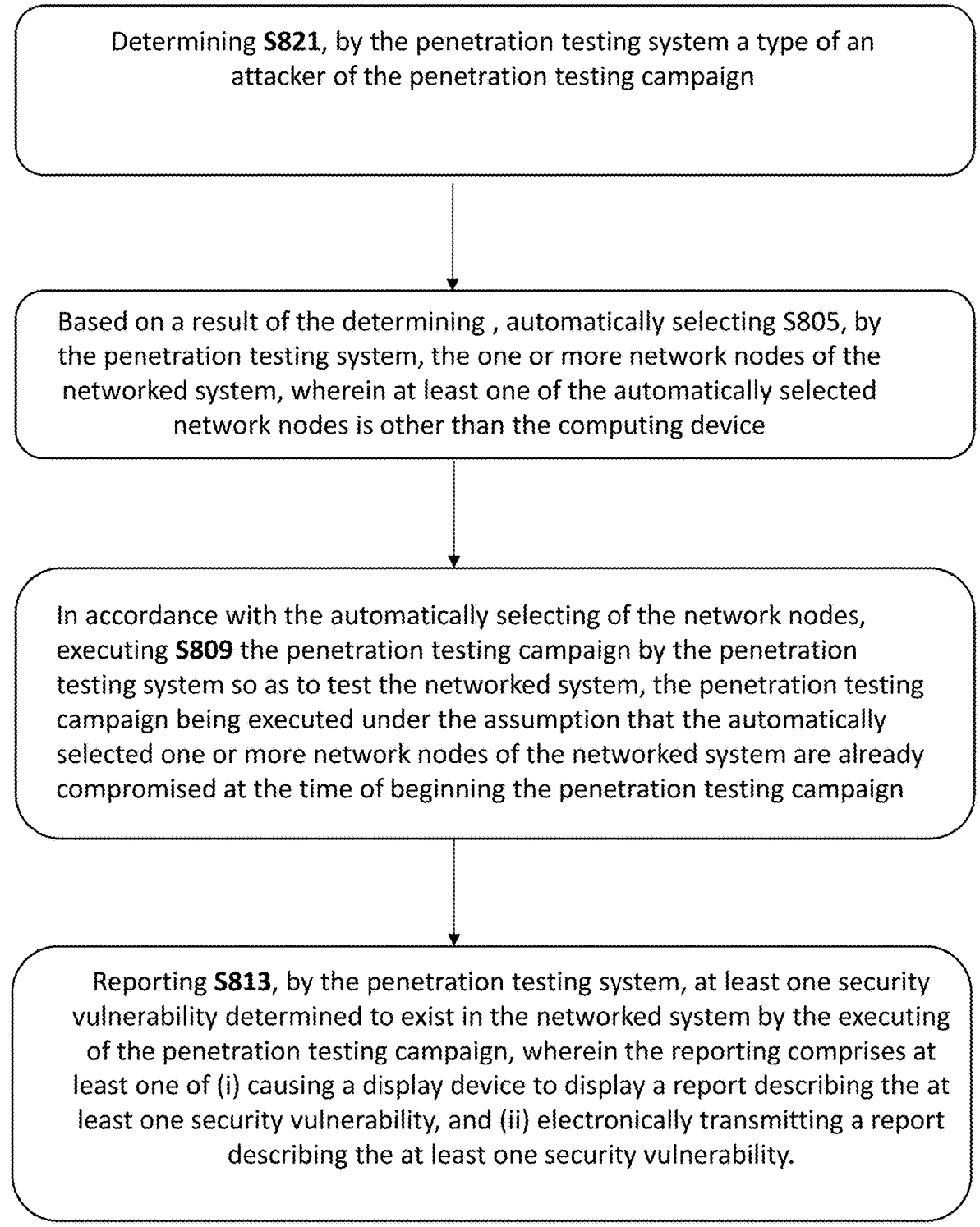

A Discussion of FIG. 11B

A "type of an attacker" is defined as a classification of the attacker that indicates its main incentive in conducting attacks of networked systems. Typical values for a type of an attacker are state-sponsored, opportunistic cyber criminal, organized cyber criminal and insider.

An attacker can have only a single type.

Some embodiments relate to methods and systems where one or more nodes are automatically selected by the penetration testing system according to a type of attacker. The type of attacker can be determined in any manner—e.g. according to user-input or automatically or in any other manner.

In one example, whenever it is determined that an attacker is state sponsored, nodes that operate Windows 7 are assumed to be initially compromised. In another example, whenever it is determined that the attacker is an insider, nodes that are physically located in field offices and not within the corporate headquarters are assumed to be initially compromised.

In step S821, the following is performed: determining S821, by the penetration testing system a type of an attacker of the penetration testing campaign.

Also appearing in FIG. 11B are steps S805, S809, and S813, discussed above. These steps are the same steps as in FIG. 11A, and are not explained again.

A Discussion of FIG. 11C

FIG. 11C is a flow chart of a method of penetration testing of a networked system by a penetration testing system so that a penetration testing campaign is executed according to an automatic selecting of one or more network nodes of the networked system.

In step S801, the following is performed: determining, by the penetration testing system, at least one of (i) a type of an attacker of the penetration testing campaign, and (ii) whether one or more network nodes of the networked system satisfy a pre-defined Boolean condition. The type of attacker can be determined in any manner—e.g. according to user-input or automatically or in any other manner.

Also appearing in FIG. 11B are steps S805, S809, and S813 discussed above.

Figure 12:
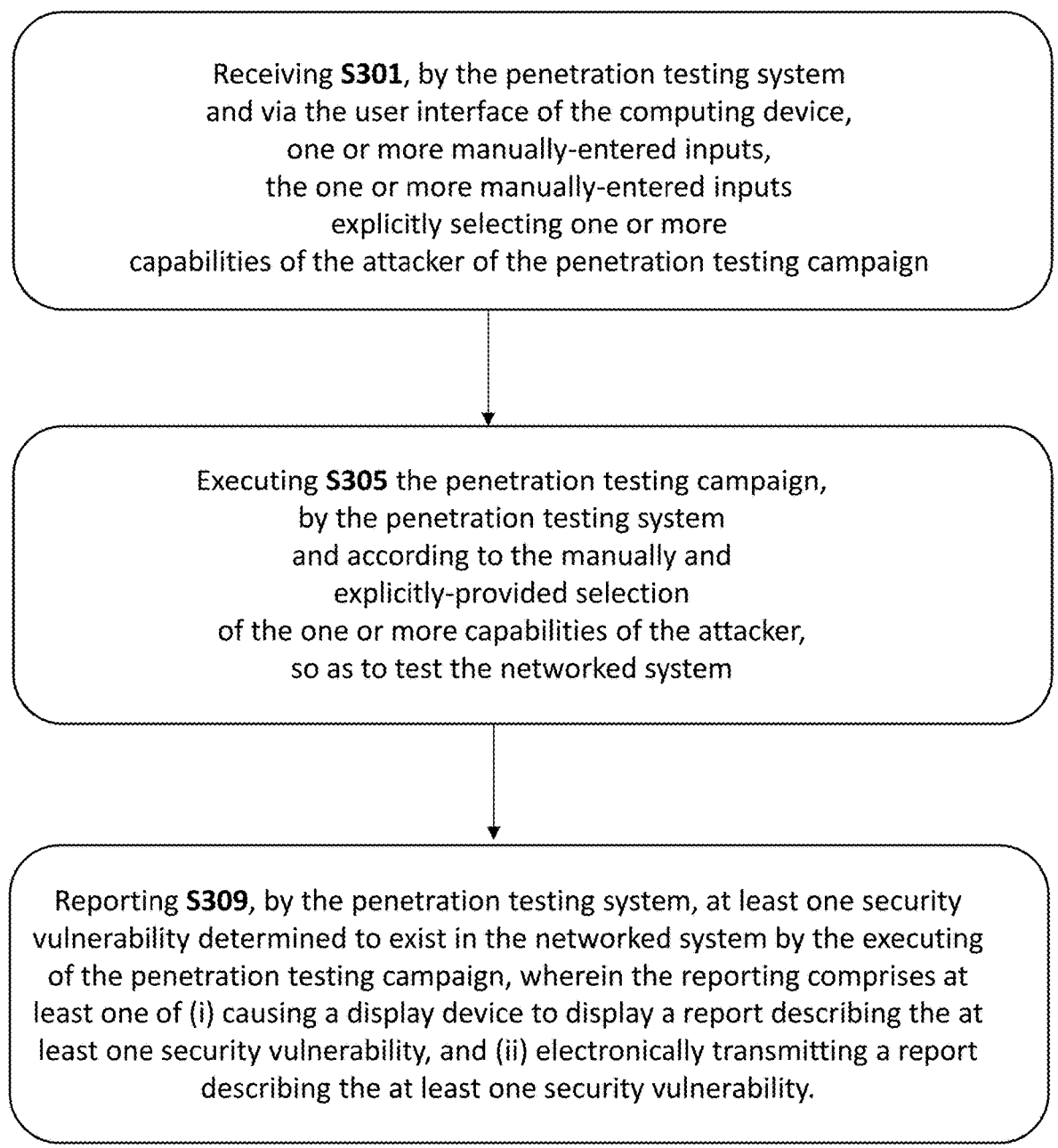
Figure 13A:
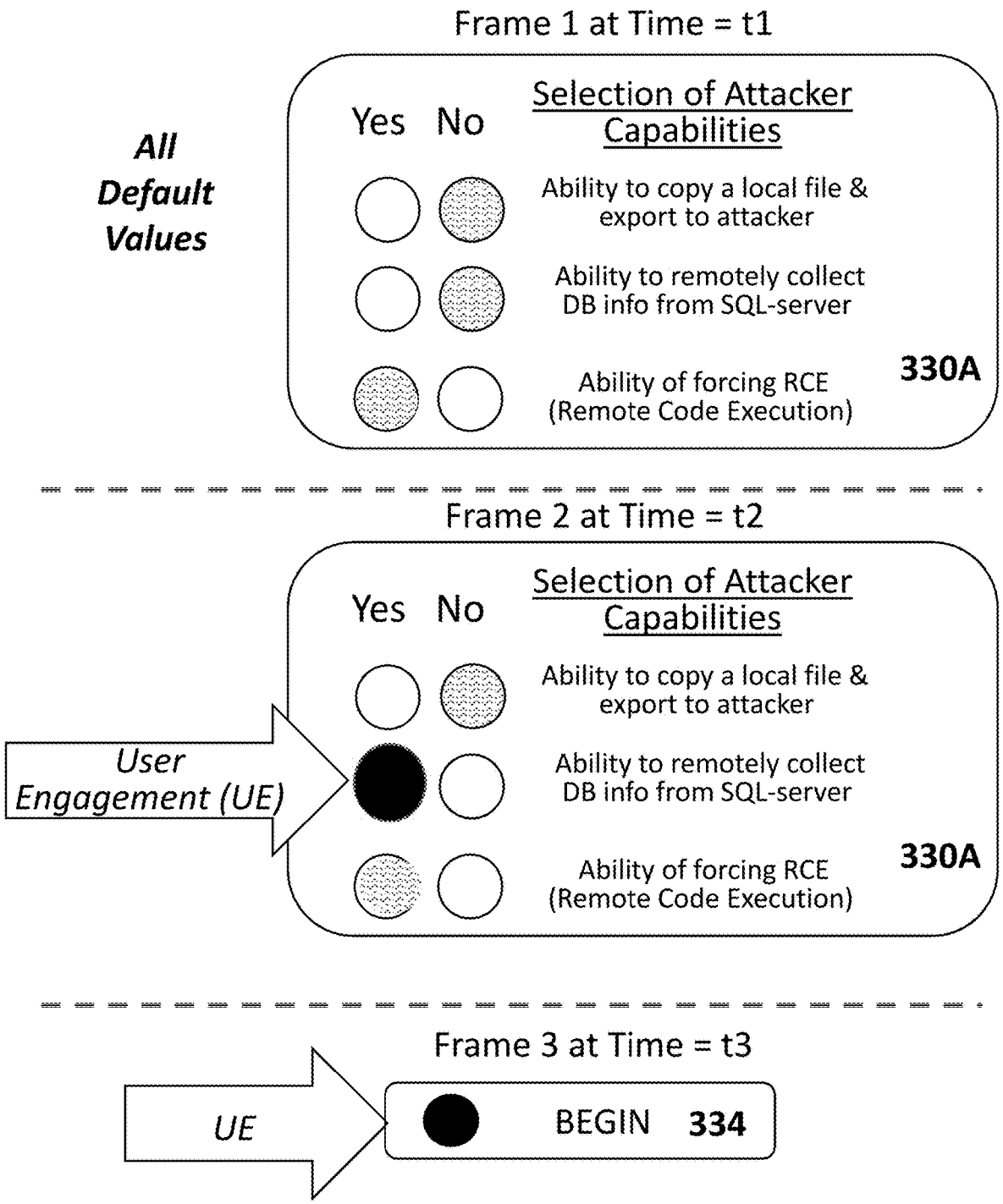
Figure 13B:
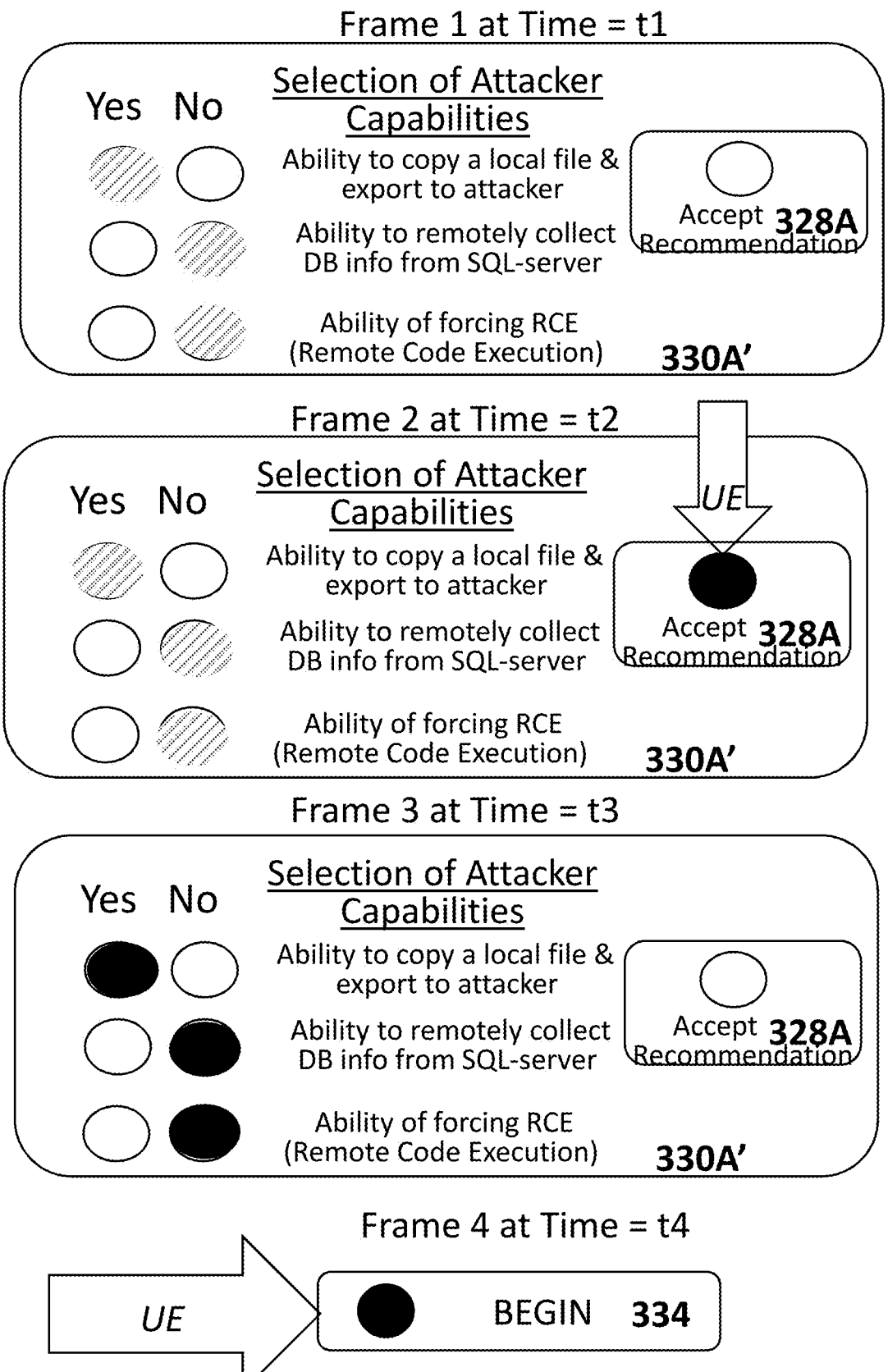

A Discussion of FIGS. 12 and 13A-13B—a Method of Penetration Testing According to One or More Manually and Explicitly Selected Capabilities of an Attacker of a Penetration Testing Campaign (e.g. Using GUI Element 330A)

In some embodiments, a user manually and explicitly selects one or more capabilities of an attacker of a penetration testing campaign. FIG. 12 is a flow-chart of a method for performing penetration testing according to manually and explicitly selected capabilities of an attacker of a penetration testing campaign.

Specific examples of step S301 of the flow-chart of FIG. 12 are discussed below with reference to FIGS. 13A-13B.

The term 'capability' of an attacker is defined below—see "z" of the 'Definitions Section.'

In step S301 of FIG. 12, the penetration testing system receives (i.e. via the user interface of a computing device), one or more manually-entered inputs, where the one or more manually-entered inputs are explicitly selecting one or more capabilities of the attacker of the penetration testing campaign.

A first example is presented in FIG. 13A which relates to the example of the GUI element 330A.

Three attacker capabilities are listed in GUI element 330A: (i) the ability to copy a local file and export it to the attacker—if the user selects "YES" then the subsequent penetration testing campaign is performed in step S305 such that the attacker is assumed to have this capability; (ii) the ability to remotely collect database (DB) information (info) form the SQL-server of Microscoft®—if the user selects "YES" then the subsequent penetration testing campaign is performed in step S305 such that the attacker is assumed to have this capability; and (iii) the ability to force remote code execution (RCE)—if the user selects "YES" then the subsequent penetration testing campaign is performed in step S305 such that the attacker is assumed to have this capability.

FIG. 13A presents three frames—Frame 1 at time t1, Frame 2 at time t2, and Frame 3 at time t3. In FIG. 13A the default values are indicated by a gray 'wave' shading.

Frame 1 of FIG. 13A illustrates an initial state (i.e. at time t1) where only default values are presented as follows: (i) the attacker lacks the ability to copy a local file and export it to an attacker (i.e. "N"); (ii) the attacker lacks the ability to remotely collect database (DB) information from SQL server (i.e. "N"); and (ii) the attacker has the ability to force remote code execution (RCE) (i.e. "Y").

In Frame 2 of FIG. 13A at time t2, the user engages the GUI element 330A (e.g. by clicking when a mouse pointer is within the circle next to the capability labeled "Ability to remotely collect DB info from SQL-server) to override the default value, changing from "NO" to "YES."

In Frame 3 of FIG. 13A at time t3, when the user's mouse-pointer is located within the 'begin' button 334, the user provides a mouse-click, thereby triggering steps S305 and S309 of FIG. 12, discussed below.

FIG. 13B shows another example, where the manual and explicit selecting of the one or more capabilities of the attacker of the penetration testing campaign is performed by the user accepting, by engaging an 'accept recommendation" button 328A, a recommendation provided by the penetration testing system.

Frame 1 of FIG. 13B illustrates an initial state (i.e. at time t1) of GUI element 330A' where only system-recommended values are presented as follows: (i) the attacker has the ability to copy a local file and export it to an attacker (i.e. "Y"); (ii) the attacker lacks the ability to remotely collect database (DB) information from SQL server (i.e. "N"); and (iii) the attacker lacks the ability to force remote code execution (RCE) (i.e. "N"). Thus, the {Y,N,N} values are illustrated in diagonal gray lines, indicating that these values have not been manually and explicitly selected by the user—in the initial state of FIG. 13A, the {Y,N,N} values are only system-generated recommendations.

In Frame 2 of FIG. 13B at time t2, the user engages the GUI element 328A by clicking on the circle labelled 'accept recommendation' to accept the system-recommended values presented in Frame 1 of FIG. 13B.

In Frame 3 of FIG. 13B, the values {Y,N,N} that were previously (i.e. in Frame 1) presented in gray diagonal shading (i.e. when they were only system-recommended values) are now presented in solid black. Because the user manually and explicitly accepted the system-generated recommendations in Frame 2, the values {Y,N,N} are now manually and explicitly selected values, and are presented as such in Frame 3 of FIG. 13B. It should be noted that the user is not forced to accept the system-generated recommendations, but may override them. This freedom of choice is what makes the selection of the attacker capabilities a manual and explicit selection. If the user would not have an option of overriding the system's recommendations, then their selection would not be considered a manual and explicit selection.

In Frame 4 of FIG. 13B, the user clicks on the 'begin' button to begin the penetration testing campaign using the manually and explicitly selected {Y,N,N} values.

In step S305 of FIG. 12, the following is performed: executing the penetration testing campaign, by the penetration testing system and according to the manually and explicitly-provided selection of the one or more capabilities of the attacker, so as to test the networked system.

In step S309 of FIG. 12, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S301 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 14:
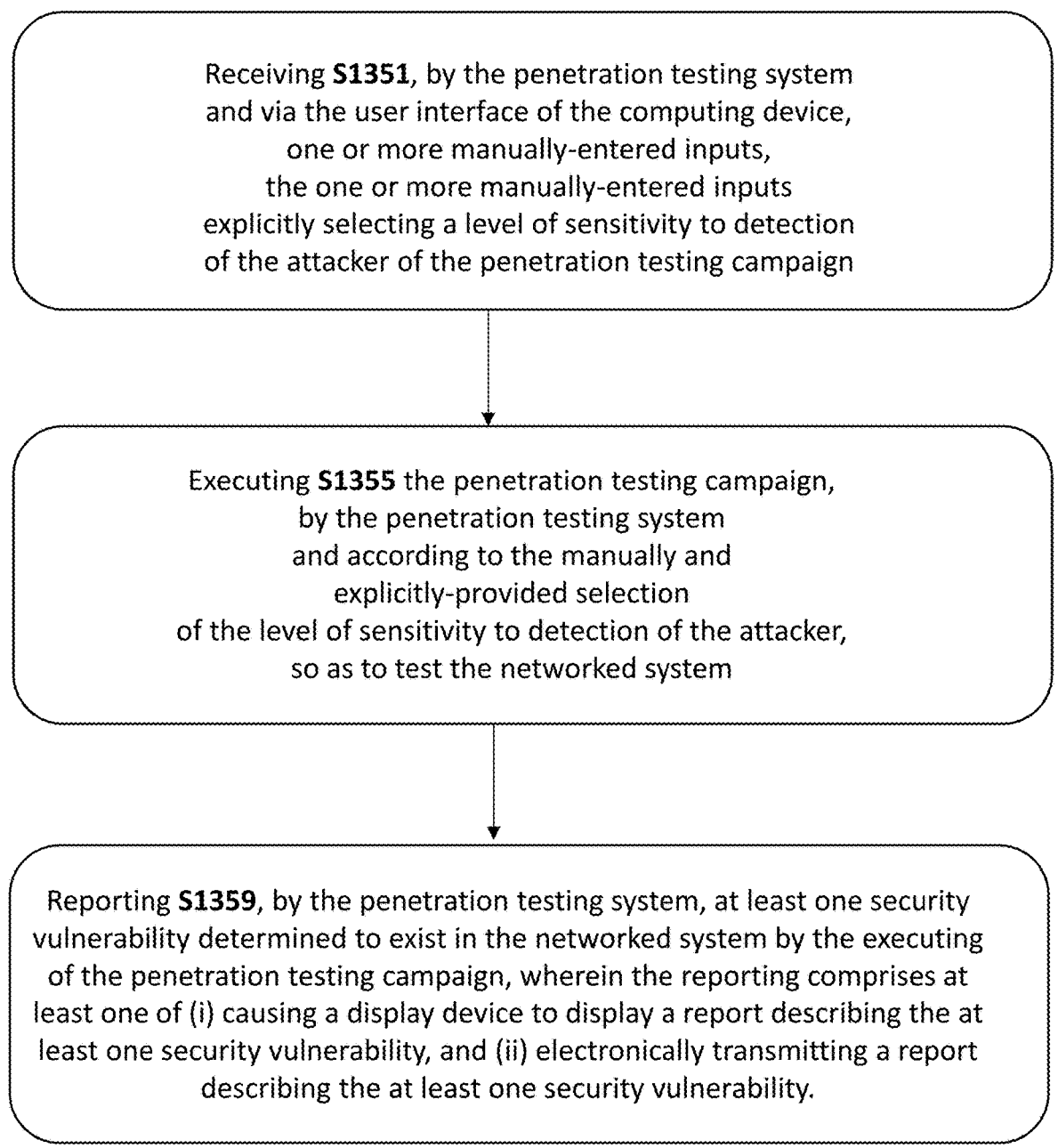

A Discussion of FIGS. 14 and 15A-15B—a Method of Penetration Testing According to a Manually and Explicitly Selected Level of Sensitivity to Detection of an Attacker of a Penetration Testing Campaign (e.g. Using GUI Element 330B)

In some embodiments, a user manually and explicitly selects a level of sensitivity to detection of an attacker of a penetration testing campaign.

The term 'level of sensitivity to detection of an attacker' is defined below—see "cc" of the 'Definitions Section'.

FIG. 14 is a flow-chart of a method of penetration testing of a networked system by a penetration testing system that is controlled by a user interface of a computing device so that a penetration testing campaign is executed according to manually and explicitly-selected level of sensitivity to detection of an attacker of the penetration testing campaign.

Specific examples of step S1351 of the flow-chart of FIG. 14 are discussed below with reference to FIGS. 15A-15B.

In step S1351 of FIG. 14, the penetration testing system receives (i.e. via the user interface of a computing device), one or more manually-entered inputs, where the one or more manually-entered inputs are explicitly selecting a level of sensitivity to detection of the attacker of the penetration testing campaign.

A first example is presented in FIG. 15A which relates to the example of the GUI element 330B.

GUI element 330B allows for the user to manually and explicitly select a level of sensitivity of the attacker to being detected (e.g. typically 'lone-wolf' or 'free-wheeling' attackers have 'less to lose' if detected while state-sponsored attackers are more sensitive to being detected).

For the particular example of FIG. 15A, the user may select 'highly sensitive' (HS), 'moderately sensitive' (MS) or 'not sensitive'(NS)—if the user selects "highly sensitive" then the subsequent penetration testing campaign is performed in step S1355 in a manner where the attacker is constrained to be highly sensitive, if the user selects "moderately sensitive" then the subsequent penetration testing campaign is performed in step S1355 in a manner where the attacker is constrained to be moderately sensitive, if the user selects "not sensitive" then the subsequent penetration testing campaign is performed in step S1355 in a manner where the attacker is not sensitive to being detected.

FIG. 15A presents three frames—Frame 1 at time t1, Frame 2 at time t2, and Frame 3 at time t3.

Frame 1 of FIG. 15A illustrates an initial state (i.e. at time t1) where only a default value is selected as follows: the attacker is moderately sensitive to being detected (i.e. "MS").

In Frame 2 of FIG. 15A at time t2, the user engages the GUI element 330B (e.g. by clicking when a mouse pointer is within the circle below the words 'highly sensitive') to override the default value of the sensitivity, changing from "MS" to "HS."

In Frame 3 of FIG. 15A at time t3, when the user's mouse-pointer is located within the 'begin' button 334, the user provides a mouse-click, thereby triggering steps S1355 and S1359 of FIG. 14 using the manually and explicitly selected value {"HS"}.

FIG. 15B shows another example, where the manual and explicit selecting of the level of sensitivity to detection of the attacker of the penetration testing campaign is performed by the user accepting, by engaging an 'accept recommendation" button 328B, a recommendation provided by the penetration testing system.

Frame 1 of FIG. 15B illustrates an initial state (i.e. at time t1) of GUI element 330B' where only a system-recommended value is presented as follows: the attacker is highly sensitive to being detected (i.e. "HS" value).

Thus, the {HS} value is illustrated in diagonal gray lines, indicating that this value has not been manually and explicitly selected by the user—in the initial state of FIG. 15B, the {HS} value is only a system-generated recommendation.

In Frame 2 of FIG. 15B at time t2, the user engages the GUI element 328B by clicking on the circle labelled 'accept recommendation' to accept the system-recommended value presented in Frame 1 of FIG. 15B.

In Frame 3 of FIG. 15B, the value {HS} that was previously (i.e. in Frame 1) presented in gray diagonal shading (i.e. when it was only a system-recommended value) is now presented in solid black. Because the user accepted the system-generated recommendations in Frame 2, the value {HS} is now a manually and explicitly selected value, and is presented as such in Frame 3 of FIG. 15B. It should be noted that the user is not forced to accept the system-generated recommendation, but may override them. This freedom of choice is what makes the selection of the attacker's level of sensitivity to detection a manual and explicit selection.

In Frame 4 of FIG. 15B, the user clicks on the 'begin' button to begin the penetration testing campaign using the manually and explicitly selected {HS} value.

In step S1355 of FIG. 14, the following is performed: executing the penetration testing campaign, by the penetration testing system and according to the manually and explicitly-provided selection of the level of sensitivity to detection of the attacker, so as to test the networked system.

In step S1359 of FIG. 14, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S1351 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 16:
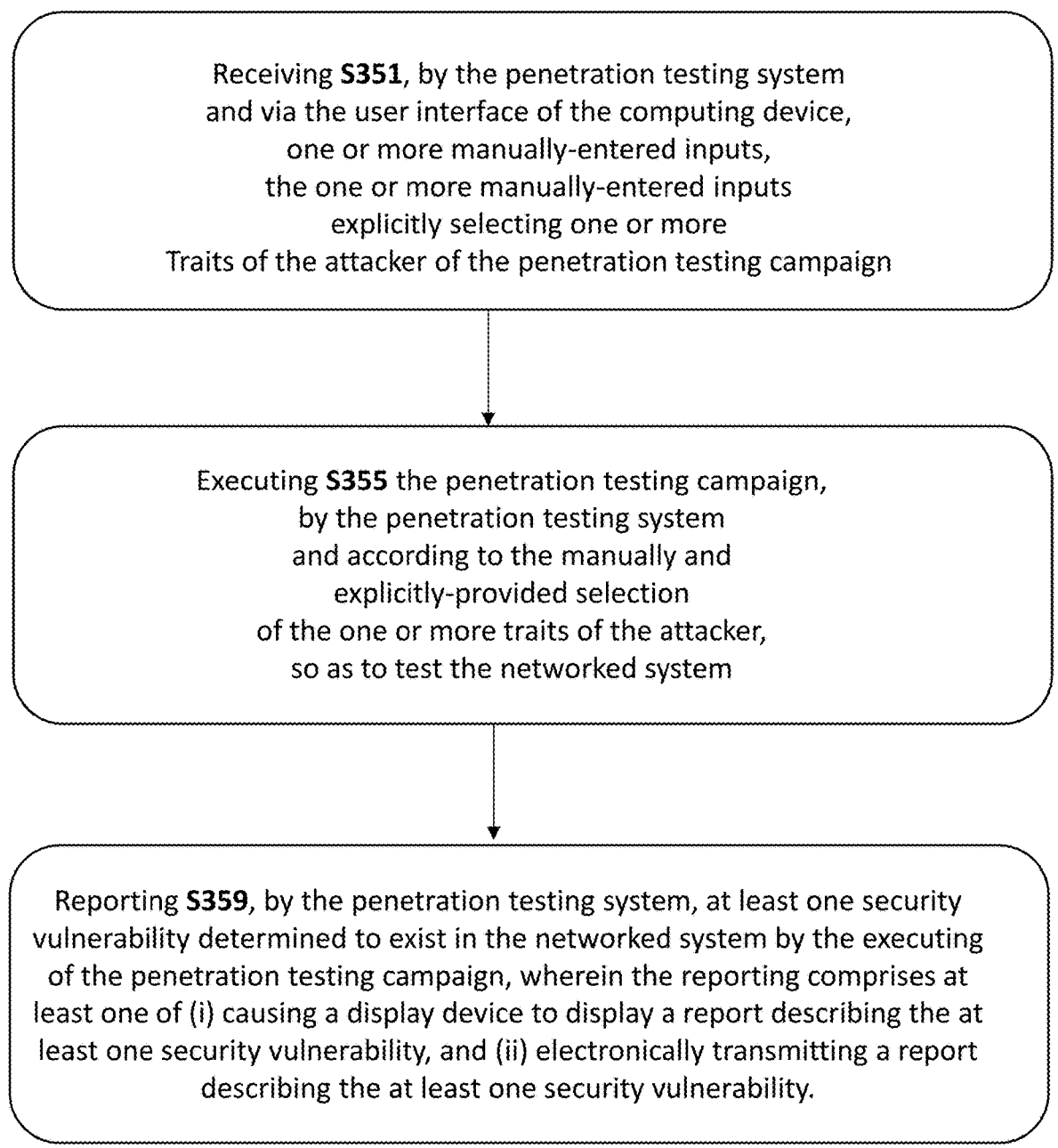
Figure 17A:
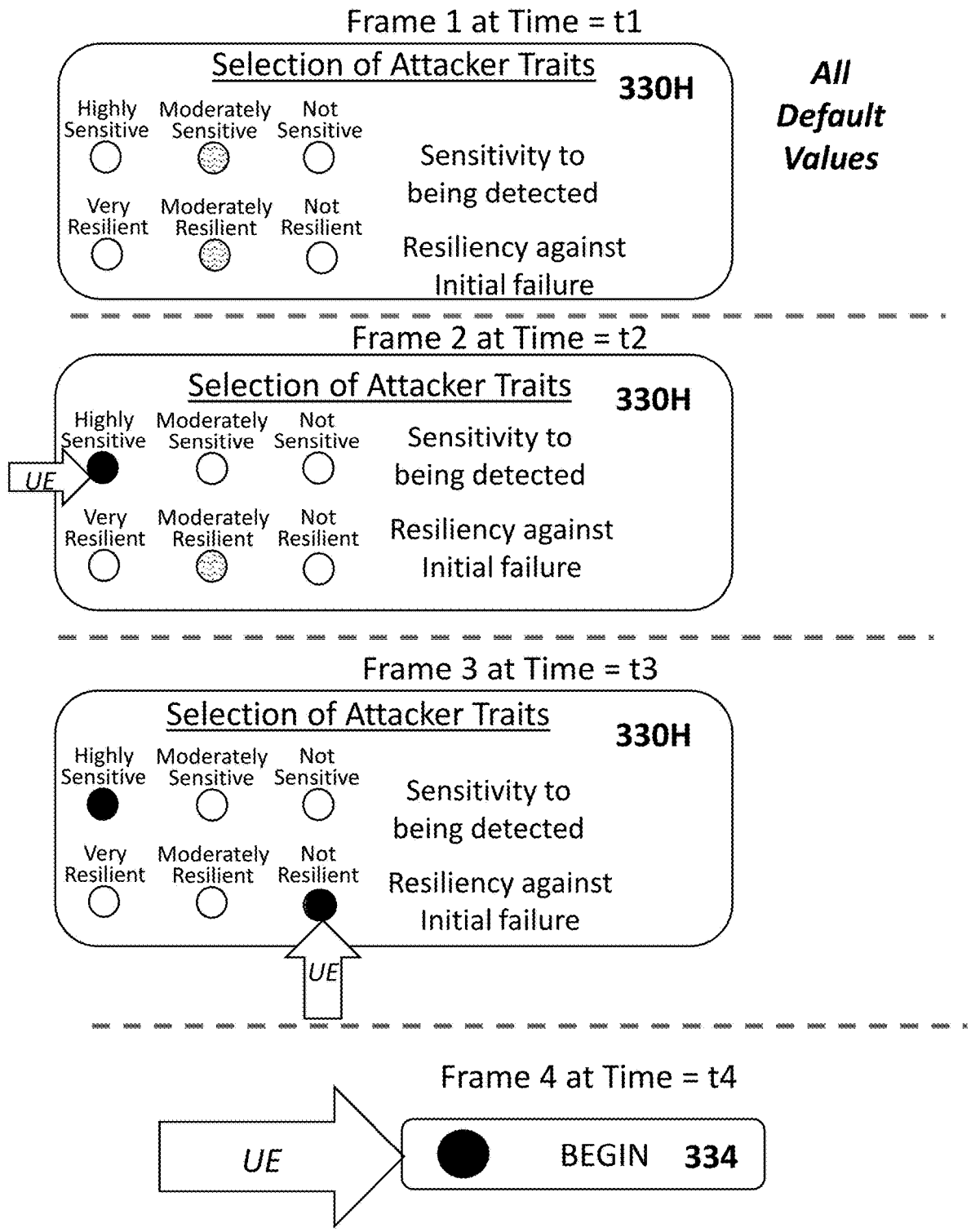

A Discussion of FIGS. 16 and 17A-17B—a Method of Penetration Testing According to One or More Manually and Explicitly Selected Traits of an Attacker of a Penetration Testing Campaign (e.g. Using GUI Element 330H)

In some embodiments, a user manually and explicitly selects one or more traits of an attacker of a penetration testing campaign. FIG. 16 is a flow-chart of a method for penetration testing according to manually and explicitly-selected traits of an attacker of a penetration testing campaign.

Specific examples of step S351 of the flow-chart of FIG. 16 are discussed below with reference to FIGS. 17A-17B.

The term 'trait' of an attacker is defined below—see "bb" of the 'Definitions Section.'

In step S351 of FIG. 16, the penetration testing system receives (i.e. via the user interface of a computing device), one or more manually-entered inputs, where the one or more manually-entered inputs are explicitly selecting one or more traits of the attacker of the penetration testing campaign.

A first example is presented in FIG. 17A which relates to the example of the GUI element 330H.

Two attacker traits are listed in GUI element 330H: (i) how sensitive the attacker is to being detected (e.g. typically 'lone-wolf' or 'free-wheeling' attackers have 'less to lose' if detected while state-sponsored attackers are more sensitive to being detected); and (ii) how resilient the attacker is against initial failure—i.e. often when an attacker tries to accomplish a goal, the attacker may initially fail—more resilient attackers are willing to make more attempts even when previous attempts failed.

For the first trait, the user may select 'highly sensitive' (HS), 'moderately sensitive' (MS) or 'not sensitive'(NS)—if the user selects "highly sensitive" then the subsequent penetration testing campaign is performed in step S355 in a manner where the attacker is constrained to be highly sensitive, if the user selects "moderately sensitive" then the subsequent penetration testing campaign is performed in step S355 in a manner where the attacker is constrained to be moderately sensitive, if the user selects "not sensitive" then the subsequent penetration testing campaign is performed in step S355 in a manner where the attacker is not sensitive to being detected.

For the second trait, the user may select 'very resilient' (VR), 'moderately resilient' (MR) and 'not resilient' (NR).

FIG. 17A presents four frames—Frame 1 at time t1, Frame 2 at time t2, Frame 3 at time t3 and Frame 4 at time t4.

Frame 1 of FIG. 17A illustrates an initial state (i.e. at time t1) where only default values are presented as follows: (i) the attacker is moderately sensitive to being detected (i.e. "MS"); (ii) the attacker is moderately resilient against initial failure (i.e. "MR").

In Frame 2 of FIG. 17A at time t2, the user engages the GUI element 330H (e.g. by clicking when a mouse pointer is within the circle below the words 'highly sensitive') to override the default value of the sensitivity, changing from "MS" to "HS."

In Frame 3 of FIG. 17A at time t3, the user engages the GUI element 330H (e.g. by clicking when a mouse pointer is within the circle below the words 'not resilient') to override the default value of the resiliency, changing from "MR" to "NR."

In Frame 4 of FIG. 17A at time t4, when the user's mouse-pointer is located within the 'begin' button 334, the user provides a mouse-click, thereby triggering steps S355 and S359 of FIG. 16 using the manually and explicitly selected values {"HS,"NR"}, discussed below.

FIG. 17B shows another example, where the manual and explicit selecting of the traits of the attacker of the penetration testing campaign is performed by the user accepting, by engaging an 'accept recommendation" button 328B, a recommendation provided by the penetration testing system.

Frame 1 of FIG. 17B illustrates an initial state (i.e. at time t1) of GUI element 330H' where only system-recommended values are presented as follows: (i) the attacker is highly sensitive to being detected (i.e. "HS" value); (ii) the attacker is moderately resilient against initial failure ("MR" value).

Thus, the {HS,MR} values are illustrated in diagonal gray lines, indicating that these values have not been manually and explicitly selected by the user—in the initial state of FIG. 17B, the {HS,MR} values are only system-generated recommendations.

In Frame 2 of FIG. 17B at time t2, the user engages the GUI element 328B by clicking on the circle labelled 'accept recommendation' to accept the system-recommended values presented in Frame 1 of FIG. 17B.

In Frame 3 of FIG. 17B, the values {HS,MR} that were previously (i.e. in Frame 1) presented in gray diagonal shading (i.e. when they were only system-recommended values) are now presented in solid black. Because the user accepted the system-generated recommendations in Frame 2, the values {HS,MR} are now manually and explicitly selected values, and are presented as such in Frame 3 of FIG. 17B. It should be noted that the user is not forced to accept the system-generated recommendations, but may override them. This freedom of choice is what makes the selection of the attacker traits a manual and explicit selection.

In Frame 4 of FIG. 17B, the user clicks on the 'begin' button to begin the penetration testing campaign using the manually and explicitly selected {HS,MR} values.

In step S355 of FIG. 16, the following is performed: executing the penetration testing campaign, by the penetration testing system and according to the manually and explicitly-provided selection of the one or more traits of the attacker, so as to test the networked system.

In step S359 of FIG. 16, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S351 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 18:
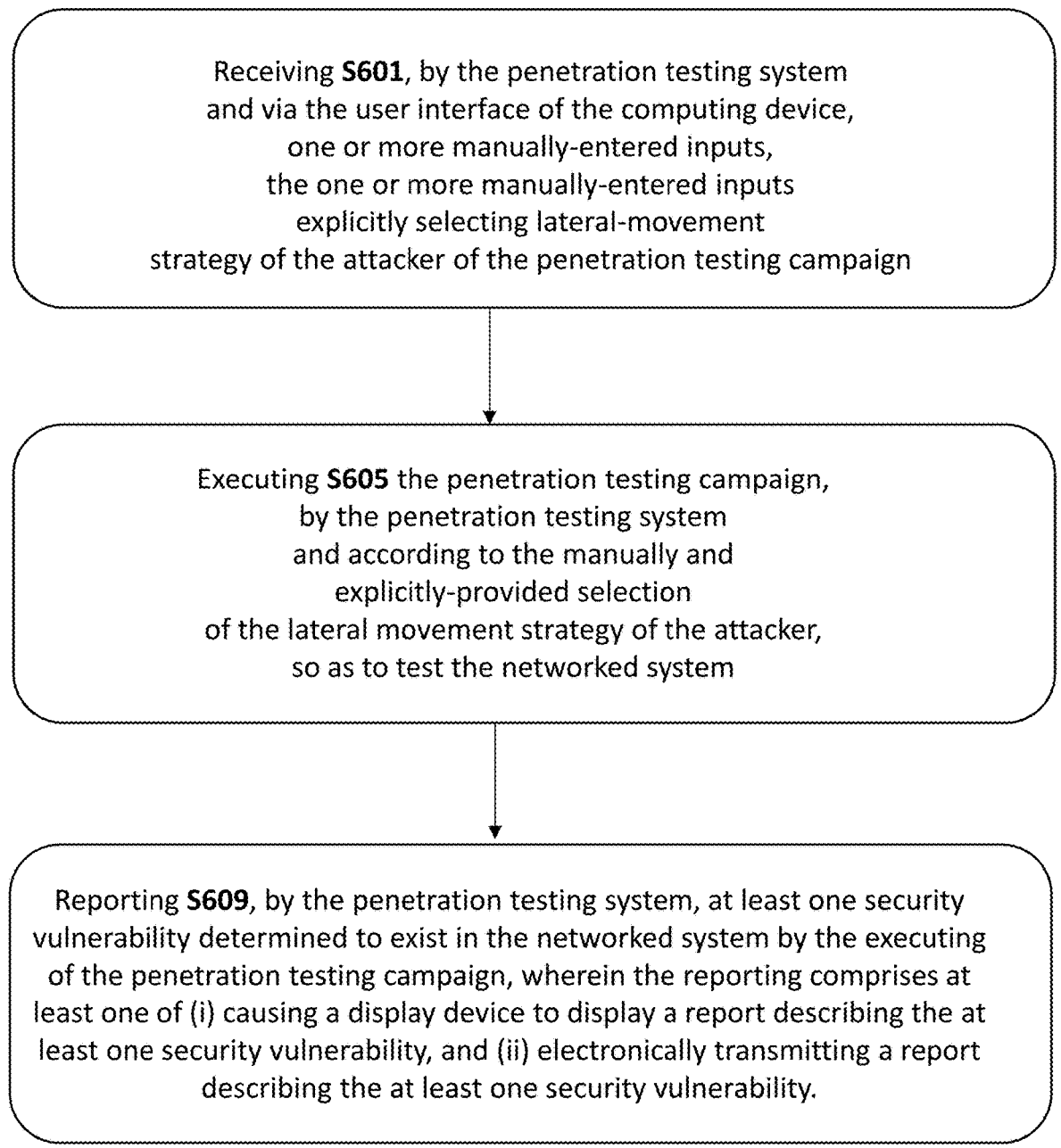

A Discussion of FIGS. 18 and 19A-19B—a Method of Penetration Testing According to a Manually and Explicitly Selected Lateral Movement Strategy of an Attacker of a Penetration Testing Campaign (e.g. Using GUI Element 330G)

In some embodiments, a user manually and explicitly selects a lateral movement strategy of an attacker of a penetration testing campaign. FIG. 18 is a flow-chart of a method for penetration testing according to manually and explicitly selected lateral movement strategy of an attacker of a penetration testing campaign.

Specific examples of step S601 of the flow-chart of FIG. 18 are discussed below with reference to FIGS. 19A-19B.

The term 'lateral movement strategy' of an attacker is defined below—see "oo" of the 'Definitions Section.'

In step S601 of FIG. 18, the penetration testing system receives (i.e. via the user interface of a computing device), one or more manually-entered inputs, where the one or more manually-entered inputs explicitly select a lateral movement strategy of the attacker of the penetration testing campaign.

A first example is presented in FIG. 19A which relates to the example of the GUI element 330G of FIG. 19A.

Three lateral movement strategies are listed in GUI element 330G: (i) breadth-first strategy (BFS); (ii) depth-first-strategy (DFS); and (iii) 'random neighbor strategy' where the movement is from a node to an immediately-neighboring node, the immediately-neighboring node being selected randomly.

FIG. 19A presents three frames—Frame 1 at time t1, Frame 2 at time t2, and Frame 3 at time t3.

Frame 1 of FIG. 19A illustrates an initial state (i.e. at time t1) where only a default value is presented as follows: the lateral movement strategy of the attacker is 'BFS'.

In Frame 2 of FIG. 19A at time t2, the user engages the GUI element 330G (e.g. by clicking when a mouse pointer is within the circle below 'DFS') to override the default value, changing from "BFS" to "DFS."

In Frame 3 of FIG. 19A at time t3, when the user's mouse-pointer is located within the 'begin' button 334, the user provides a mouse-click, thereby triggering steps S605 and S609 of FIG. 17 (i.e using the 'DFS' value), discussed below.

FIG. 19B shows another example, where the manual and explicit selecting of the lateral movement strategy of the attacker of the penetration testing campaign is performed by the user accepting, by engaging an 'accept recommendation" button 328G, a recommendation provided by the penetration testing system.

Frame 1 of FIG. 19B illustrates an initial state (i.e. at time t1) of GUI element 330G' where the system-recommended value is presented as follows: the lateral-movement strategy of the attacker is "DFS". This "DFS" value is illustrated in diagonal gray lines, indicating that it has not been manually and explicitly selected by the user—in the initial state of FIG. 19B, the "DFS" value is only a system-generated recommendation.

In Frame 2 of FIG. 19B at time t2, the user engages the GUI element 328G by clicking on the circle labelled 'accept recommendation' to accept the system-recommended value presented in Frame 1 of FIG. 19B.

In Frame 3 of FIG. 19B, the {DFS} value that was previously (i.e. in Frame 1) presented in gray diagonal shading (i.e. when it was only a system-recommended value) is now presented in solid black. Because the user accepted the system-generated recommendation in Frame 2, the value {DFS} is now a manually and explicitly selected value, and is presented as such in Frame 3 of FIG. 19B. It should be noted that the user is not forced to accept the system-generated recommendation, but may override it. This freedom of choice is what makes the selection of the lateral movement strategy a manual and explicit selection.

In Frame 4 of FIG. 19B, the user clicks on the 'begin' button to begin the penetration testing campaign using the manually and explicitly selected {DFS} value.

In step S605 of FIG. 18, the following is performed: executing the penetration testing campaign, by the penetration testing system and according to the manually and explicitly-provided lateral movement strategy of the attacker, so as to test the networked system;

In step S609 of FIG. 18, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S501 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

A Discussion of FIG. 20

FIG. 20 is a flow chart of a method of penetration testing of a networked system by a penetration testing system so that a penetration testing campaign is executed according to an automatic selecting of lateral movement strategy of an attacker of the penetration testing campaign.

In step S901 of FIG. 20, the following is performed: determining, by the penetration testing system, at least one of (i) a type of the attacker of the penetration testing campaign and (ii) one or more goals of the attacker of the penetration testing campaign. The type of attacker can be determined in any manner—e.g. according to user-input or automatically or in any other manner. The one or more goals of the attacker can be determined in any manner—e.g. according to user-input or automatically or in any other manner.

In step S905 of FIG. 20, the following is performed: based on a result of the determining, automatically selecting by the penetration testing system a lateral movement strategy of the attacker of the penetration testing campaign.

In step S909 of FIG. 20, the following is performed: executing the penetration testing campaign, by the penetration testing system and according to i. the at least one of the type of the attacker and the one or more goals of the attacker, and ii. the automatically selected lateral movement strategy of the attacker, so as to test the networked system.

In step S913 of FIG. 20, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

A Discussion of Goals of an Attacker of a Penetration Testing Game and Classification of Example Goals The term a 'goal of an attacker' is defined below—see "dd" of the Definitions Section.

Seventeen (17) examples of goals of an attacker are listed below:

A. exporting outside the networked system of a file having a specific file name from a specific network node
B. exporting outside the networked system of a file having a specific file name from whatever node of the networked system having a copy of it.
C. exporting outside the networked system of a given number of files from a specific network node.
D. exporting outside the networked system of a given number of files from any nodes.
E. exporting outside the networked system of files having a total size that is more than a given size.
F. exporting outside the networked system of files of a specific type having a total size that is more than a given size.
G. damaging in a specific way a given number of files.
H. damaging in a specific way a file having a specific file name in a specific node.

I. damaging in a specific way a given number of files having a specific type.
J. encrypting a given number of files.
K. encrypting a file having a specific file name in a specific node.
L. encrypting a given number of files having a specific type.
M. compromising a given number of network nodes, without caring which nodes they are (with the given number of nodes larger than one).
N. compromising enough network nodes so that the ratio of the number of already-compromised nodes to the number of not-yet-compromised nodes is higher than a given threshold.
O. compromising enough network nodes so that the difference between the number of already-compromised nodes and the number of not-yet-compromised nodes is higher than a given threshold.
P. compromising a given number of network nodes, all of which are members of a pre-defined subset of the nodes of the tested networked system. The pre-defined subset may be, for example, all the nodes running the Windows 7 Operating system, or all the nodes that are mobile devices.
Q. compromising all the network nodes in the networked system that are members of a pre-defined subset of the nodes of the tested networked system. The pre-defined subset of nodes may be defined, for example, by a condition that has to be satisfied by a member node, such as having a cellular communication channel.

There are many particular species of 'goals' of an attacker.

Thus, some goals (but not all goals) are resource-specific goals. The term 'resource-specific goal' is defined below in 'ee' of the Definitions Section. Some but not all of the example goals A-Q are resource specific goals. In particular, examples A, B, H, and K are resource-specific goals. Examples C-G, I-J, L-Q are not resource-specific goals.

The term 'file-specific goal' is defined below in 'ff' of the Definitions Section. Some but not all of the example goals A-Q are file-specific goals. In particular, examples A, B, H, and K are file specific goals. Examples C-G, I-J, L-Q are not file-specific goals.

The term 'node-count-maximizing goal' is defined below in 'gg' of the Definitions Section. Some but not all of the example goals A-Q are node-count-maximizing goals. In particular, examples N, O, and Q are node-count-maximizing goals. Examples A-M and P are not node-count-maximizing goals.

The term 'file-count-maximizing goal' is defined below in 'hh' of the Definitions Section. Some but not all of the example goals A-Q are file-count-maximizing goals. In particular, examples E and F are file-count-maximizing goals. Examples A-D, G-Q are not file-count-maximizing goals.

The term 'encryption-related goal' is defined below in 'ii' of the Definitions Section. Some but not all of the example goals A-Q are encryption-related goals. In particular, examples J-L are encryption-related goals. Examples A-I and M-Q are not encryption-related goals.

The term 'file-exporting goal' is defined below in 'jj' of the Definitions Section. Some but not all of the example goals A-Q are file-exporting goals. In particular, examples A-F are file-exporting goals. Examples G-Q are not file-exporting goals.

The term 'file-size-related goal' is defined below in 'kk' of the Definitions Section. Some but not all of the example goals A-Q are file-size-related goals. In particular, examples E-F are file-size-related goals. Examples A-D and G-Q are not file-size-related goals.

The term 'file-type-related goal' is defined below in 'll' of the Definitions Section. Some but not all of the example goals A-Q are file-type-related goals. In particular, examples F, I and L are file-size-related goals. Examples A-E, G-H, J-K and M-Q are not file-type-related goals.

The term 'file-damage-related goal' is defined below in 'mm' of the Definitions Section. Some but not all of the example goals A-Q are file-damage-related goals. In particular, examples G-L are file-damage-related goals. Examples A-F and M-Q are not file-damage-related goals.

The term 'node-condition-based goal' is defined below in 'nn' of the Definitions Section. Some but not all of the example goals A-Q are node-condition-based goals. In particular, examples P and Q are node-condition-related goals. Examples A-O are not node-condition-related goals.

Figure 21:
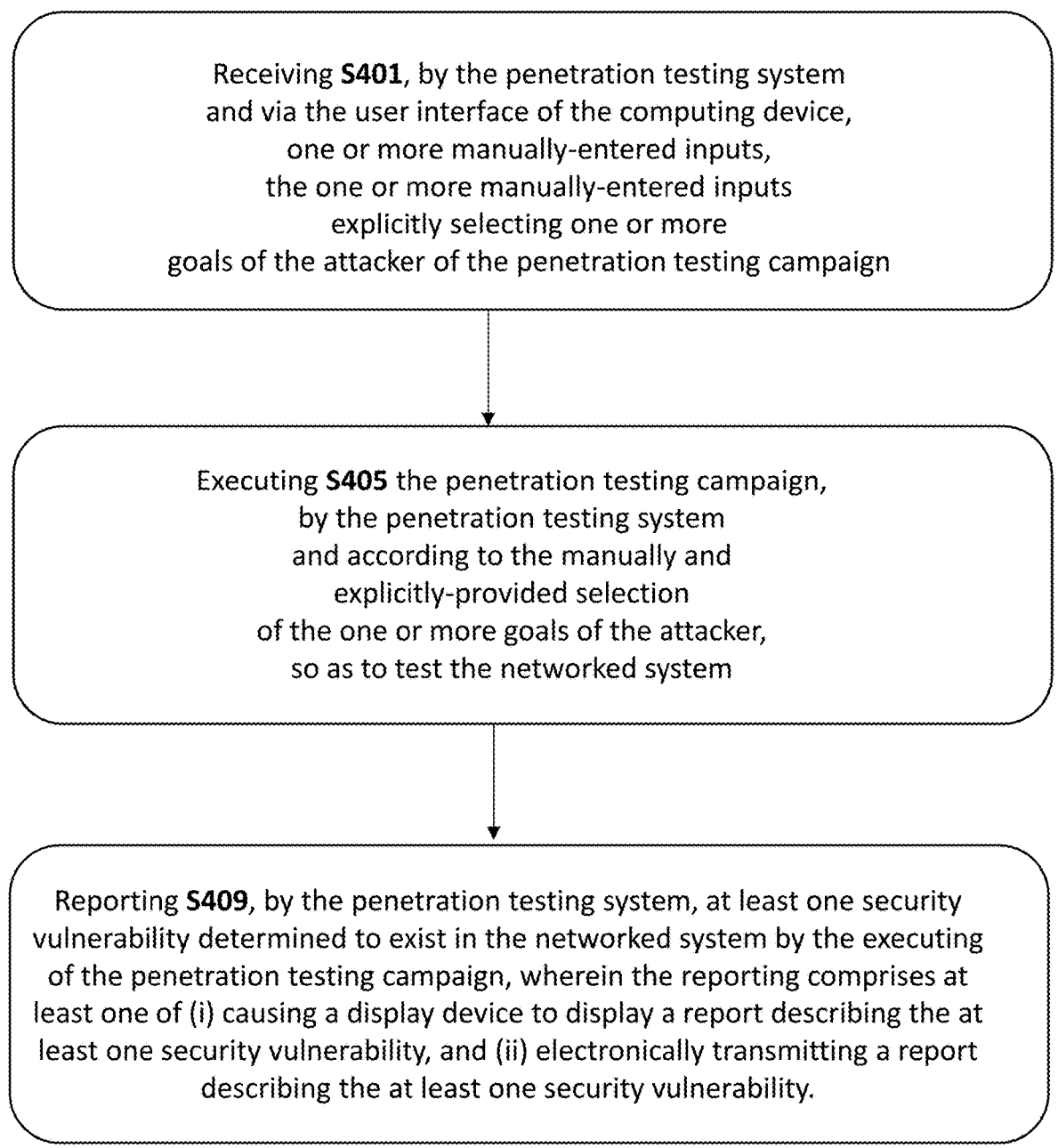
Figure 22A:
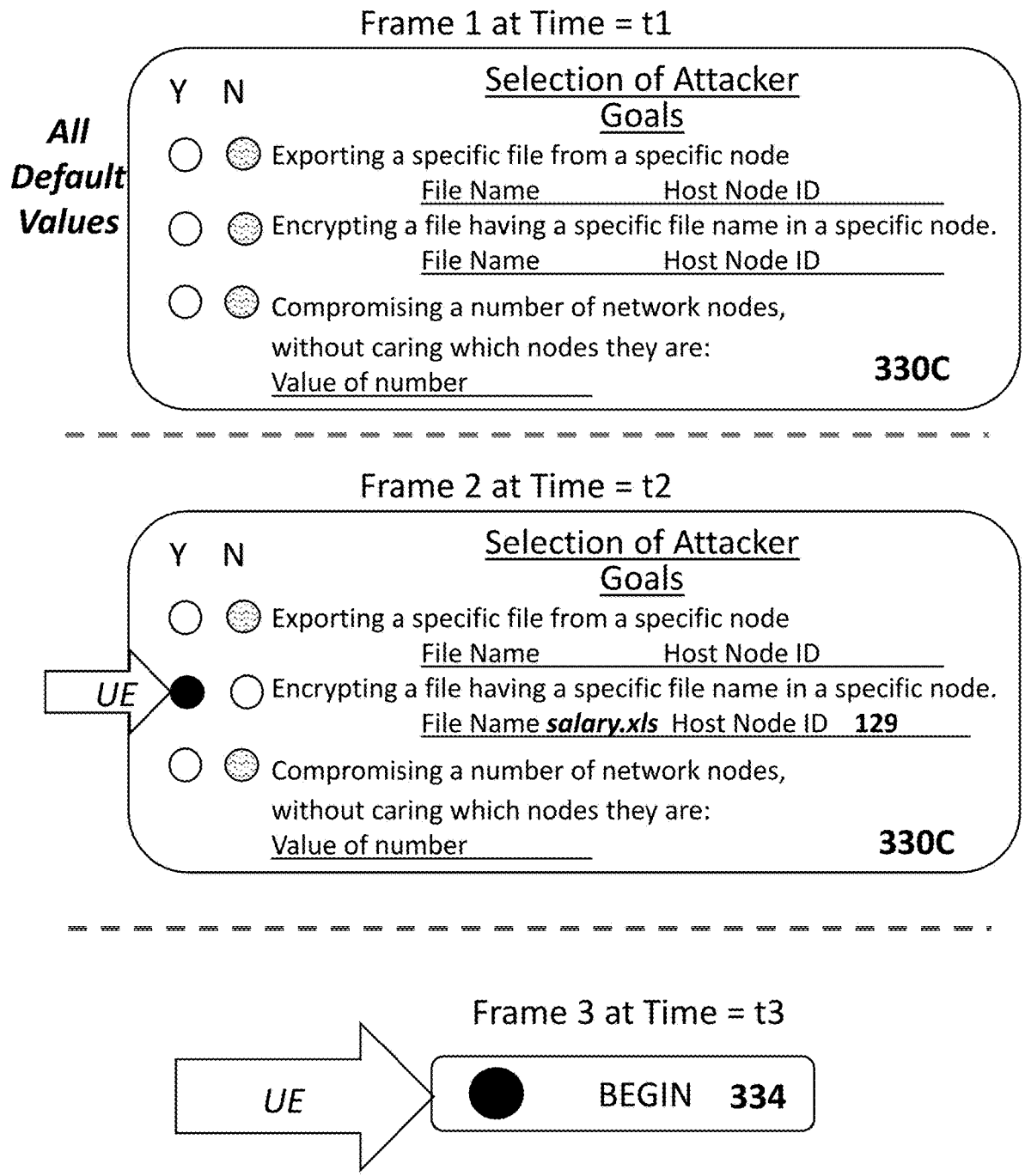

A Discussion of FIGS. 21 and 22A-22B—a Method of Penetration Testing According to One or More Manually and Explicitly Selected Goals of an Attacker of a Penetration Testing Campaign (e.g. Using GUI Element 330C)

In some embodiments, a user manually and explicitly selects one or more capabilities of an attacker of a penetration testing campaign. FIG. 21 is a flow-chart of a method for performing penetration testing according to manually and explicitly selected goals of an attacker of a penetration testing campaign.

Specific examples of step S401 of the flow-chart of FIG. 21 are discussed below with reference to FIGS. 22A-22B.

The term 'goal of an attacker' is defined below—see "dd" of the 'Definitions Section.'

In step S401 of FIG. 21, the penetration testing system receives (i.e. via the user interface of a computing device), one or more manually-entered inputs, where the one or more manually-entered inputs are explicitly selecting one or more goals of the attacker of the penetration testing campaign.

A first example is presented in FIG. 22A which relates to the example of the GUI element 330C.

Three attacker goals are listed in GUI element 330C: (i) a goal to copy a file having a user-specified file-name from a user-specified network node and export it to the attacker—if the user selects "YES" then the subsequent penetration testing campaign is performed in step S405 such that the attacker is assumed to have this goal; (ii) a goal to encrypt a file having a user-specified file-name residing on a user-specified network node—if the user selects "YES" then the subsequent penetration testing campaign is performed in step S405 such that the attacker is assumed to have this goal; and (iii) a goal to compromise a user-specified number of network nodes without caring which nodes they are—if the user selects "YES" then the subsequent penetration testing campaign is performed in step S405 such that the attacker is assumed to have this goal.

FIG. 22A presents three frames—Frame 1 at time t1, Frame 2 at time t2, and Frame 3 at time t3. In FIG. 22A the default values are indicated by a gray 'wave' shading.

Frame 1 of FIG. 22A illustrates an initial state (i.e. at time t1) where only default values are presented as follows: none of the presented goals are goals of the attacker.

In Frame 2 of FIG. 22A at time t2, the user engages the GUI element 330C (e.g. by clicking when a mouse pointer is within the circle next to the capability labeled "Encrypting a file having a specific file name in a specific node) to override the default value, changing from "NO" to "YES." The user also types in the file name and the host-node-ID.

In Frame 3 of FIG. 22A at time t3, when the user's mouse-pointer is located within the 'begin' button 334, the user provides a mouse-click, thereby triggering steps S405 and S409 of FIG. 21, discussed below.

FIG. 22B shows another example, where the manual and explicit selecting of the one or more goals of the attacker of the penetration testing campaign is performed by the user accepting, by engaging an 'accept recommendation' button 328C, a recommendation provided by the penetration testing system.

Frame 1 of FIG. 22B illustrates an initial state (i.e. at time t1) of GUI element 330C' where only system-recommended values are presented as follows: (i) exporting a specific file from a specific node is not a goal of the attacker; (ii) encrypting a file having a specific file name in a specific node is a goal of the attacker and (iii) compromising a number of network nodes, without caring which network nodes they are is not a goal of the attacker.

Thus, the {N,Y,N} values are illustrated in diagonal gray lines, indicating that these values have not been manually and explicitly selected by the user—in the initial state of FIG. 22B, the {N,Y,N} values are only system-generated recommendations.

In Frame 2 of FIG. 22B at time t2, the user engages the GUI element 328C by clicking on the circle labelled 'accept recommendation' to accept the system-recommended values presented in Frame 1 of FIG. 22B.

In Frame 3 of FIG. 22B, the values {N,Y,N} that were previously (i.e. in Frame 1) presented in gray diagonal shading (i.e. when they were only system-recommended values) are now presented in solid black. Because the user accepted the system-generated recommendations in Frame 2, the values {N,Y,N} are now manually and explicitly selected values, and are presented as such in Frame 3 of FIG. 22B. It should be noted that the user is not forced to accept the system-generated recommendations, but may override them. This freedom of choice is what makes the selection of the attacker goals a manual and explicit selection.

In Frame 4 of FIG. 22B, the user clicks on the 'begin' button to begin the penetration testing campaign using the manually and explicitly selected {N,Y,N} values.

It should be noted that in the example of FIG. 22B the goal recommended by the system required specifying a file name and a node ID. In this example, the system provides the complete specification of the goal, including values for the file name and the host ID, so that if the user wants to accept the recommendation he only has to select the 'accept recommendation' button 328C. However, this does not have to be so—in other embodiments when the system recommends a goal of the attacker it does not provide values for some or all of the parameters required for specifying the recommended goal. In such embodiments, if the user wants to accept the recommendation he has to manually provide values for the parameters of the goal before selecting the 'accept recommendation' button 328C.

In step S405 of FIG. 21, the following is performed: executing the penetration testing campaign, by the penetration testing system and according to the manually and explicitly-provided selection of the one or more goals of the attacker, so as to test the networked system.

In step S409 of FIG. 21, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) (for example, from the computing device mentioned in step S401 to another computing device) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 23:
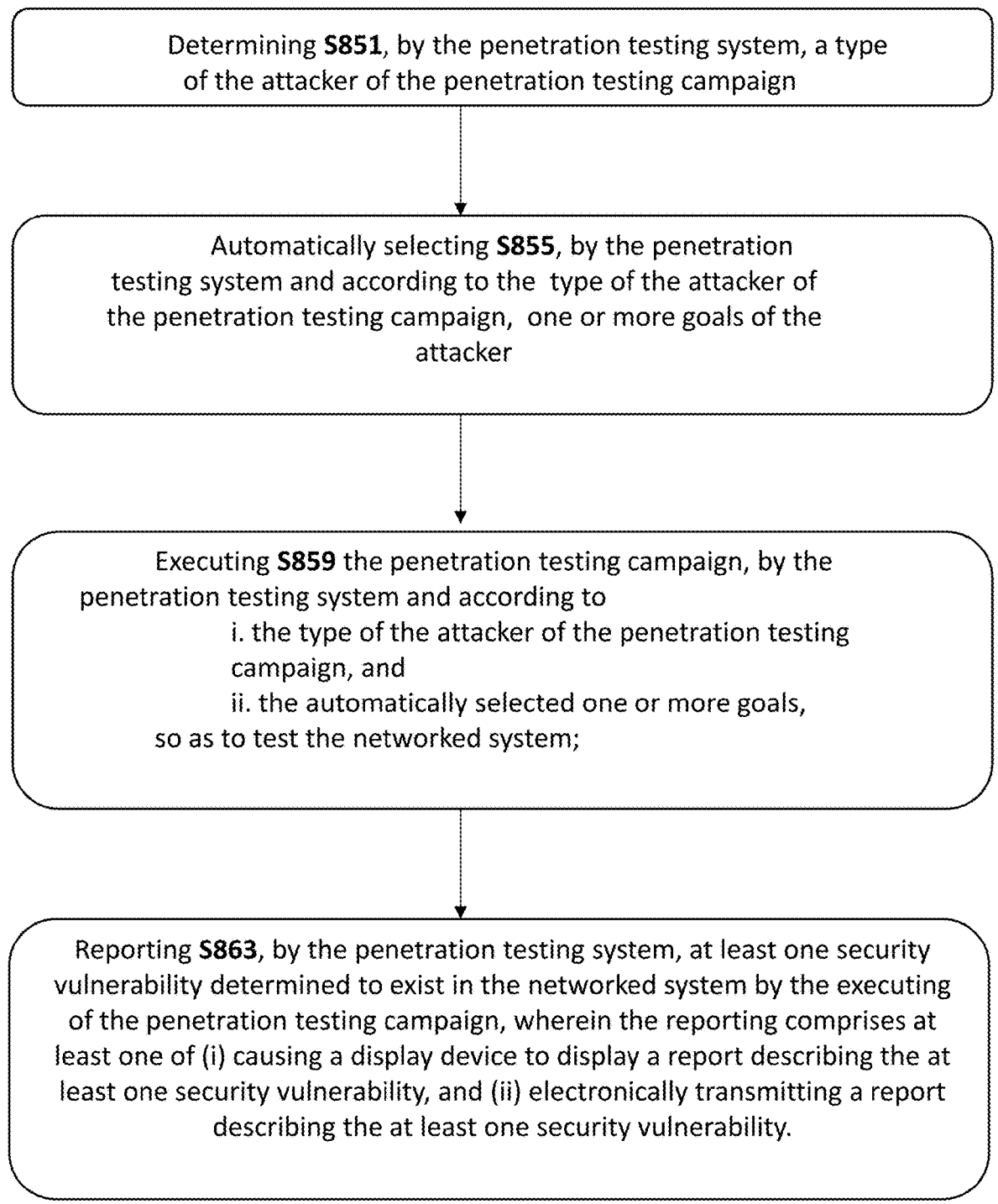

A Discussion of FIG. 23

FIG. 23 is a flow chart of a method of penetration testing of a networked system by a penetration testing system that is controlled by a user interface of a computing device so that a penetration testing campaign is executed according to an automatic selecting of one or more goals of an attacker of the penetration testing campaign.

In step S851 of FIG. 23, the following is performed: determining, by the penetration testing system, a type of the attacker of the penetration testing campaign. The type of attacker can be determined in any manner—e.g. according to user-input or automatically or in any other manner.

In step S855 of FIG. 23, the following is performed: automatically selecting, by the penetration testing system and according to the type of the attacker of the penetration testing campaign, one or more goals of the attacker.

In step S859 of FIG. 23, the following is performed: executing the penetration testing campaign, by the penetration testing system and according to i. the type of the attacker of the penetration testing campaign, and ii. the automatically selected one or more goals, so as to test the networked system.

In step S863 of FIG. 23, the following is performed: reporting, by the penetration testing system, at least one security vulnerability determined to exist in the networked system by the executing of the penetration testing campaign, wherein the reporting comprises at least one of (i) causing a display device to display a report describing the at least one security vulnerability, and (ii) electronically transmitting (e.g. over a computer network) a report describing the at least one security vulnerability.

In one example where the reporting comprises causing a display device to display a report describing the at least one security vulnerability, a computing device that performs the reporting causes a local display device (e.g. either residing in a common housing with the computing device that performs the reporting or connected via a local device interface) to display the report. Alternatively or additionally, data describing the report may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory, and the reporting step may be completed only after some delay (e.g. even a delay of weeks or months or years).

Figure 24A:
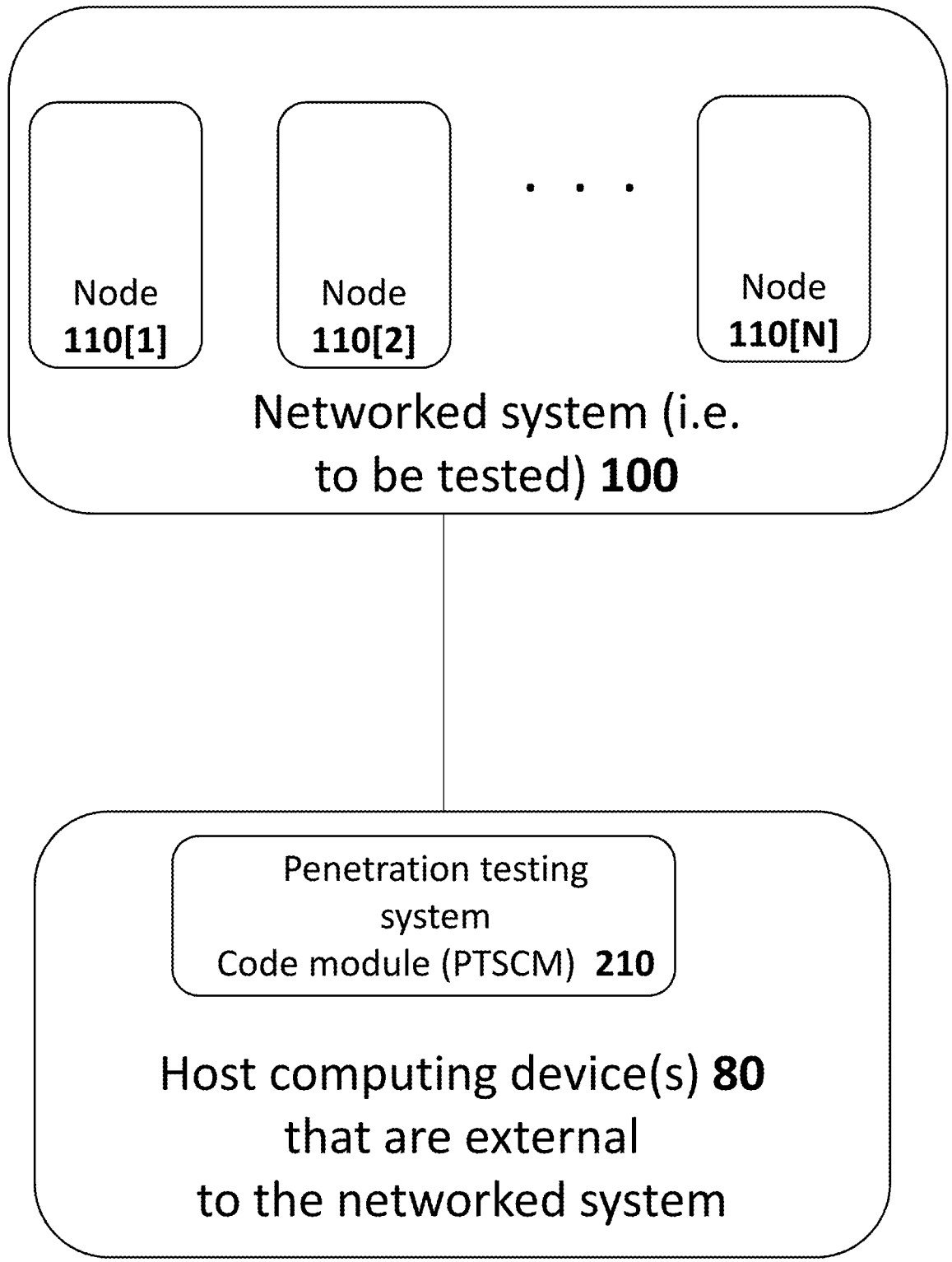
FIGS. 24A-24B are two block diagrams showing examples of configurations of networked systems that are being tested by a penetration testing system code module (PTSCM).
Figure 24B:
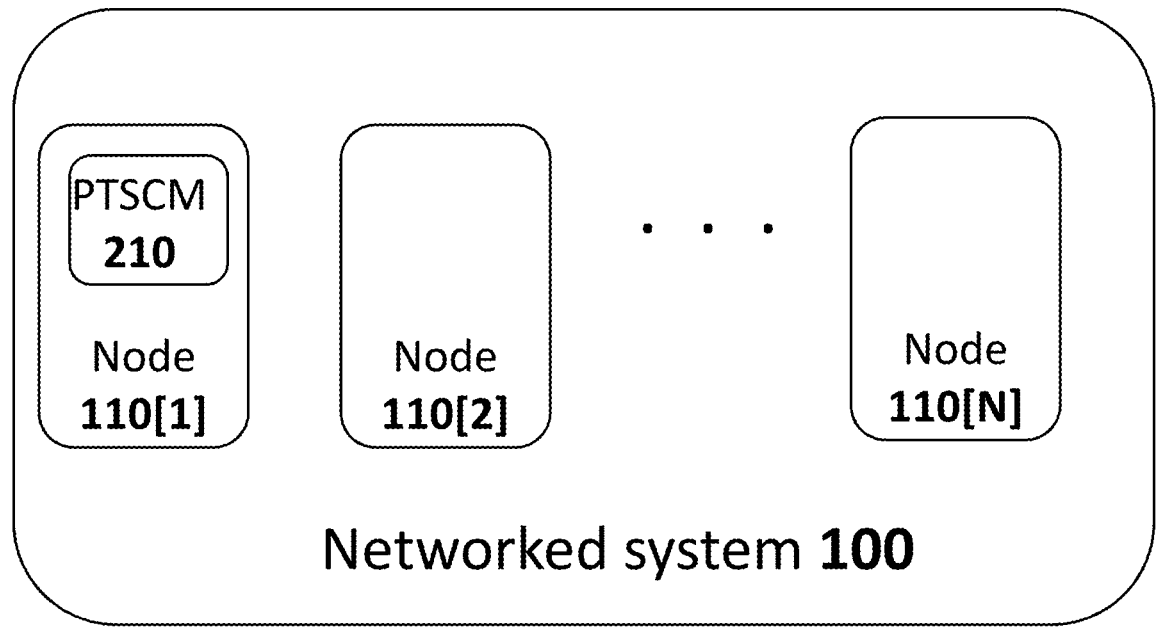
Figure 25:
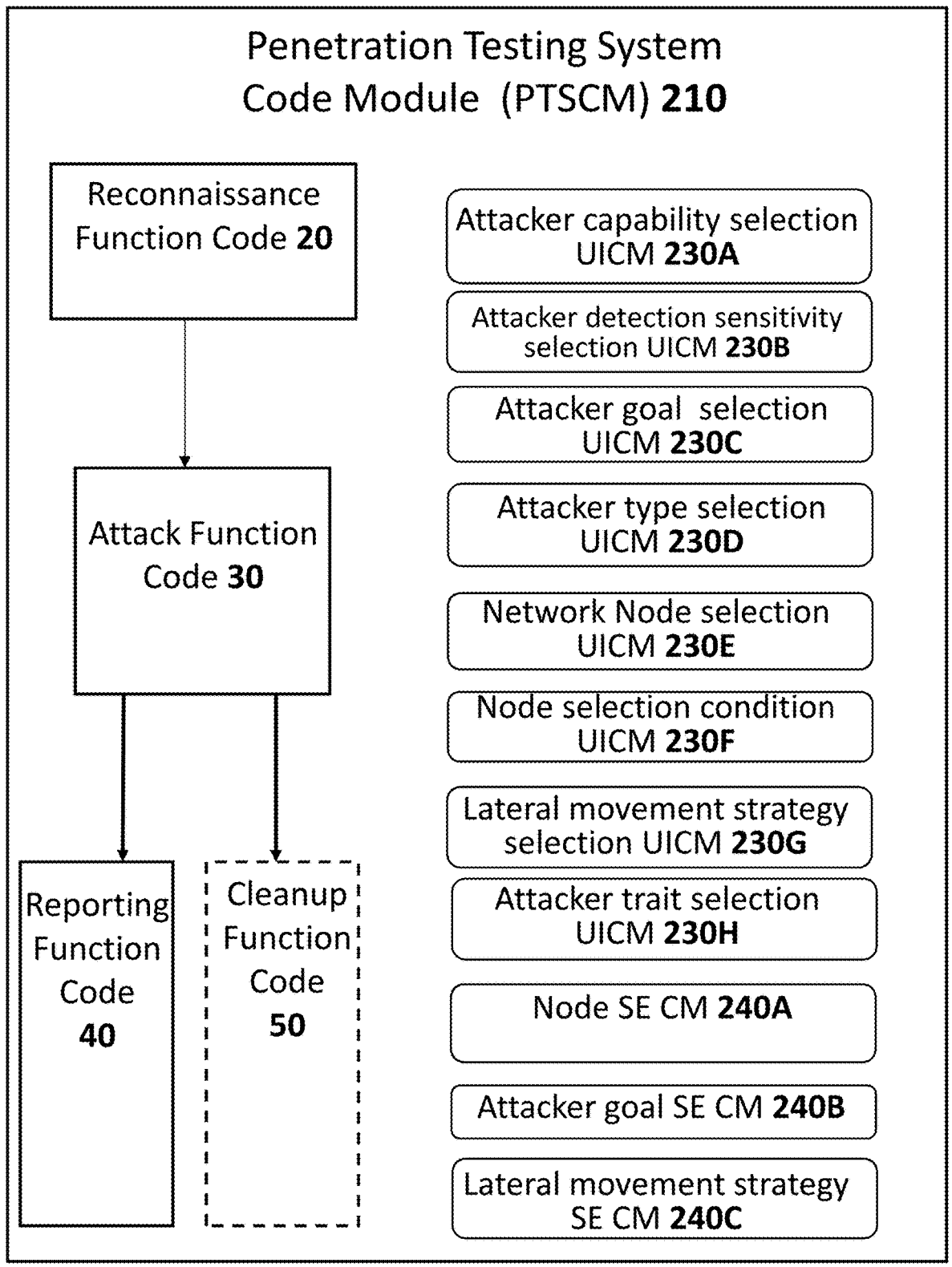
FIG. 25 is a block diagram of one example of a penetration testing system code module.

A Discussion of FIGS. 24A-24B and 25

In the example of FIG. 24A, at least a portion of the penetration testing system is implemented by a code module 210 (e.g. comprising one or more of reconnaissance function code 20, attack function code 30, and reporting function code 40; and additionally comprising user-interface code) that resides on and is executed by host computing device(s) 80. In this example, the host computing device(s) are external to the networked system to be tested.

In the example of FIG. 24B, at least a portion of the penetration testing system code 210 resides on and is executed by one or more of the network nodes 110 of the networked-system to be penetration tested.

One example of a penetration testing system code module 210 is shown in FIG. 25. In FIG. 25, (i) "CM" is an abbreviation for 'code module'; (ii) UICM is an abbreviation for 'user interface code module'; (iii) SE is an abbreviation for 'selection engine'; and (iv) PTSCM is an abbreviation for penetration testing system code module.

Penetration testing system code module 210 includes one or more of (i.e. any combination of): attacker capability selection user interface code module 230A (e.g. which produces GUI element 330A), attacker detection sensitivity selection user interface code modules 230B (e.g. which produces GUI element 330B), attacker goal selection user interface code module 230C (e.g. which produces GUI element 330C), attacker type selection user interface code module 230D (e.g. which produces GUI element 330D), network node selection user interface code module 230E (e.g. which produces GUI element 330E), node selection condition user interface code module 230F (e.g. which produces GUI element 330F), lateral movement strategy selection user interface code module 230G (e.g. which produces GUI element 330G), attacker trait selection user interface code module 230H (e.g. which produces GUI element 330H); node selection engine (SE) code module 240A (e.g. for performing step S805 discussed above); attacker goal selection engine (SE) code module 240B (e.g. for performing step S855 discussed above); lateral movement strategy selection engine (SE) code module 240C (e.g. for performing step S905 discussed above).

Additional Discussion

Embodiments of the invention relate to a penetration testing system that provides the user great flexibility in defining the specifications of a campaign he wants to run for testing a networked system. In some embodiments, the user of the penetration testing system can directly and independently select values for multiple information items of a campaign. This is different from prior art systems in which the user selects a pre-defined scenario from a list of scenarios, and is also different from prior art systems in which the user indirectly selects a pre-defined scenario by selecting a value for one information item of the campaign that causes the system to automatically choose a specific pre-defined scenario that is the only available scenario having that value for that information item, or causes the system to automatically choose a scenario from a plurality of the available pre-defined scenarios which have that value for that information item. In some embodiments, the user of the penetration testing system can directly select the type of the attacker that will be used in a campaign. Specifically, such selection is done without committing to specific values of other information items of the campaign according to a pre-defined scenario. In other words, after selecting the type of attacker, the user may for example select the goal of the attack independently of his type of attacker selection. This is different from prior art systems in which when the user selects a type of attacker, he is tying his hands by committing to a fully-defined scenario and giving up any options of independently selecting values for other information items of the campaign he is initiating. The selection of the type of the attacker is typically done by selecting from a closed list of alternatives, for example by choosing from a drop-down list. In some embodiments, the user of the penetration testing system can directly select the capabilities of the attacker that will be used in a campaign. An attacker may have one or more capabilities. The selection of the capabilities of the attacker is typically done by selecting from a closed list of alternatives, for example by marking one or more checkboxes. The list of alternatives to the user may depend on the type of the attacker previously selected for the campaign. In some embodiments, the user of the penetration testing system can directly select the methods of a capability of the attacker that will be used in a campaign. A capability of an attacker may have one or more methods. The selection of the methods is typically done by selecting from a closed list of alternatives, for example by marking one or more checkboxes. The list of alternatives to the user may depend on the specific type of the attacker and on the specific capability previously selected. In some embodiments, the user of the penetration testing system can directly select the traits of an attacker that will be used in a campaign. An attacker may have one or more traits. The selection of the traits is typically done by selecting from a closed list of alternatives, for example by marking one or more checkboxes. The list of alternatives to the user may depend on the specific type of the attacker previously selected for the campaign. In some embodiments, the user of the penetration testing system can directly select one or more network nodes of the tested networked system that are assumed to be already compromised at the beginning of the test. Such network nodes are referred to herein as "initial red network nodes" or "initially red network nodes". This selection is useful for assessing the penetration capability of an attacker to other network nodes of the networked system once those one or more initial red network nodes are compromised. For example, a CISO of an organization may fear that a specific network node of the organization is more prone than other nodes to be compromised, because it is directly facing the external world or because there are employees with access rights to that specific node that are less trustworthy than the other employees of the organization. In such case the CISO may want to know what might happen if his fears will be justified and run a specific penetration test for finding the answer.

In some embodiments, the selection of the initial red network nodes may be done by presenting the user with a graphical map of the networked system in which each network node is shown as a circle identified by a name or by an IP address. Using the graphical map, the user can point, using a mouse or some other pointing device, to each network node to be initially red and press a button (a pointing device button or a keyboard button) for selecting that node to be initially red. Alternatively, the user may be presented with a list of network nodes identified by a name or by an IP address, where each node is accompanied by a corresponding checkbox. Marking a checkbox selects the corresponding node to be initially red.

In some embodiments, the user also has the option to select that there will be no initially red nodes, in which case the penetration test will start with the assumption that none of the network nodes is compromised.

In some embodiments, the user of the penetration testing system can select the one or more network nodes of the tested networked system that are assumed to be already compromised at the beginning of the test by an open definition, rather than by directly identifying those nodes by the methods explained above. By "open definition" it is meant that the user provides a condition a node must satisfy in order to be selected as an initial red network node. For example, the user may specify that all network nodes having a direct connection to the outside world are selected to be initially red. Or that all network nodes that are cellular mobile devices are selected to be initially red. Or that all network nodes that are MacBook computers are selected to be initially red. Or that all network nodes that are running the Windows XP operating system are selected to be initially red. Or that all network nodes having installed Internet Explorer version 8 or earlier are selected to be initially red.

In some embodiments, the selection condition may be a combination of multiple conditions. For example, the user may specify that all network nodes that are both running Windows XP and having installed Internet Explorer version 8 or earlier are selected to be initially red. Additionally, the user may define multiple selection conditions that operate in parallel. For example, one condition is that a node is running Windows XP, and a second condition is that the a node has installed Internet Explorer version 8 or earlier. The effective result of having these two selection conditions is equivalent to specifying that all network nodes having either Windows XP or having installed Internet Explorer version 8 or earlier are selected to be initially red. Also, the user may be able to define a selection condition by using a "not" operator. For example, the user may select that all user nodes that do not have a specific anti-virus installed are selected to be initially red.

In some embodiments, the selection of the initially red network nodes may be done by the user using a GUI (Graphical User Interface). The GUI may include selection of single alternatives from drop-down closed lists, selection of one or more alternatives from closed lists by marking checkboxes, selection of logic operators (AND, OR, NOT) for combining conditions, and any other means required for the user for defining his selection of initially red network nodes.

In some embodiments, the penetration testing system may be configured to relieve the user from the burden of selecting the condition to be satisfied by the initial red network nodes by automatically determining which nodes are the most likely to be compromised in the networked system, for example because they are the ones facing the external world. In such case the system tells the user which nodes it recommends to select as the initial red nodes, and the user may then either confirm the recommendation or disagree with it and make his own selection according to the methods described above.

In some embodiments, the penetration testing system may be configured to completely leave the selection of the initial red network nodes in the hands of the system. In such case the system automatically determines which nodes it recommends to be selected as the initial red nodes, for example those nodes of the networked system that are the most likely to be compromised by the type of attacker previously selected for the campaign, and then selects those nodes to be the initial red network nodes without asking for user confirmation.

In some embodiments, the user of the penetration testing system can directly select the goals of the attacker during a campaign. An attacker may have one or more goals in a campaign. The selection of the goals of the attacker is typically done by selecting from a closed list of alternatives, for example by marking one or more checkboxes or by selecting a single goal from a drop-down list. For some goals, in addition to marking a checkbox or selecting from a drop-down list, the user also must specify one or more parameters. For example, for the goal "export a specific file from a specific network node" the user should specify the file name and the network node. The list of goals to the user may depend on the type of the attacker previously selected for the campaign.

In some embodiments, the user of the penetration testing system can directly select the lateral movement strategy of the attacker during the campaign. The selection of the lateral movement strategy is typically done by selecting from a closed list of alternatives, for example by selecting a single alternative from a drop-down list. For some strategies, the user also has to specify a parameter. For example, for a lateral movement strategy in which a priority is given to compromising network nodes satisfying a specific condition, the user has to specify the condition, possibly selecting it from a second drop-down list that becomes operative after the selection of that strategy from the first drop-down list. The list of alternatives to the user for selecting the lateral movement strategy may depend on the type of the attacker and on the goals of the attacker previously selected for the campaign.

In some embodiments, the penetration testing system may be configured to relieve the user from the burden of selecting the lateral movement strategy by automatically determining the most effective strategy for the goals previously selected for the campaign. In such case the system tells the user what lateral movement strategy it recommends to select for the campaign, and the user may then either confirm the recommendation or disagree with it and make his own selection according to the methods described above.

In some embodiments, the penetration testing system may be configured to completely leave the selection of the lateral movement strategy in the hands of the system. In such case the system automatically determines the strategy it recommends to be selected for the campaign, for example the strategy that is most effective for achieving the goals previously selected for the campaign, and then selects that strategy without asking for user confirmation.

In some embodiments, the user performs all the above selections by operating a console with a GUI supporting all the functions described above. The console is typically associated with a remote computing device that includes a processor that executes software implementing part or all of the penetration testing software functions during the execution of a campaign. Alternatively, the console may be associated with a separate computing device that is different from the remote computing device executing the campaign and is in communication with it.

Some embodiments relate to a first method (see FIG. 26) that is most useful for setting up a campaign of penetration testing for reporting security vulnerabilities of a networked system, the campaign being executed by a penetration testing system which is controlled by a user interface of a computing device, the method comprising:

1. manually selecting, by a user of the penetration testing system and using the user interface of the computing device, a first value for a first information item of a campaign of the penetration testing system;
2. subsequent to the manually selecting the first value, manually selecting, by the user of the penetration testing system and using the user interface of the computing device, a second value for a second information item of the campaign of the penetration testing system, the manual selection of the second value being independent of the manual selection of the first value;
3. executing, by the penetration testing system, the campaign of the penetration testing system for testing the networked system, where the campaign is executed using the first value for the first information item and the second value for the second information item;
4. reporting at least one security vulnerability determined by the campaign to exist in the networked system, to the computing device or to another computing device.

The first information item may be the type of the attacker of the campaign.

Some embodiments relate to a second method (see FIG. 27) that is most useful for setting up a campaign of penetration testing for reporting security vulnerabilities of a networked system, the campaign being executed by a penetration testing system which is controlled by a user interface of a computing device, the method comprising:
1. manually selecting, by a user of the penetration testing system and using the user interface of the computing device, a capability of an attacker of a campaign of the penetration testing system;
2. executing, by the penetration testing system, the campaign of the penetration testing system for testing the networked system, where the campaign is executed using the manually selected capability of the attacker;
3. reporting at least one security vulnerability determined by the campaign to exist in the networked system, to the computing device or to another computing device.

The step of manually selecting the capability may include the following steps:
1. automatically determining, by the penetration testing system, a recommendation for selecting a capability of the attacker;
2. presenting to the user, by the penetration testing system, the recommended capability;
3. manually approving, by the user and using the user interface of the computing device, to use the recommended capability as a capability of the attacker of the campaign.

The second method may further comprise:
1. subsequent to the manually selecting the capability, manually selecting, by the user of the penetration testing system and using the user interface of the computing device, a value for a second information item of the campaign of the penetration testing system, where: (i) the second information item is not a capability of the attacker, (ii) the manual selection of the value is independent of the manual selection of the capability, and (iii) the executing of the campaign is also using the value for the second information item, in addition to using the manually selected capability.

Alternatively, the second method may further comprise:
1. subsequent to the manually selecting the capability, manually selecting, by the user of the penetration testing system and using the user interface of the computing device, a method of the capability, where the executing of the campaign is also using the manually selected method.

Some embodiments relate to a third method (see FIG. 28) that is most useful for setting up a campaign of penetration testing for reporting security vulnerabilities of a networked system, the campaign being executed by a penetration testing system which is controlled by a user interface of a computing device, the method comprising:
1. manually selecting, by a user of the penetration testing system and using the user interface of the computing device, a trait of an attacker of a campaign of the penetration testing system;
2. executing, by the penetration testing system, the campaign of the penetration testing system for testing the networked system, where the campaign is executed using the manually selected trait of the attacker;
3. reporting at least one security vulnerability determined by the campaign to exist in the networked system, to the computing device or to another computing device.

The step of manually selecting the trait of the attacker may include the following steps:
1. automatically determining, by the penetration testing system, a recommended trait of the attacker;
2. presenting to the user, by the penetration testing system, the recommended trait;
3. manually approving, by the user and using the user interface of the computing device, to use the recommended trait as a trait of the attacker of the campaign.

Some embodiments relate to a fourth method (see FIG. 29) that is most useful for setting up a campaign of penetration testing for reporting security vulnerabilities of a networked system, the campaign being executed by a penetration testing system which is controlled by a user interface of a computing device, the method comprising:
1. manually selecting, by a user of the penetration testing system and using the user interface of the computing device, one or more network nodes of the networked system that are assumed to be already compromised at the beginning of the campaign of the penetration testing system;
2. executing, by the penetration testing system, the campaign of the penetration testing system for testing the networked system, where the campaign is executed assuming the one or more network nodes are already compromised at the beginning of the campaign;
3. reporting at least one security vulnerability determined by the campaign to exist in the networked system, to the computing device or to another computing device.

The step of manually selecting the one or more network nodes may include providing a condition, where a network node is included in the one or more network nodes if and only if it satisfies the condition.

Alternatively, the step of manually selecting the one or more network nodes may include the following steps:
i. automatically determining, by the penetration testing system, one or more network nodes that are recommended to be assumed to be already compromised at the beginning of the campaign of the penetration testing system;
ii. presenting to the user, by the penetration testing system, the recommended one or more network nodes;
iii. manually approving, by the user and using the user interface of the computing device, to use the recommended one or more network nodes as the one or more network nodes assumed to be already compromised at the beginning of the campaign.

Some embodiments relate to a fifth method (see FIG. 30) that is most useful for setting up a campaign of penetration testing for reporting security vulnerabilities of a networked system, the campaign being executed by a penetration testing system which is controlled by a user interface of a computing device, the method comprising:

1. manually selecting, by a user of the penetration testing system and using the user interface of the computing device, a goal of an attacker of a campaign of the penetration testing system;
2. executing, by the penetration testing system, the campaign of the penetration testing system for testing the networked system, where the campaign is executed using the manually selected goal of the attacker;
3. reporting at least one security vulnerability determined by the campaign to exist in the networked system, to the computing device or to another computing device.

The step of manually selecting the first value for the goal may include the following steps:

1. automatically determining, by the penetration testing system, a recommended value for the goal of the campaign;
2. presenting to the user, by the penetration testing system, the recommended value;
3. manually approving, by the user and using the user interface of the computing device, to use the recommended goal as a goal of the attacker of the campaign.

Some embodiments relate to a sixth method (see FIG. 31) that is most useful for setting up a campaign of penetration testing for reporting security vulnerabilities of a networked system, the campaign being executed by a penetration testing system which is controlled by a user interface of a computing device, the method comprising:

1. manually selecting, by a user of the penetration testing system and using the user interface of the computing device, a lateral movement strategy of an attacker of the campaign of the penetration testing system;
2. executing, by the penetration testing system, the campaign of the penetration testing system for testing the networked system, where the campaign is executed using the manually selected lateral movement strategy of the attacker;
3. reporting at least one security vulnerability determined by the campaign to exist in the networked system, to the computing device or to another computing device.

The step of manually selecting the lateral movement strategy may include the following steps:

1. automatically determining, by the penetration testing system, a recommended value for the lateral movement strategy of the campaign;
2. presenting to the user, by the penetration testing system, the recommended value;
3. manually approving, by the user and using the user interface of the computing device, to use the recommended lateral movement strategy as a lateral movement strategy of the attacker of the campaign.

Definitions

This disclosure should be interpreted according to the definitions below. In case of a contradiction between the definitions in this Definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

a. "computing device"—Any device having a processing unit into which it is possible to install code that can be executed by the processing unit. The installation of the code may be possible even while the device is operative in the field or it may be possible only in the factory.

b. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

c. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

d. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

e. "module"—A portion of a system that implements a specific task. A module may be composed of hardware, software or any combination of both. For example, in a module composed of both hardware and software, the hardware may include a single computing device or multiple computing devices, and the software may include software code executed by the single computing device or by the multiple computing devices.

f. "network node a of networked system" or "node of a networked system"—Any computing device or peripheral device that belongs to the networked system.

g. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, and the like. A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

h. "security vulnerability of a networked system" or "vulnerability of a networked system"-A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like. A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

i. "vulnerability management"—A cyclical practice of identifying, classifying, remediating, and mitigating vulnerabilities of network nodes in a networked system.

j. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported. Unlike a vulnerability management process which operates at the level of isolated vulnerabilities of individual network nodes, a penetration test may operate at a higher level which considers vulnerabilities of multiple network nodes that might be jointly used by an attacker to compromise the networked system. A penetration testing process involves at least the following functions: (i) a reconnaissance function, (ii) an attack function, and (ii) a reporting function. It should be noted that the above functions do not necessarily operate sequentially according to the above order, but may operate in parallel or in an interleaved mode. Unless otherwise explicitly specified, a reference to penetration testing should be understood as referring to automated penetration testing.

k. "automated penetration testing"—Penetration testing in which at least one of the reconnaissance function, the attack function and the reporting function is at least partially automated.

l. "penetration testing system"—A system capable of performing penetration testing, regardless if composed of hardware, software or combination of both.

m. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system. The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

n. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any. The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system. The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

o. "reporting function"—The function in a penetration testing process that handles reporting of results of the penetration testing. The reporting comprises at least one of (i) displaying a report to a user of the computing device implementing the reporting function, and (ii) transmitting a report from the computing device implementing the reporting function to another computing device. The functionality of a reporting function may be implemented by software executing in a remote computing device, for example in the computing device implementing the attack function of the penetration testing.

p. "recovery function"—The function in a penetration testing process that handles cleaning-up after a penetration test. The recovery includes undoing any operation done during the penetration testing process that results in compromising the tested networked system. The functionality of a recovery function may be implemented by any combination of (i) software executing in a remote computing device, for example in the computing device implementing the attack function of the penetration testing, (ii) an attack agent software module executing in one or more network nodes of the tested networked system.

q. "a campaign of penetration testing" or "penetration testing campaign"—A specific run of a specific test of a specific networked system by the penetration testing system.

r. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

s. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign. An information item of a campaign is either a primary information item of the campaign or a secondary information item of the campaign. A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy. A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

t. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

u. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

v. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

w. "pre-defined scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system. A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

x. "attacker" or "threat actor"—An entity, whether a single person, a group of persons or an organization, that might conduct an attack against a networked system by penetrating it for uncovering its security vulnerabilities and/or for compromising it.

y. "a type of an attacker"—A classification of the attacker that indicates its main incentive in conducting attacks of networked systems. Typical values for a type of an attacker are state-sponsored, opportunistic cyber criminal, organized cyber criminal and insider. An attacker can have only a single type.

z. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities. An attacker can have one or multiple capabilities.

aa. "a method of a capability"—A combination of (i) an algorithm for implementing the capability, and (ii) a required condition for the capability to be applicable and feasible for an attacker having that capability. For example, an opportunistic cyber-criminal may have the knowledge of forcing RCE (Remote Code Execution) in a browser of a targeted network node using a simple and well-known algorithm, but that algorithm is only applicable when the browser is an old version of IE (Internet Explorer) not higher than a specific version number. On the other hand, a state-sponsored attacker may have the knowledge of forcing RCE using a complex and sophisticated algorithm, that algorithm being applicable to every type of browser and every version of it. The two attackers both have the same capability of forcing RCE for browsers, but have different methods for that capability—for one attacker the RCE capability is implemented by a first method which is limited to a certain subclass of browsers, while for the other attacker the RCE capability is implemented by a second method which is applicable to all browsers. The condition of a method may be the trivial condition that is always satisfied, as is demonstrated in the above example in which a state-sponsored attacker has an RCE capability with an always-true condition. A capability can have one or multiple methods.

bb. "a trait of an attacker"—A behavioral and non-technical feature of the attacker that may affect how he conducts his attack. A trait may be a condition controlling the conducting of the attack by the attacker. An example of a trait of an attacker is the sensitivity of the attacker to detection (a.k.a. the aggression level of the attacker). A state-sponsored attacker may be assumed to only use his capabilities if the attack can be hidden and remain undetected by the organization owning the attacked networked system. On the other hand, an opportunistic cyber criminal that has the same capabilities and methods may be assumed to completely ignore considerations of being detected or not. The two attackers have the same capabilities and methods, but different values for the sensitivity to detection trait, that control their operation during the attack. Alternatively, a trait may have several (more than two) discrete possible values. For example, the sensitivity to detection trait described above, may be assigned any one of the values "highly sensitive", "moderately sensitive" and "not sensitive". Alternatively, a trait may have a value selectable from a continuous scale, for example from the range [0 . . . 100]. An attacker can have one or multiple traits.

cc. "a level of sensitivity to detection of an attacker" or "an aggression level of an attacker"—The extent to which the attacker prefers not to be detected while carrying out his attack. A high level of sensitivity to detection or a high aggression level indicate a strong preference for not being detected. A low level of sensitivity to detection or low aggression level indicate weak preference for not being detected. The sensitivity/aggression level may be specified as one of two possible values (e.g. "sensitive" vs. "not sensitive"). Alternatively, the sensitivity/aggression level may be specified as one of several (more than two) discrete possible values (e.g. "highly sensitive", "moderately sensitive", "moderately not sensitive", "highly not sensitive"). Alternatively, the sensitivity/aggression level may be specified as a value selectable from a continuous scale (e.g. from the range [0 . . . 10]).

dd. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

ee. "a resource-specific goal of an attacker"—A goal of the attacker that has a characteristic of being associated with a specific resource in the tested networked system. Examples of resource-specific goals are deleting a specific folder, shutting down a specific peripheral device, and exporting a specific file out of the networked system. The specific resource may be identified by a name (e.g. a file name), an address (e.g. a network address of a peripheral device), a serial number (e.g. a serial number of a peripheral device), or in any other way that unambiguously identifies it. Note that a goal specifying a resource existing in multiple identical copies in the networked system (e.g. a file existing in multiple network nodes), where the attacker does not mind which of the copies is targeted, is a resource-specific goal.

ff. "a file-specific goal of an attacker"—A goal of the attacker that has a characteristic of being associated with a specific file in the tested networked system. Examples of file-specific goals are deleting a specific file, exporting a specific file out of the networked system, and encrypting a specific file. The specific file may be identified by a name (e.g. a file name), or in any other way that unambiguously identifies it. Note that a goal specifying a file existing in multiple identical copies in the networked system (e.g. a file existing in multiple network nodes), where the attacker does not mind which of the copies is targeted, is a file-specific goal. Also note a file-specific goal is also a resource-specific goal.

gg. "a node-count-maximizing goal of an attacker"—A goal of the attacker that has a characteristic of being associated with maximizing the number of network nodes satisfying a given condition. Examples of node-count-maximizing goals are compromising as many nodes as possible, and encrypting at least one file on as many nodes as possible. A goal that is associated with increasing the number of network nodes satisfying a given condition until a given networked-system-level condition is satisfied, is also a node-count-maximizing goal. An example of such goal is compromising enough network nodes so that the ratio of the number of already-compromised nodes to the number of not-yet-compromised nodes in the networked system is higher than a given threshold. However, a goal of compromising a given number of nodes in the networked system is not a node-count-maximizing goal, because it does not include a networked-system-level condition.

hh. "a file-count-maximizing goal of an attacker"—A goal of the attacker that has a characteristic of being associated with maximizing the number of files satisfying a given condition. Examples of file-count-maximizing goals are exporting out of the networked system as many files as possible, and encrypting as many files as possible. A goal that is associated with increasing the number of files satisfying a given condition until a given networked-system-level condition is satisfied, is also a file-count-maximizing goal. An example of such goal is exporting outside the networked system of files having a total size that is more than a given size. However, a goal of exporting a given number of files is not a file-count-maximizing goal, because it does not include a networked-system-level condition.

ii. "an encryption-related goal of an attacker"—A goal of an attacker that has a characteristic of being associated with encrypting one or more files. Examples of encryption-related goals are encrypting a specific file, encrypting as many files as possible, and encrypting as many files of a specific file type. Note that an encryption-related goals is also a file-damage-related goal.

jj. "a file-exporting goal of an attacker"—A goal of an attacker that has a characteristic of being associated with exporting one or more files out of the networked system. Examples of file-exporting goals are exporting a specific file, exporting as many files as possible, and exporting as many files of a specific type.

kk. "a file-size-related goal of an attacker"—A goal of an attacker that has a characteristic of being associated with the file size of one or more files. Examples of file-size-related goals are exporting a file larger than 100 Megabytes, exporting one or more files whose combined size is larger than 100 Megabytes, and encrypting one or more files whose combined size is larger than 100 Megabytes.

ll. "a file-type-related goal of an attacker"—A goal of an attacker that has a characteristic of being associated with a file type of one or more files. Examples of file-type-related goals are exporting out of the networked system of as many files of a given type as possible, and encrypting as many files of a given type as possible.

mm. "a file-damage-related goal of an attacker"—A goal of an attacker that has a characteristic of being associated with damaging one or more files. Examples of file-damage-related goals are deleting a specific file, deleting as many files as possible, and renaming as many files as possible.

nn. "a node-condition-based goal of an attacker"—A goal of an attacker that has a characteristic of being associated with a Boolean condition applied to network nodes of the tested networked system. One example of a node-condition-based goal is compromising a given number of network nodes, all of which are members of a subset of the nodes of the tested networked system, where the subset of nodes is defined as all nodes of the tested networked system satisfying a given condition. The condition may be, for example, "running the Windows 7 Operating system" or "being a mobile device". Another example of a node-condition-based goal is compromising all the network nodes that are members of a subset of the nodes of the tested networked system, where the subset of nodes is defined as all the nodes of the tested networked system satisfying a given condition, where the given condition is "having a cellular communication channel".

oo. "a lateral movement strategy of an attacker"—A decision logic applied by the attacker of a campaign for selecting the next network node to try to compromise. A simple example of a lateral movement strategy is a "depth first" strategy. In such strategy the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node. Another simple example is a "breadth search" strategy. In such strategy the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus the distance between two immediate neighbors is one. An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection. An attacker can only have a single lateral movement strategy.

pp. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

qq. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

rr. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

ss. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Also, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

tt. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

uu. "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The remote computing device penetration testing software module may be installed and executed on a single computing device or comprise multiple software components that reside on multiple computing devices, which are parts of the remote computing device of the penetration testing system. For example, a first component of the remote computing device penetration testing software module may implement part or all of the reconnaissance function and be installed and executed on a first computing device, a second component of the remote computing device penetration testing software module may implement part or all of the attack function and be installed and executed on a second computing device, and a third component of the remote computing device penetration testing software module may implement the reporting function and be installed and executed on a third computing device.

vv. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

ww. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event. It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

xx. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

yy. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

zz. "resource of a networked system"—A file in a network node of the networked system, a folder in a network node of the networked system, credentials of a user of the networked system, a peripheral device of a network node of the networked system, or a peripheral device directly attached to a network of the networked system.

aaa. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

bbb. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

ccc. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

ddd. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

eee. "session-hijacking attack"—a cyber-attack where a valid communication session between two network nodes in a networked system is used by an attacker to gain unauthorized access to information or services in the networked computer system.

fff. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

ggg. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

hhh. "administrator of a network node"—Any person that is authorized, among other things, to define or change at least one rule controlling at least one of an access right, a permission, a priority and a configuration in the network node.

iii. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

jjj. "remote computing device" (with respect to a given networked system)—A computing device that executes software implementing part or all of the remote computing device penetration testing software module. A remote computing device may be (i) outside of the given networked system, or (ii) a network node of the given networked system. A remote computing device may (i) be a dedicated computing device that is dedicated only to doing penetration testing, or (ii) also implement other functionality not directly related to penetration testing. A remote computing device is not limited to be a single physical device with a single processing unit. It may be implemented by multiple separate physical devices packaged in separate packages that may be located at different locations. Each of the separate physical devices may include one or multiple processing units. A remote computing device may be (i) a physical computing device, or (ii) a virtual machine running inside a physical computing device on top of a hosting operating system.

kkk. "free event of/in a network node"—An event occurring in the network node which is initiated in and by the network node and is not directly caused or triggered by an entity outside that network node. A free event of a network node may be initiated by a user of the network node, by an operating system of the network node or by an application executing on the network node. A free event of a network node may be either an internal event or a non-internal event of the network node. Examples of free events of a network node are the insertion or removal of a USB removable storage device into/from a socket of the network node, the sending of a query to a web server in response to a user manually entering the query, the sending of an ARP request message by the network node while initializing the network node after manually powering it up, and the sending of a WPAD message by the network node in response to manually typing by the user of a URL into a browser's address input box. Examples of events of a network node that are not free events are the receiving of a network message by the network node, and the sending of a network message by the network node that is done in response to receiving another network message from another network node.

lll. "explicitly selecting"—Directly and clearly selecting, by a human user, of one option out of multiple options available to human user, leaving no room for doubt and not relying on making deductions by a computing device. Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item. Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must being selected because they are essential for the attacker to succeed in meeting the specific goal.

mmm. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection. An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities. An example of a selection that is not an automatic selection is a selection of a value for an information item by (a) calculating by a computing device of a recommended value for the information item, (b) displaying the recommendation to a user, (c) receiving from the user an explicit approval to use the recommended value of the information item, provided that the approving user has an option of rejecting the recommendation and selecting a different value for the information item.

nnn. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

ooo. "user interface"—A man-machine interface that does at least one of (i) displaying information to a user, and (ii) receiving input from the user. Towards this end, any user interface includes at least one of (i) an input device (e.g. touch-screen, mouse, keyboard, joystick, camera) for receiving input from the user, and (ii) a display device (e.g. display screen such as a touch-screen) for displaying information to the user. A user interface typically also includes executable user-interface code for at least one of (i) causing the display device to display information to the user (e.g. to display text associated with radio-buttons or with a check list, or text of a drop-down list) and (ii) processing user-input received via the input device. In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

ppp. "user interface of a computing device"—A user interface that is attached to the computing device and serves the computing device for interacting with the user. An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). A display device of a user interface of a computing device may share a common housing with the computing device (e.g. a touch-screen of a tablet), or may be physically separate from the computing device and be in communication with it, either through a physical port (e.g. an HDMI port) or wirelessly. User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

qqq. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of penetration testing of a networked system by a penetration testing system that is controlled by a user interface of a computing device so that a penetration testing campaign is executed according to a manual and explicit selecting of one or more network nodes of the networked system, the method comprising:

receiving, by the penetration testing system and via the user interface of the computing device, one or more manually-entered inputs, the one or more manually-entered inputs explicitly selecting the one or more network nodes of the networked system, wherein at least one of the manually and explicitly selected nodes is other than the computing device;

in accordance with the manual and explicit selecting of the network nodes, executing the penetration testing campaign by the penetration testing system so as to test the networked system, the penetration testing campaign being executed under the assumption that at the time of beginning the penetration testing campaign, the manually and explicitly selected one or more network nodes of the networked system are both (i) already compromised and (ii) the only network nodes of the networked system that are already compromised; and reporting, by the penetration testing system, at least one security vulnerability determined to exist in the networked system by the executing of the penetration testing campaign, wherein the reporting comprises at least one operation selected from the group consisting of: (i) causing a display device to display a report describing the at least one security vulnerability, (ii) storing the report containing information about the at least one security vulnerability, and (iii) electronically transmitting the report describing the at least one security vulnerability.

2. The method of claim 1, wherein before receiving the one or more manually-entered inputs that explicitly select the one or more network nodes of the networked system, the penetration testing system automatically computes and displays an explicit recommendation for selecting the one or more network nodes that are the only network nodes that are already compromised at the time of beginning the penetration testing campaign.

3. The method of claim 2 wherein the received one or more manually-entered inputs comprise an explicit user approval of the explicit recommendation.

4. The method of claim 1, further comprising:
  subsequent to the receiving by the penetration testing system of the one or more manually-entered inputs that explicitly select the one or more network nodes of the networked system, receiving, by the penetration testing system and via the user interface of the computing device, one or more additional manually-entered inputs, the one or more additional manually-entered inputs explicitly selecting a value for a second information item of the penetration testing campaign, wherein the second information item is not a set of one or more network nodes that are assumed to be the only network nodes that are already compromised at the time of beginning the penetration testing campaign.

5. The method of claim 4 wherein the executing of the penetration testing campaign is performed using both (i) the manually and explicitly selected value for the second information item, and (ii) the assumption that the manually and explicitly selected one or more network nodes of the networked system are the only network nodes that are already compromised at the time of beginning the penetration testing campaign.

6. A system for penetration testing of a networked system, the system comprising:
  a. a network-nodes-selection user interface including one or more user interface components for manual and explicit selection of one or more network nodes, where the network-nodes-selection user interface resides in a computing device and at least one of the manually and explicitly selected one or more network nodes is other than the computing device;
  b. a penetration-testing-campaign module comprising:
    i. at least one penetration-testing-campaign processor; and
    ii. a penetration-testing-campaign non-transitory computer readable storage medium for instructions execution by the one or more penetration-testing-campaign processors, the penetration-testing-campaign non-transitory computer readable storage medium having stored instructions to perform a penetration testing campaign under the assumption that at the time of beginning the penetration testing campaign, the manually and explicitly selected one or more network nodes of the networked system are both (i)) already compromised and (ii) the only network nodes of the networked system that are already compromised; and
  c. a reporting module comprising:
    i. at least one reporting processor; and
    ii. a reporting non-transitory computer readable storage medium for instructions execution by the one or more reporting processors, the reporting non-transitory computer readable storage medium having stored instructions to report at least one security vulnerability determined to exist in the networked system according to results of the penetration testing campaign that is performed by the penetration-testing-campaign module, wherein the reporting module is configured to report the at least one security vulnerability by performing at least one operation selected from the group consisting of: (i) causing a display device to display a report describing the at least one security vulnerability, (ii) storing the report containing information about the at least one security vulnerability, and (iii) electronically transmitting the report describing the at least one security vulnerability.

7. The system of claim 6, further comprising a recommendation module comprising:
  i. at least one recommendation processor;
  ii. a recommendation non-transitory computer readable storage medium for instructions execution by the one or more recommendation processors, the recommendation non-transitory computer readable storage medium having stored instructions to automatically compute an explicit recommendation for selecting the one or more network nodes, wherein the network-nodes-selection user interface displays the explicit recommendation.

8. A method of penetration testing of a networked system by a penetration testing system that is controlled by a user interface of a computing device so that a penetration testing campaign is executed according to a manually and explicitly provided node-selection condition, the method comprising:
  receiving, by the penetration testing system and via the user interface of the computing device, one or more manually-entered inputs, the one or more manually-entered inputs explicitly selecting a Boolean node-selection condition, the manually and explicitly selected node-selection condition defining a proper subset of network nodes of the networked system such that any network node of the networked system is a member of the subset of network nodes if and only if it satisfies the condition;
  in accordance with the manual and explicit selecting of the node-selection condition, executing the penetration testing campaign by the penetration testing system so as to test the networked system, the penetration testing campaign being executed under the assumption that every node of the subset of network nodes is already compromised at the time of beginning the penetration testing campaign; and
  reporting, by the penetration testing system, at least one security vulnerability determined to exist in the networked system by the executing of the penetration testing campaign, wherein the reporting comprises at least one operation selected from the group consisting of: (i) causing a display device to display a report describing the at least one security vulnerability, (ii) storing the report containing information about the at least one security vulnerability, and (iii) electronically transmitting the report describing the at least one security vulnerability.

9. The method of claim 8, wherein before receiving the one or more manually-entered inputs that explicitly select the Boolean node-selection condition, the penetration testing system automatically computes and displays an explicit recommendation for selecting the Boolean node-selection condition.

10. The method of claim 9 wherein the received one or more manually-entered inputs for selecting the Boolean node-selection condition comprise an explicit user approval of the explicit recommendation.

11. The method of claim 8, further comprising:
subsequent to the receiving by the penetration testing system of the one or more manually-entered inputs that explicitly select the Boolean node-selection condition, receiving, by the penetration testing system and via the user interface of the computing device, one or more additional manually-entered inputs, the one or more additional manually-entered inputs explicitly selecting a value for a second information item of the penetration testing campaign, wherein the second information item is not a node-selection condition defining a subset of network nodes that are assumed to be already compromised at the time of beginning the penetration testing campaign.

12. The method of claim 11 wherein the executing of the penetration testing campaign is performed using both (i) the manually and explicitly selected value for the second information item, and (ii) an assumption that every node of the subset of network nodes is already compromised at the time of beginning the penetration testing campaign.

13. A method of penetration testing of a networked system by a penetration testing system that is controlled by a user interface of a computing device so that a penetration testing campaign is executed according to an automatic selecting of one or more network nodes of the networked system, the method comprising:
determining, by the penetration testing system, a type of an attacker of the penetration testing campaign;
based on a result of the determining, automatically selecting, by the penetration testing system, the one or more network nodes of the networked system, wherein at least one of the automatically selected network nodes is other than the computing device;
in accordance with the automatically selecting of the network nodes, executing the penetration testing campaign by the penetration testing system so as to test the networked system, the penetration testing campaign being executed under the assumption that the automatically selected one or more network nodes of the networked system are already compromised at the time of beginning the penetration testing campaign; and
reporting, by the penetration testing system, at least one security vulnerability determined to exist in the networked system by the executing of the penetration testing campaign, wherein the reporting comprises at least one operation selected from the group consisting of: (i) causing a display device to display a report describing the at least one security vulnerability, (ii) storing the report containing information about the at least one security vulnerability, and (iii) electronically transmitting the report describing the at least one security vulnerability.

14. The method of claim 13, wherein the determining of the type of the attacker comprises automatically determining the type of the attacker by the penetration testing system.

15. The method of claim 13, wherein the determining of the type of the attacker comprises receiving, via the user interface of the computing device, one or more manually-entered inputs that explicitly select the type of the attacker.

16. A method of penetration testing of a networked system by a penetration testing system that is controlled by a user interface of a computing device so that a penetration testing campaign is executed according to an automatic selecting of one or more network nodes of the networked system, the method comprising:
automatically determining, by the penetration testing system, whether one or more network nodes of the networked system satisfy a pre-defined Boolean condition;
based on a result of the determining, automatically selecting, by the penetration testing system, the one or more network nodes of the networked system, wherein at least one of the automatically selected network nodes is other than the computing device;
in accordance with the automatically selecting of the network nodes, executing the penetration testing campaign by the penetration testing system so as to test the networked system, the penetration testing campaign being executed under the assumption that the automatically selected one or more network nodes of the networked system are already compromised at the time of beginning the penetration testing campaign; and
reporting, by the penetration testing system, at least one security vulnerability determined to exist in the networked system by the executing of the penetration testing campaign, wherein the reporting comprises at least one operation selected from the group consisting of: (i) causing a display device to display a report describing the at least one security vulnerability, (ii) storing the report containing information about the at least one security vulnerability, and (iii) electronically transmitting the report describing the at least one security vulnerability.

17. The method of claim 16, wherein the pre-defined Boolean condition is satisfied for a given network node if and only if the given network node has a direct connection to a computing device that is outside the networked system.

18. The method of claim 16, wherein the pre-defined Boolean condition is satisfied for a given network node if and only if the given network node has an operating system that is a member of a pre-defined set of operating systems.

19. The method of claim 16, wherein the pre-defined Boolean condition is satisfied for a given network node if and only if the given network node has a cellular communication channel.

* * * * *

UNITED STATES PATENT AND TRADEMARK OFFICE
CERTIFICATE OF CORRECTION

| | |
|---|---|
| PATENT NO. | : 10,505,969 B2 |
| APPLICATION NO. | : 16/135720 |
| DATED | : December 10, 2019 |
| INVENTOR(S) | : Boaz Gorodissky, Adi Ashkenazy and Ronen Segal |

It is certified that error appears in the above-identified patent and that said Letters Patent is hereby corrected as shown below:

In the Claims

Column 67 Line 56, Claim 6:
Delete the phrase "campaign processers," and replace with --campaign processors,--

Signed and Sealed this
Eighteenth Day of February, 2020

Andrei Iancu
*Director of the United States Patent and Trademark Office*